US006830082B2

(12) United States Patent
Few

(10) Patent No.: US 6,830,082 B2
(45) Date of Patent: Dec. 14, 2004

(54) FLUID SERVICING APPARATUS WITH DIELECTRIC SENSING CONTROL SYSTEM

(75) Inventor: Jeffery P. Few, Elkhart, IN (US)

(73) Assignee: Norco Industries, Inc., Compton, CA (US)

( * ) Notice: Subject to any disclaimer, the term of this patent is extended or adjusted under 35 U.S.C. 154(b) by 0 days.

(21) Appl. No.: 10/607,649

(22) Filed: Jun. 27, 2003

(65) Prior Publication Data

US 2004/0089371 A1 May 13, 2004

Related U.S. Application Data

(63) Continuation-in-part of application No. 10/280,260, filed on Oct. 25, 2002, now Pat. No. 6,722,397.
(60) Provisional application No. 60/350,157, filed on Oct. 29, 2001.

(51) Int. Cl.[7] .................................................. B65B 1/04
(52) U.S. Cl. ............................. 141/65; 141/2; 141/18; 141/59; 141/48; 141/142; 184/1.5
(58) Field of Search .............................. 141/2, 4, 5, 7, 141/21, 46, 59, 65–67, 94, 95, 83, 98, 192, 198, 367, 378; 184/1.5, 105.1

(56) References Cited

U.S. PATENT DOCUMENTS

| | | |
|---|---|---|
| 3,513,941 A | 5/1970 | Becnel |
| 4,745,989 A | 5/1988 | DiMatteo |
| 4,938,315 A | 7/1990 | Ohta et al. |
| 5,056,621 A | 10/1991 | Trevino |
| 5,273,085 A | 12/1993 | Edwards et al. |
| 5,289,837 A | 3/1994 | Betancourt |
| 5,291,968 A | 3/1994 | Brown |
| 5,318,080 A | 6/1994 | Viken |
| 5,318,700 A | 6/1994 | Dixon et al. |
| 5,337,708 A | 8/1994 | Chen |
| 5,370,160 A | 12/1994 | Parker |
| 5,372,219 A | 12/1994 | Peralta |
| 5,415,247 A | 5/1995 | Knorr |
| 5,427,202 A | 6/1995 | Behring et al. |
| 5,447,184 A | 9/1995 | Betancourt |
| 5,472,064 A | 12/1995 | Viken |
| 5,482,062 A | 1/1996 | Chen |
| 5,522,474 A | 6/1996 | Burman |

(List continued on next page.)

FOREIGN PATENT DOCUMENTS

JP          2-72299         3/1990

OTHER PUBLICATIONS

Applicant respectfully submits that U.S. patent application Publication Nos. 2003/0079799, 2003/0089418, and2003/0089419, submitted herewith, are commonly owned by the assignee of this application.
Applicant also submits that U.S. 6,035,903 to Few et al., submitted herewith, is also commonly owned by the assignee of this application and contains dielectric sensor related information at col. 11, line 29 through col. 12, line 7 regarding Fig. 8.
Chinese promotional material for ATF change WH–202 with translation, pre–2000 publication.
Japanese promotional material for AFC–6000 with translation purportedly printed in Nov. 1991.
Japanese promotional material for AFC–9800 with translation, pre–2000 publication.

*Primary Examiner*—Gene Mancene
*Assistant Examiner*—Peter deVore
(74) *Attorney, Agent, or Firm*—Fulwider Patton Lee & Utecht, LLP.

(57) ABSTRACT

A fluid servicing apparatus with new and used fluid tanks for exchanging fluid with a serviceable vehicular subsystem having a fluid reservoir includes a control system with dielectric sensing capabilities to monitor the fluid level within the tanks and, based upon such fluid levels or relative changes thereto, regulate the flow of fluid between the vehicular subsystem and the tanks through selective operation of a fluid flow rate control device.

26 Claims, 22 Drawing Sheets

U.S. PATENT DOCUMENTS

| | | |
|---|---|---|
| 5,535,849 A | 7/1996 | Few |
| 5,586,583 A | 12/1996 | Edwards et al. |
| 5,626,170 A | 5/1997 | Parker |
| 5,635,625 A | 6/1997 | Tsunoda |
| 5,743,357 A | 4/1998 | Few |
| 5,806,629 A | 9/1998 | Dixon et al. |
| 5,853,068 A | 12/1998 | Dixon et al. |
| 6,035,902 A | 3/2000 | Dixon |
| 6,035,903 A | 3/2000 | Few et al. |
| 6,062,275 A | 5/2000 | Rome et al. |
| 6,131,701 A | 10/2000 | Camacho et al. |
| 6,170,505 B1 | 1/2001 | Erwin |
| 6,213,175 B1 | 4/2001 | Rome et al. |
| 6,247,509 B1 | 6/2001 | Rome et al. |
| 6,360,791 B2 | 3/2002 | Rome et al. |
| 6,382,271 B1 | 5/2002 | Betancourt et al. |
| 6,435,223 B1 | 8/2002 | Betancourt et al. |
| 6,459,995 B1 | 10/2002 | Collister |
| 6,474,370 B1 | 11/2002 | Betancourt et al. |
| 6,722,397 B2 * | 4/2004 | Few .......................... 141/65 |
| 2003/0079799 A1 | 5/2003 | Few |
| 2003/0089418 A1 | 5/2003 | Few et al. |
| 2003/0089419 A1 | 5/2003 | Few |

\* cited by examiner

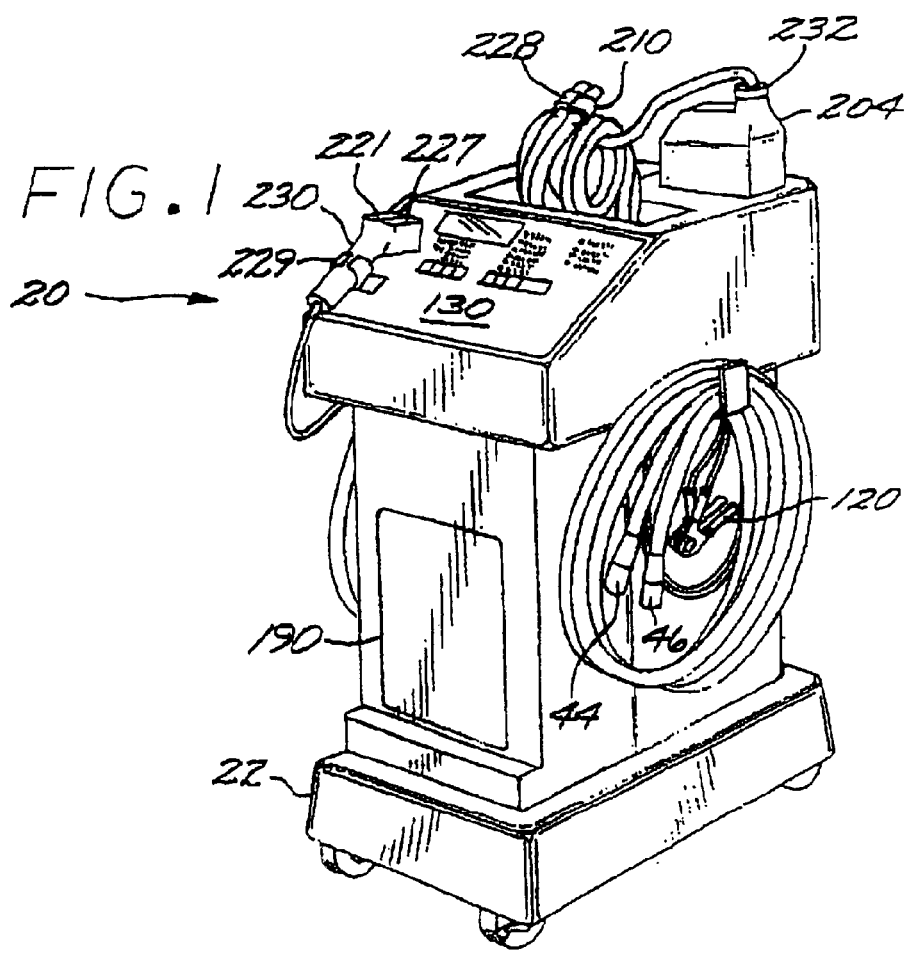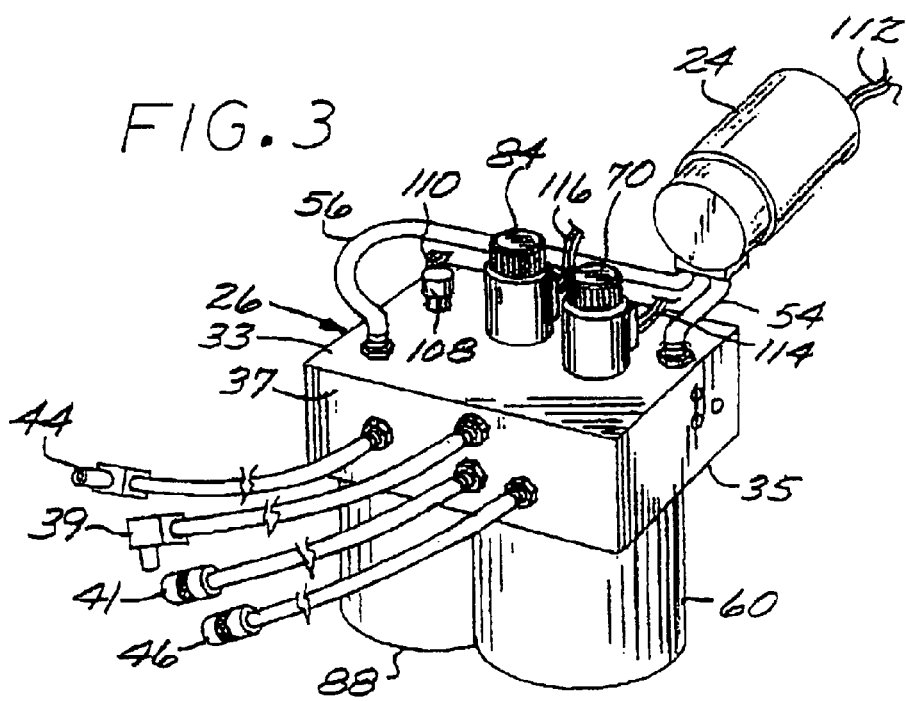

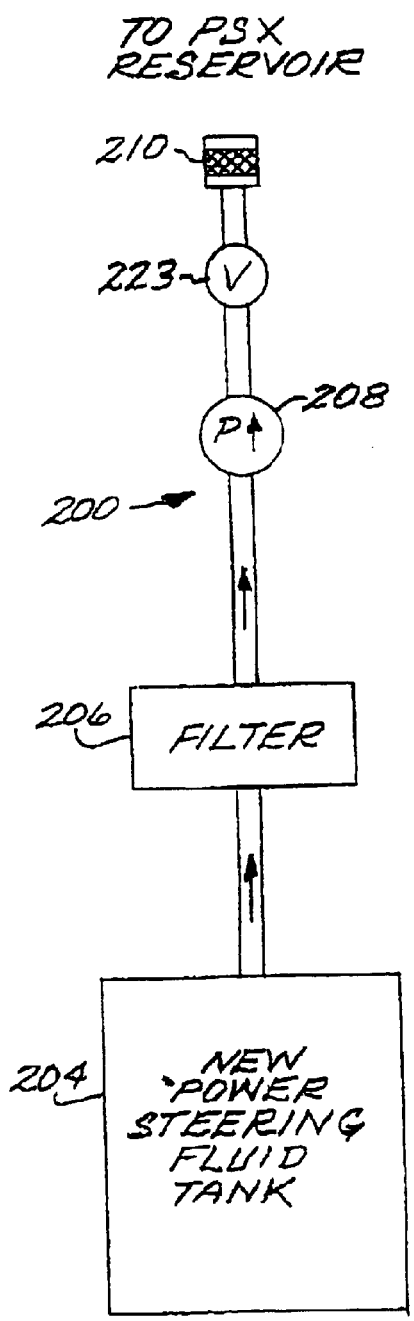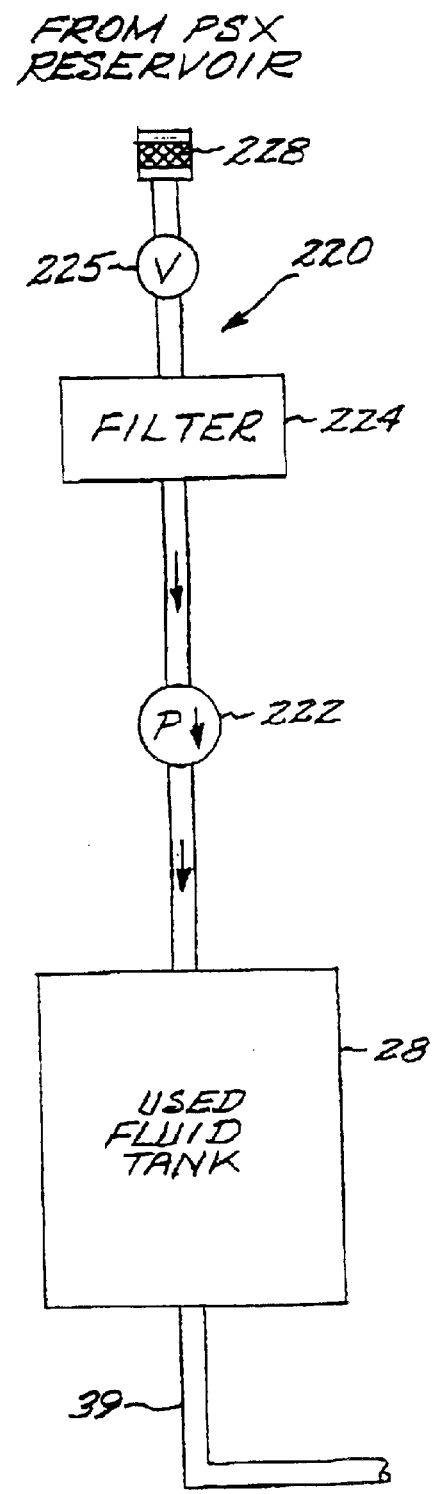
FIG. 4
FIG. 5

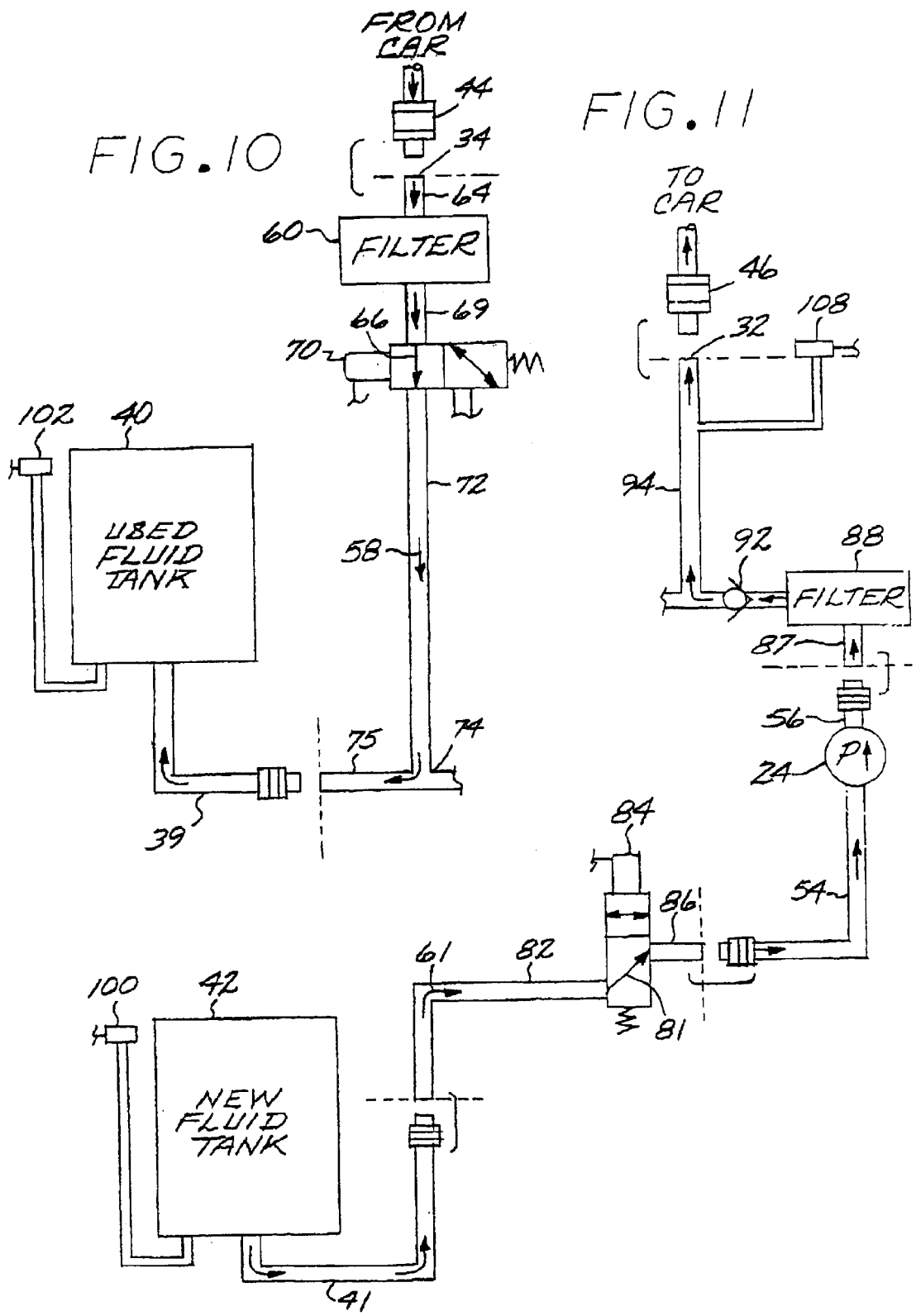

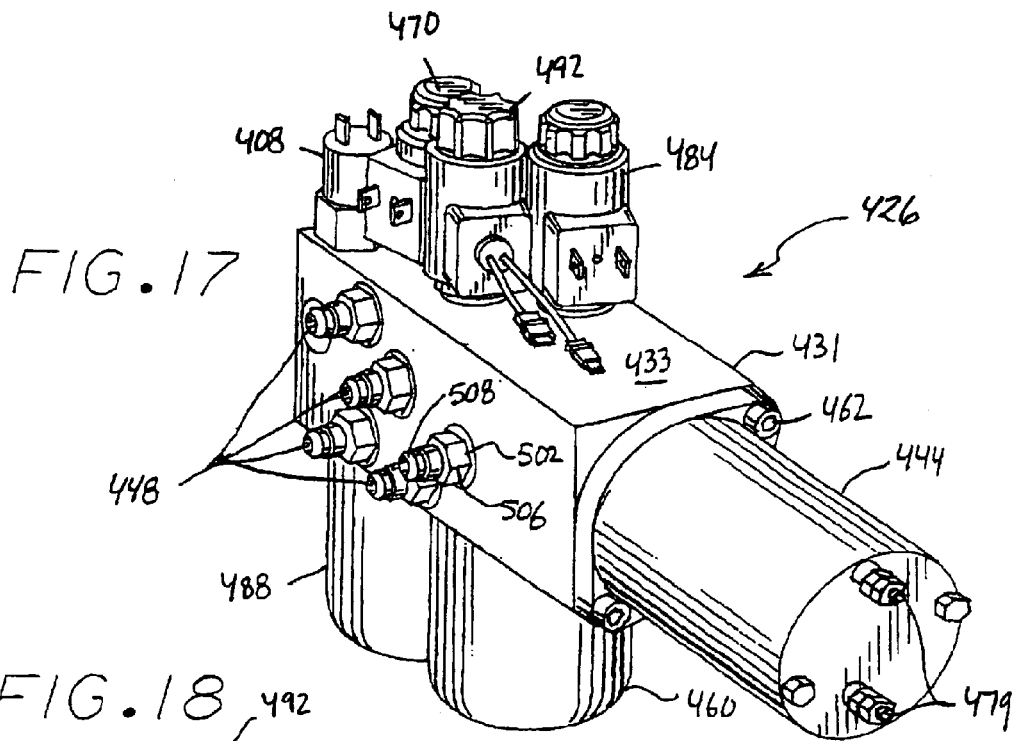
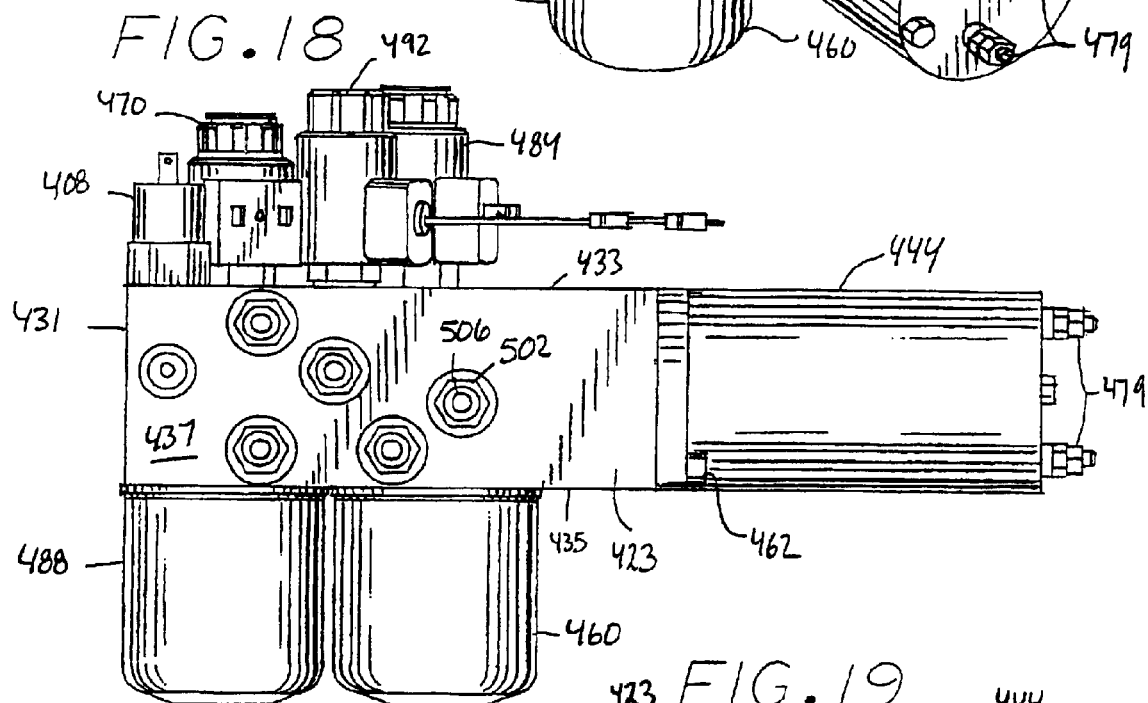
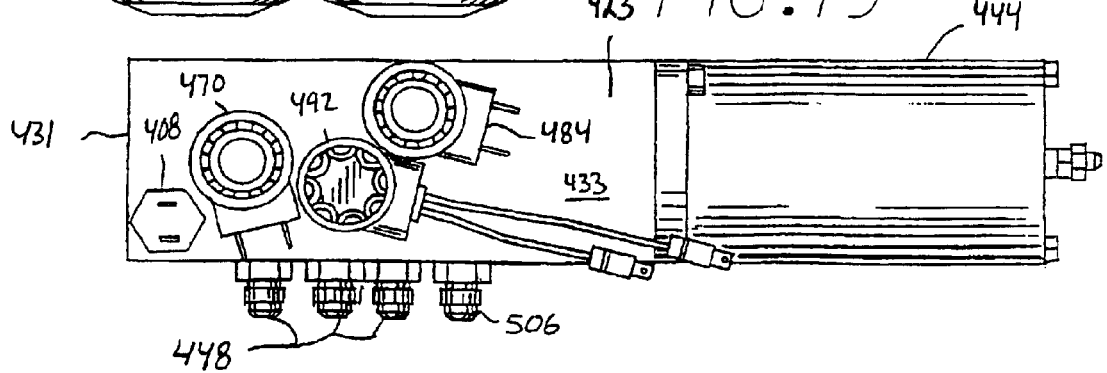

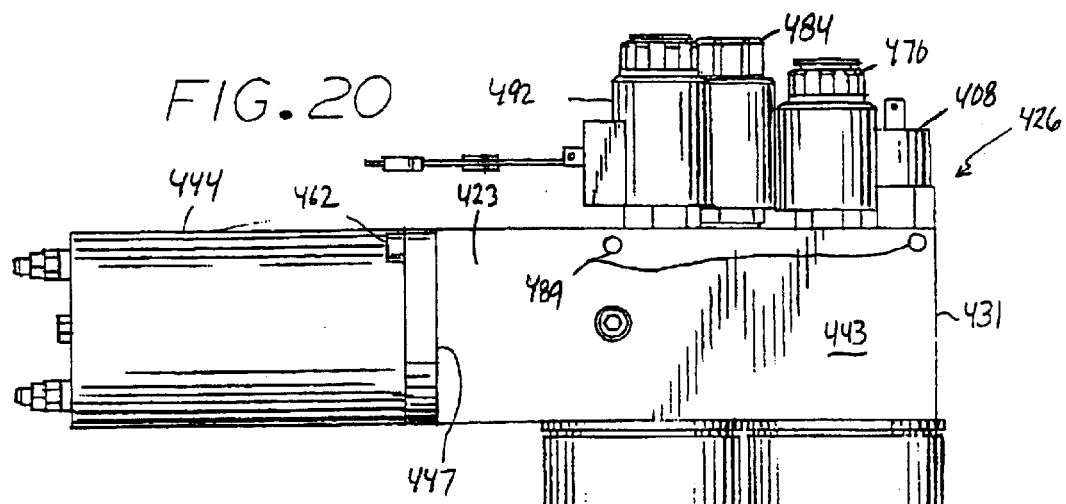
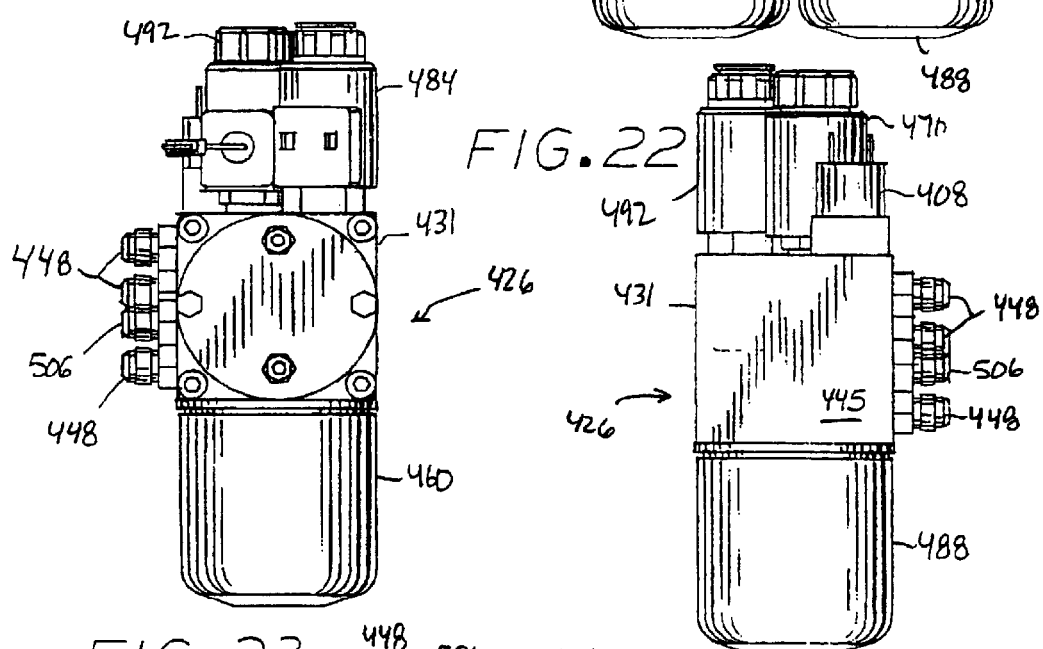
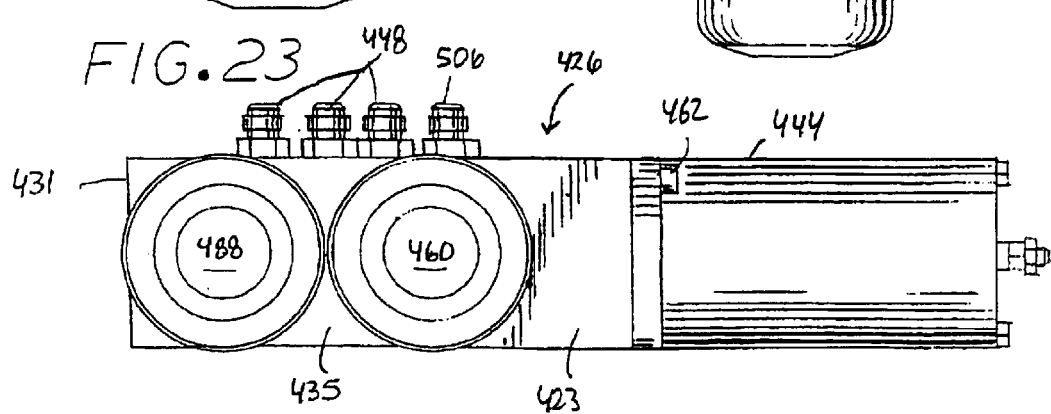

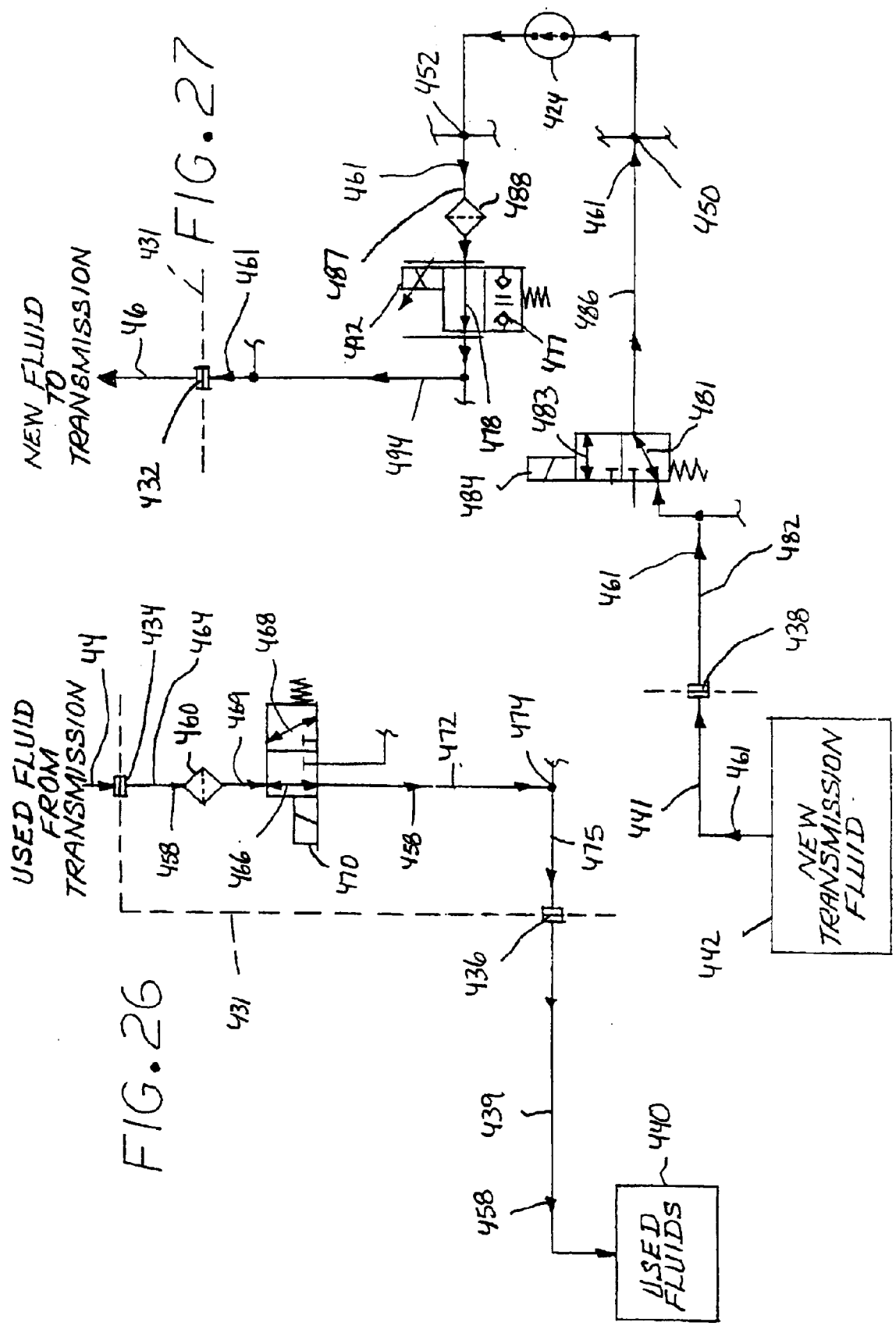

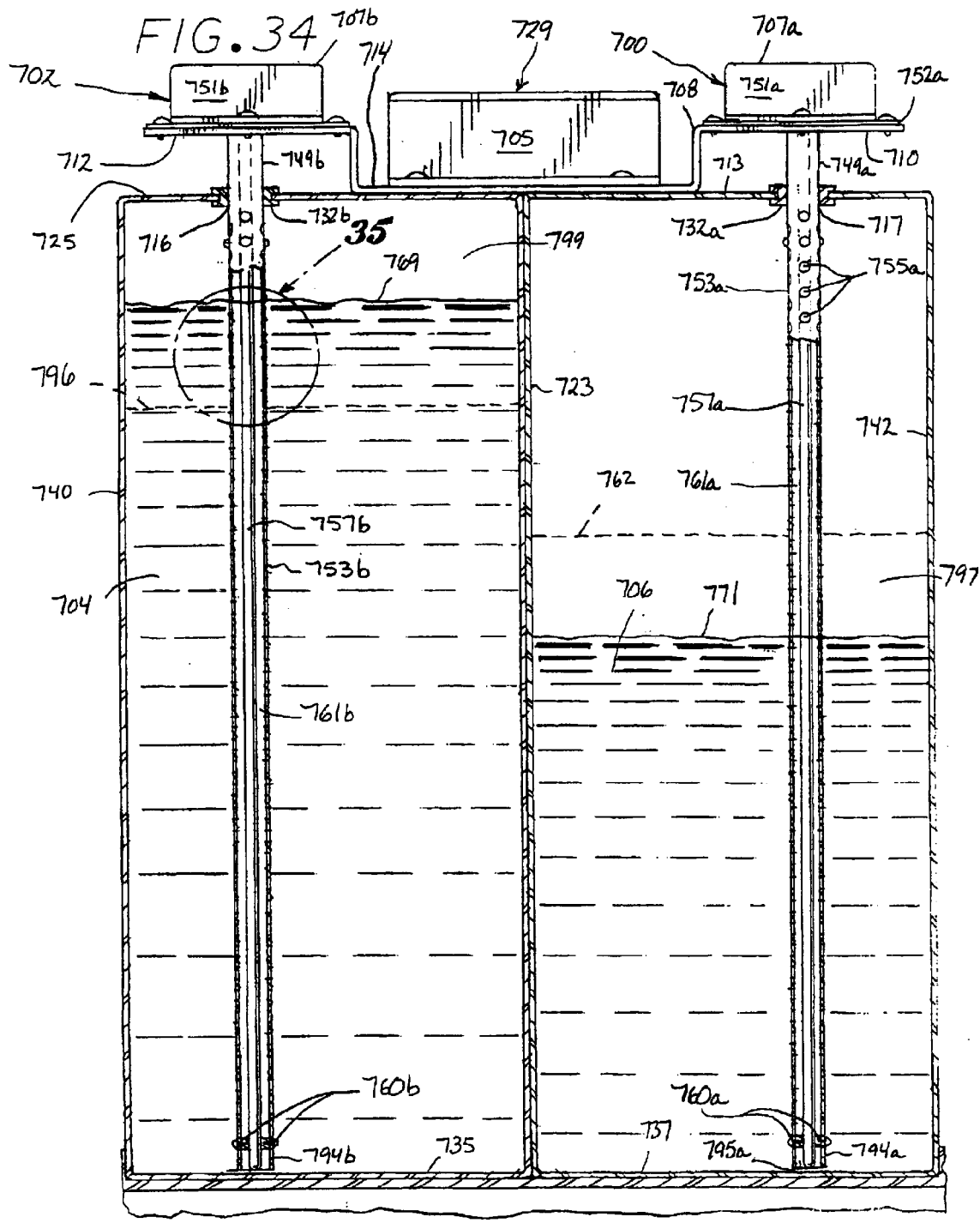

FLUID SERVICING APPARATUS WITH DIELECTRIC SENSING CONTROL SYSTEM

CROSS-REFERENCE TO RELATED APPLICATIONS

This application is a continuation-in-part of U.S. Ser. No. 10/280,260, entitled Automotive Fluid Servicing Apparatus, filed on Oct. 25, 2002, now U.S. Pat. No. 6,722,397 which is in turn a continuation-in-part of provisional application No. 60/350,157, entitled Remotely Operated Vehicle Fluid Exchange System, filed on Oct. 29, 2001, both of which are hereby incorporated by reference in their entireties.

BACKGROUND OF THE INVENTION

1. Field of the Invention

The present invention relates to the field of vehicle maintenance, and more specifically, to performing fluid exchanges with vehicular subsystem components having fluid reservoirs such as automatic transmission fluid systems.

2. Description of Related Art

Automatic transmissions and other vehicular fluid system components frequently require servicing such as replacing used fluid with fresh fluid in order to properly maintain them and extend the life of the component and associated vehicle. Early attempts at developing automatic transmission fluid transfer machines often resulted in relatively lengthy and complicated procedures. Many of these devices relied upon compressed gases to circulate the fluid and thus required some sort of compressed air source adding to the device's complexity. Such early attempts also required significant manual operation and supervision as the operator had to continually monitor gauges and other instruments to monitor the fluid flow to achieve the desired performance.

While some of these devices proved satisfactory for their time, the next level of automatic transmission fluid transfer machines introduced a degree of automation to the fluid exchange process thus reducing the extent of operator intervention. However, the plumbing proposed in an effort to automate the process and perform the steps typically associated with a complete automatic transmission fluid service, typically employed a relatively large number of plumbing components such as multiple dedicated pumps, gauges, and several valves. While many of these devices have also proven satisfactory in their performance there remains a push for reducing the number of components, costs associated with manufacture and maintenance, and reducing the overall assembly time while maintaining the capability to perform the desired procedures.

Efforts to resolve this long standing problem led to the introduction of a number of devices of the single pump variety. Some examples of these single pump devices can be found in U.S. Pat. Nos. 5,482,062 and 5,337,708 to Chen; U.S. Pat. No. 5,447,184 to Betancourt; U.S. Pat. No. 5,472,064 to Viken; U.S. Pat. No. 6,035,903 to Few, owned by assignee of this application; and Japanese Unexamined Patent Application No. 2-72299. It is clear from a review of the devices shown in these patents that, while success was achieved in reducing some number of components, such as the pumps, it was necessary to increase the remaining plumbing in order to perform the necessary fluid transfer processes such as complete fluid exchange, recirculation, and draining both used and new fluid tanks or such desired processes could not performed using a single pump. Frequently a separate drain pump or a more complicated and costly reversible pump has been incorporated to perform the desired fluid servicing tasks. While some of these devices, such as that described in U.S. Pat. No. 6,035,903, have proven satisfactory in the field, there remains the ever present need to develop a fluid changing apparatus with a minimal number of components to reduce costs, maintenance, and assembly time, yet still perform the fluid servicing procedures associated with an automatic transmission service.

What is also evident, in addition to a continued focus on improving the plumbing arrangements of these devices, is that a related drive to improve the overall speed of the servicing procedures has shed some light on the deficiencies of some of the automatic control systems. For instance, the primary type of sensor incorporated in automatic fluid transmission exchangers is a pressure sensor for measuring the hydrostatic pressure head created by a column of air atop a column of fluid within a fluid compartment. Such pressure transducers typically incorporate a hollow plastic tube projecting into a fluid containment area, often from beneath the tank creating an increased likelihood of leakage. The open ended tube includes a movable membrane responsive to the pressure head created by the column of air within the tube which changes as the fluid level changes. As the membrane moves, a transducer converts the mechanical movement to an electrical signal indicative of the level of the fluid. To calculate the volume of the fluid, it is necessary to know the geometric configuration of the tank, the fluid density, and an atmospheric pressure reading to give a true pressure reading.

While such devices using such sensors have proven useful and commercially successful, they present several drawbacks. For example, the use of moving mechanical components adds to the likelihood of increasing maintenance costs if the unit fails which is further exacerbated by the below tank installation. Also, the measurements of such pressure transducers are subject to the inaccuracies due to the formation of foam within the fluid as well as a phenomenon known as "wicking" wherein the hydrogen molecules in the fluid actually seep outwardly into the plastic tubing of the fluid tube eventually saturating the tube. Due to this condition, increased maintenance is required as the pressure sensor tubes must be removed on a periodic basis and struck to remove the undesirable fluid buildup and reinstalled. In the meantime, the accuracy of the device may be questionable.

As the accuracy of measuring the fluid in both the used and new fluid tanks is critical to completely drain the old fluid and replace an equal volume of new fluid as well as regulating the flow of fluid into the transmission and out of the transmission to avoid transmission starvation and thereby damaging the transmission, degradation of sensor accuracy is a serious concern. For instance, the accuracy for a typical pressure sensor with such construction measuring the level of fluid in a fluid level tank of an automatic fluid exchanger may have up to a 4–5% margin of error.

As operators request that the speed of the fluid removal continues to be increased so that more fluid exchange servicing procedures can be performed in a day to increase their profit margins, the margin of error introduced by such pressure sensors is not always acceptable given the precision required by more advanced automatic fluid transmission exchangers that are attempting to introduce faster, more powerful pumps to keep up with customer's demands. Sensor accuracy can make all the difference in a commercially successful machine.

Thus, while most devices have an acceptable tolerance level to accommodate routine servicing, there remains a need for alternative methods of measuring the fluid level that overcome the drawbacks of the hydrostatic pressure head sensors as well as increase the overall accuracy of the fluid level measurement in the fluid tanks. Such an improvement provides more accurate control of the fluid exchange process providing a more stable exchange, reducing fluid waste, and decreasing the likelihood of a dry transmission run. Accurate measurements also improve the topping off procedure at the end of the fluid exchange process.

What is needed and heretofore unavailable is an improved sensor feedback system based on alternative principles with increased accuracy to support high flow fluid changing machines while providing a modular construction for reducing installation time and maintenance costs.

SUMMARY OF THE INVENTION

In accordance with the present invention, an apparatus for performing fluid exchange servicing functions for a vehicle having a fluid reservoir is described herein and more particularly for servicing the transmission and power steering components of a vehicle system. Such fluid servicing apparatus generally includes new and used fluid tanks, each with a respective sensing unit, at least one of which may sense a change in capacitance corresponding to a fluid level within the tank to generate a fluid level signal transmittable to a processing unit for use in commanding selective operation of a fluid flow rate control device interposed between the reservoir and the tanks to direct and control the rate of fluid flow therebetween.

In one particular embodiment, the sensing units include elongated probes including sensor fields extending into each of the tanks to monitor changes in capacitance along the length of the probes.

In yet another embodiment, the fluid flow rate control device is selectively operated to direct flow between the reservoir and at least one of the tanks at a particular fluid flow rate through monitoring a sensing unit with the processing unit and determining relative fluid quantity changes.

Another option in the present invention is the incorporation of an analog to digital converter at the sensing unit to transmit a digital signal to the processing unit.

Another feature of the present invention is the capability of continuous or periodic monitoring of capacitance changes along the length of the sensor probes.

Other features of the present invention include the provision of a fluid flow rate control device in the form of a manifold defining a fluid transfer circuit including a pump and a set of valves and coupled to the processing unit for selective operation thereof based on fluid level signals from the sensing units including at least one signal being based on a change in capacitance at an upper fluid level in a tank.

A method of regulating the flow rate between the reservoir and the fluid exchanging apparatus by monitoring changes in capacitance indicative of the fluid levels or relative fluid levels in each tank using a pair of dielectric sensors is also described herein.

Other features and aspects of the present invention will become apparent with further reference to the following drawings and specification.

BRIEF DESCRIPTION OF THE DRAWINGS

FIG. 1 is a right front perspective view of a preferred embodiment of the automotive fluid servicing apparatus of the present invention;

FIG. 3 is a left rear perspective view, in enlarged scale, of an exemplary manifold incorporated in the automotive fluid servicing apparatus shown in FIG. 1;

FIG. 4 is a schematic of an exemplary plumbing circuit for withdrawing used fluid from a power steering reservoir of a vehicle in an alternative embodiment of the automotive fluid servicing apparatus of the present invention;

FIG. 5 is a schematic of an exemplary plumbing circuit for adding new fluid to a power steering reservoir of a vehicle in an alternative embodiment of the automotive fluid servicing apparatus of the present invention;

FIG. 10 is a partial sectional view taken from the plumbing circuit in FIG. 6 illustrating an exemplary drain fluid path;

FIG. 11 is a partial sectional view taken from the plumbing circuit in FIG. 6 illustrating an exemplary supply fluid path;

FIG. 17 is a left rear perspective view, in enlarged scale, of an alternative manifold assembly to that shown in FIG. 3;

FIG. 18 is a rear view of the manifold assembly, in enlarged scale, of the manifold assembly of FIG. 17;

FIG. 19 is a top view of the manifold assembly, in enlarged scale, of the manifold assembly of FIG. 17;

FIG. 20 is a front view of the manifold assembly, in enlarged scale, of the manifold assembly of FIG. 17;

FIG. 21 is a left hand end view of the manifold assembly, in enlarged scale, of the manifold assembly of FIG. 17;

FIG. 22 is a right hand end view of the manifold assembly, in enlarged scale, of the manifold assembly of FIG. 17;

FIG. 23 is a bottom view of the manifold assembly, in enlarged scale, of the manifold assembly of FIG. 17;

FIG. 26 is a partial sectional view taken from the plumbing circuit in FIG. 25 illustrating an exemplary drain fluid path;

FIG. 27 is a partial sectional view taken from the plumbing circuit in FIG. 25 illustrating an exemplary supply fluid path;

FIG. 34 is a sectional view, in enlarged scale, taken along lines 34—34 of FIG. 32;

DETAILED DESCRIPTION OF THE PREFERRED EMBODIMENTS

Figure 6:
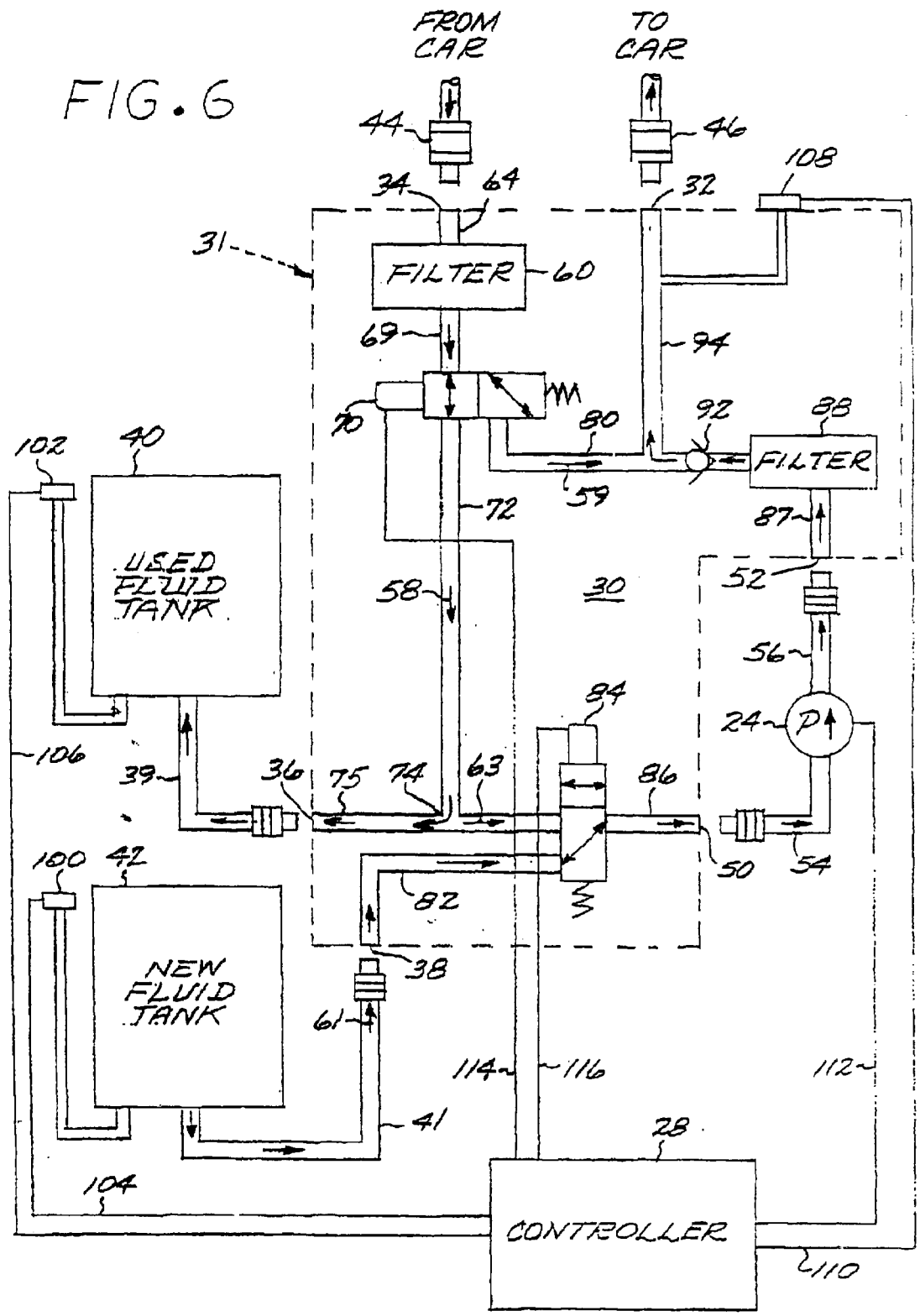
FIG. 6 is a schematic of an exemplary plumbing circuit for performing servicing procedures in accordance with a preferred embodiment of the automotive fluid servicing apparatus shown in FIG. 1.

Referring now to FIGS. 1, 3 and 6, an exemplary embodiment of an automotive fluid servicing apparatus, generally designated 20, of the present invention is illustrated. In general, such fluid servicing apparatus is incorporated in a convenient, portable wheeled cabinet 22 housing a plumbing subsystem and an electrical command subsystem cooperating to drain fluid from a serviceable component, add fluid to the serviceable component, circulate fluid between the serviceable component and the apparatus, and drain collected or other stored fluid using a single, common pump 24 and an integrated manifold assembly 26 as directed by a service technician and controlled by a processor/controller 28.

Plumbing Subsystem

Figure 12:
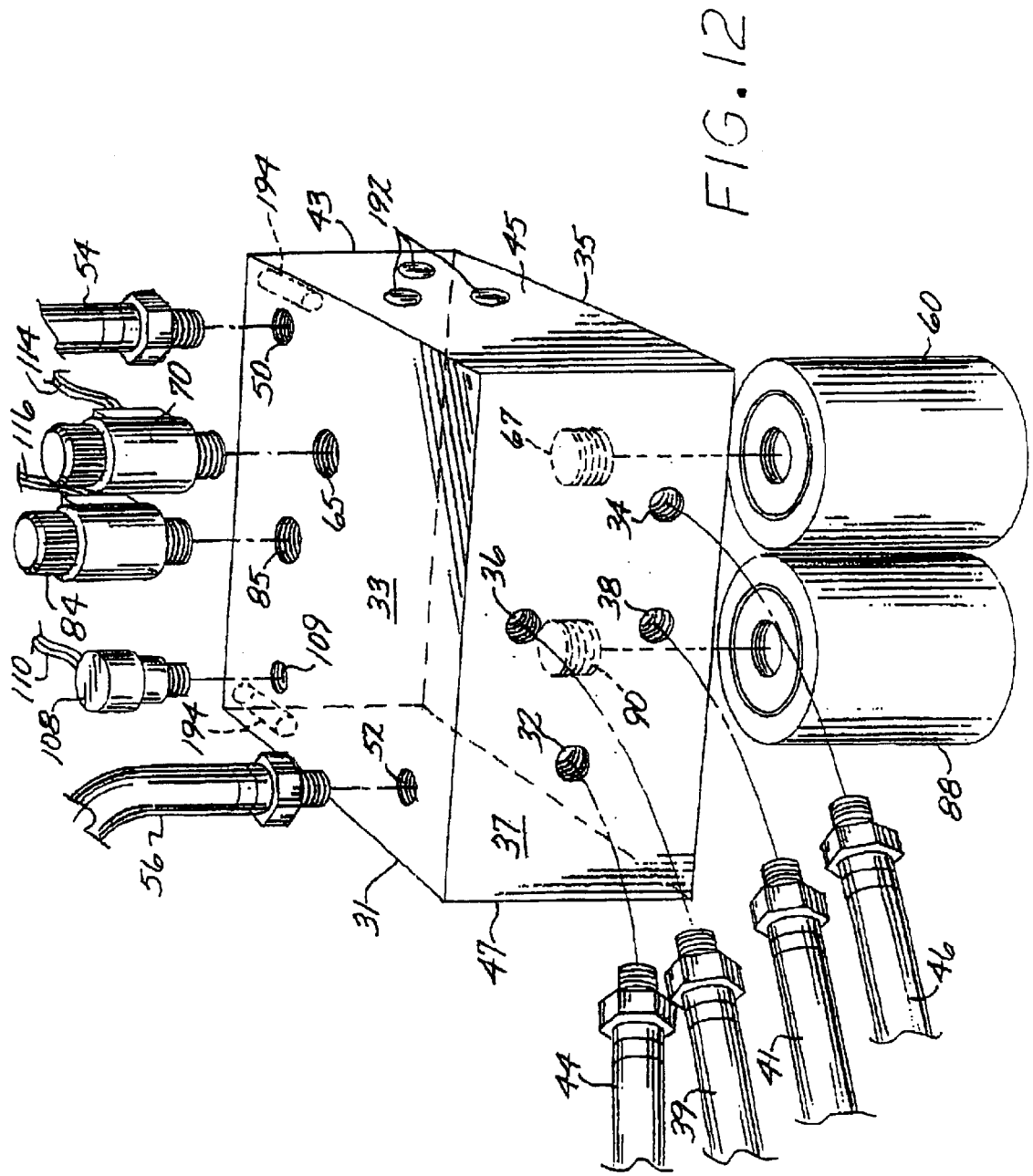
FIG. 12 is a perspective exploded view, in enlarged scale, of the manifold illustrated in FIG. 3.

Turning to FIGS. 3, 6, and 12, at the heart of the plumbing subsystem is the integrated manifold assembly 26 housing a fluid circuit 30 formed in a rectangular manifold body 31 having a top side 33, opposing bottom side 35, rear side 37, front side 43, and two opposing ends 45, 47. The body sides and ends have generally planar surfaces cooperating to form a rectangular block measuring about six inches wide by three inches deep by three inches high and defining a number of manifold ports for connecting to various conduits and other hydraulic components. In this exemplary embodiment, there are six conduit ports.

With particular reference to FIG. 12, an exhaust port 32, a return port 34, a drain port 36, and a fresh fluid supply port 38 open outwardly on the rear side 37 of the manifold body 31. While each of these ports are shown on the same side of the manifold body in FIG. 12, it will be appreciated that the ports may be placed at other suitable locations on the manifold body. For instance, these same manifold ports are shown on different sides of the manifold body 31 in FIG. 6 for ease of description and clarity and may also provide suitable port locations and is not meant to be limiting in any manner. Other suitable locations will occur to one of ordinary skill in the art. Each manifold port is threaded for coupling with one end of a respective conduit, hose, or other suitable tubing or piping, which are in turn connected to a desired source or destination. For ease of assembly, it is preferable to thread one portion of each hose coupling into the respective threaded port opening. The threaded coupling component is constructed to allow the assembler to merely press the free end of the selected conduit into the complementary coupling component threaded into the port. Suitable couplings of this type are available from Parker Hannifin under the TrueSeal trade name.

More specifically, with reference to FIGS. 3, 6, and 12, a used fluid conduit 39 connects between the drain port 36 and a used fluid collection tank 40 to carry fluid therebetween. Similarly, the fresh fluid supply port 38 connects via a new fluid supply conduit 41 to a new fluid tank 42. Such used fluid collection tank 40 is constructed to hold a sufficient amount of used fluid to accommodate at least complete drain procedure and preferably more. The new fluid tank 42 is typically constructed to hold a sufficient volume of fresh fluid to accommodate a single fill procedure and preferably has a greater capacity as well. This fresh fluid source 42 may be filled through a fill hole (not shown). As it is preferred that the servicing apparatus maintain a portable capability, the used and new fluid tanks are preferably mounted inside the cabinet 22 (FIG. 1) which is sized to accommodate the preferred tank capacities. It has been found that a 24 quart capacity for both the new and used fluid tanks accommodates most servicing procedures.

With continued reference to FIGS. 3, 6, and 12, further convenience is provided by a set of servicing hoses, 44 and 46 respectively for connecting between the return port 34 and the exhaust port 32 of the servicing apparatus 20 and the influent line and effluent line of the serviceable component such as an automatic transmission as is well known to one of ordinary skill. The use of conventional adapters is also contemplated if necessary. The connectors illustrated in FIG. 3 are exemplary and not meant to be limiting in any manner as other suitable connectors will occur to one of ordinary skill. Such connection places the transmission in fluid communication with the servicing apparatus 20 as will be discussed below. The manifold body 31 further includes a suction port 50 and a pressure port 52 located on the top side 53 of the manifold body (FIG. 12). These ports are also threaded for receiving one part of corresponding suction and pressure hose couplings 54, 56, which are connected at their opposite ends to the respective suction (inlet) and pressure (outlet) sides of the pump 24 to place the pump in fluid communication with the manifold body 31. Such suction and pressure hoses also incorporate press-in connectors for convenience of the assembler.

Still referring to FIG. 6, added to the fluid circuit 30 are a number of pathways formed in the manifold body 31 as well as a number of flow control and filtering components for routing fluid entering and exiting the manifold between the various fluid ports 32, 34, 36, 38, 50 and 52. Referring now to FIGS. 6 and 8–11, in this exemplary embodiment, there are four such pathways including a drain path, generally designated 57, for flow of fluid as indicated by directional arrow 58 (FIGS. 6 and 10), a recirculation path, generally designated 80, for flow of fluid as indicated by directional arrow 59 (FIGS. 6 and 8), a supply path, generally designated 93, for fluid flow as indicated by directional arrow 61 (FIGS. 6 and 11), and a dump path, generally designated 95, for fluid flow as indicated by directional arrow 63 (FIGS. 6 and 9).

It will be appreciated that the manifold body 31 forms a three dimensional fluid circuit and that FIGS. 6 and 8–11 are represented in a two-dimensional layout for ease of description and are not meant to be limiting in any manner. For instance, the fluid ports in FIG. 12 are shown on one side of the manifold body while the same ports are shown on multiple sides of the manifold body in FIG. 6. In addition, in FIG. 6, the manifold body 31 is not depicted as a rectangular block as in FIG. 12. These illustrations are merely to facilitate description of the preferred embodiment. Other suitable port locations and pathways may occur to one of ordinary skill and still fall within the scope of the present invention.

With continued reference to FIGS. 6 and 8–12, each pathway 57, 80, 93, and 95 is generally tubular in transverse cross section and made up of adjacent passage segments bored into the manifold body 31 which are configured with straight runs meeting at right angles and compacted to minimize the size of the manifold body and further reduce hose length requirements between components coupled to the manifold body and overall hose length requirements of the servicing apparatus. Some of these right angle segments project into or out of the plane of the paper and may not be shown in FIGS. 6, or 8–11. It will also be appreciated, when considered from end to end, portions of each pathway may extend outside the manifold body and include couplings or connectors of flexible or rigid material connected to one or more manifold ports.

With particular reference to FIGS. 6, 10, and 12, during a drain procedure as will be discussed below, fluid is normally directed in the direction of arrow 58 through the drain path 57 from the return port 34 to the used fluid drain port 36 which may be connected to the used fluid collection tank 40 via conduit 39. Such passage 57 is formed by an entry bore extending into the manifold body 31, viewed into the paper in FIG. 6, from the return port 34 to enter a short pre-filter segment 64 which turns downwardly at a right angle from the entry bore, toward an aperture (not shown) in the bottom side 35 of the body aligned with a fluid entrance into an in-line filter 60 to direct fluid into the filter. The filter 60 is coupled to a hollow, threaded nipple 67 projecting from the bottom side 35 of the manifold. The nipple is screwed into an opening in the bottom side of the manifold body and further extends outside the body providing a connective threaded stub for the filter 60. After exiting the manifold through the bottom aperture to enter the in-line filter 60, the drain path 57 then re-enters the manifold body through the hollow nipple and projects upwardly into the body into a pre-drain valve segment 69. About the midpoint of the body 31, the pre-drain valve segment terminates at an inlet of a two-position drain/bypass solenoid valve 70 which may be screwed into a threaded valve port 65 on the top side 33 of the manifold body 31 to position the dual outlet valve 70 in line with both the drain path 58 and recirculation path 80 of the fluid circuit 30. Such valve 70 includes a drain position, indicated by directional arrow 66, which directs fluid entering the inlet of the solenoid 70 out of a drain outlet of the solenoid 70 and through the remainder of the drain path 58 (FIGS. 6, 10) and a normally open bypass position, indicated by directional arrow 68, which directs fluid entering the inlet of the valve 70 out of an alternate outlet and through a recirculation path 80 (FIGS. 6, 8).

The valves described herein are preferably two-position, three-way magnetic solenoid valves, either size 8 or 10, which may be energized to enter into a number of alternative positions. Such valves are available from Hydac Technology Corporation in Bethlehem, Pa. Other suitable valving arrangements for directing fluid flow to or from multiple channels may also be used.

With continued reference to FIG. 10, the drain path 57 turns at a right angle from the longitudinal centerline of the solenoid 70 into a post-solenoid segment 72 forming the stem of a T-shaped intersection 74. Then the path is bifurcated to, in one branch, enter into a used fluid connection branch 75 of the T-shaped intersection leading to the drain port 36 which may be connected to the used fluid collection tank 40. Fluid entering the return port 34 from the serviceable component is thus normally directed along this drain path 57 if the drain/bypass solenoid 70 is energized to the drain position 66 for collection in the used fluid tank 40.

Figure 8:
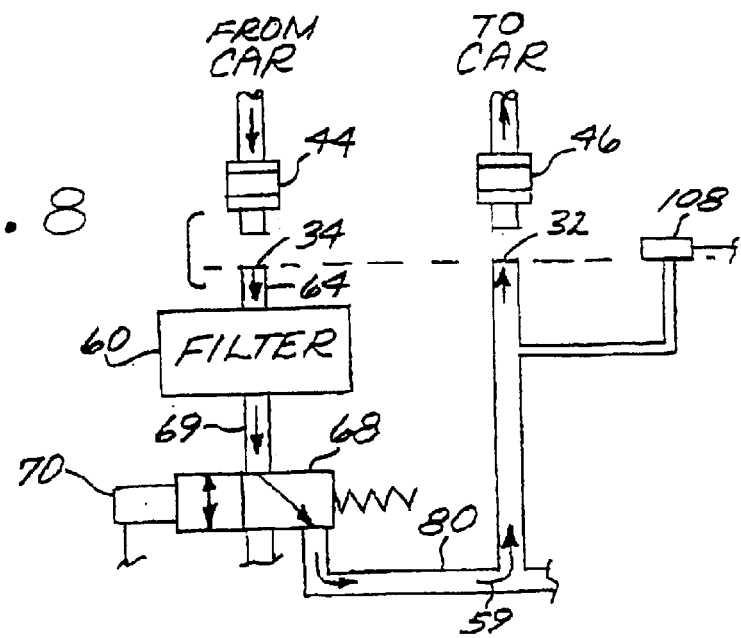
FIG. 8 is a partial sectional view taken from the plumbing circuit in FIG. 6 illustrating an exemplary recirculation/bypass fluid path.
Figure 9:
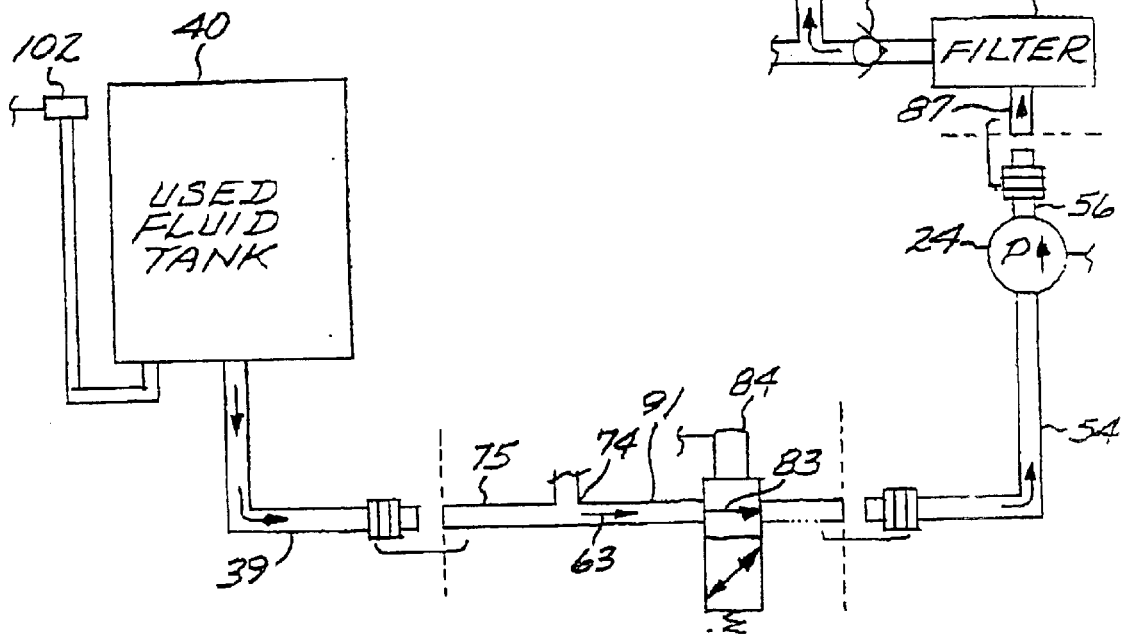
FIG. 9 is a partial sectional view taken from the plumbing circuit in FIG. 6 illustrating an exemplary dump fluid path.

Referring now to FIGS. 6 and 8, when the drain/bypass valve 70 is energized to the bypass position as indicated by directional arrow 68, the recirculation path 80 is opened and the drain path 57 is blocked. The recirculation path 80 shares the same plumbing with the drain path 57 up to the drain/bypass solenoid 70 including the return port 34, pre-filter segment 64, filter 60, and pre-valve segment 69. Continuing through the drain/bypass solenoid valve 70, when energized to the bypass position 68, the recirculation passage 80 projects at a right angle to the longitudinal centerline of the solenoid to form an L-shaped recirculation loop leading to the exhaust port 32 which may be connected to the transmission inlet. Fluid entering the recirculation path from the return port 34 is directed through the solenoid 70 set in the bypass position 68 to exhaust port 32. Such recirculation path normally serves to circulate fluid in the direction indicated by arrow 59 between the serviceable component and the servicing apparatus and through the filter 60 while bypassing the pump 24, used fluid tank 40, and new fluid tank 42.

With continued reference to FIG. 6, and with particular reference to FIG. 11, the fresh fluid supply passage 93 is formed by an entry bore extending into the manifold body 31 from the new fluid supply port 38 to then turn at a right angle forming an L-shaped pre-supply valve segment 82. The segments discussed herein are preferably bored into the manifold body during manufacture. Such segment terminates at a two-position dump/supply solenoid valve 84 which is also screwed into a threaded port 85 on the top side 33 of the manifold body 31 to position the valve 84 in line with the new fluid supply passage 93 (FIG. 11) and the dump passage 95 (FIG. 9) in the fluid circuit 30. Such valve 84 includes a normally open supply position, indicated by directional arrow 81, which receives fluid withdrawn from the new fluid supply tank 42 and directs it through the remainder of the supply path 93 (FIG. 11). The supply/dump valve 84 also includes a dump position, indicated by directional arrow 83, which receives fluid being dumped from the used fluid tank 40 and directs such fluid on through the remaining portion of the new fluid supply passage as well (FIG. 9).

Continuing with the new fluid passage 93, a pre-suction port segment 86 projects at a right angle to the longitudinal centerline of the solenoid 84 and further includes a second right angle turn leading to the suction port 50 (FIGS. 6 and 11). The suction side hose 54 connects the suction port to the suction side of the pump 24 and a pressure side hose 56 connects the pressure side of the pump 24 with the pressure port 52 at the top side 33 of the manifold body 31 to position the pump 24 in line with the supply path 93 (FIG. 11) and also the dump path 95 (FIG. 9) depending on the valve 84 position. Reentering the manifold body 31 through the pressure port, the new fluid supply passage 93 projects downwardly through a pre-supply filter segment 87 to lead to an aperture (not shown) on the bottom side of the manifold body 31 aligned with an entry hole in a supply filter 88. The supply filter 88 is also connected to the manifold body via a hollow, threaded nipple 90 on the under side 35 (FIG. 12) similar to the drain filter 60 connection. Exiting the filter 88 through the hollow nipple 90, the new fluid supply path 93 projects upwardly into the manifold body 31 through an in-line one-way check valve 92 and then turns outwardly toward the back side 37 of the manifold body in an L-shaped segment 94 leading to the exhaust port 32 which may be connected to the transmission inlet or collection tank via servicing hose 46. The final segment 94 of the new fluid supply path 93 leading to the exhaust port 32 is common with the last segment of the recirculation path 80.

The check valve 92 is incorporated in the supply fluid circuit 93 to prevent fluid from backflowing or otherwise entering the outlet of the supply filter 88 from the recirculation path. This feature also serves to keep the pump 24 primed in use. However, it is preferable to select a suitable pump 24 having an integrated check valve for incorporation into the servicing apparatus 20 so that the external check valve 92 can be omitted altogether. The supply pathway 93 normally serves to conduct fluid in the direction of arrow 61 from the fresh fluid supply 42 connected to the new fluid port 38 and direct the fluid to the exhaust port 32 and to the upstream line of the serviceable component via servicing hose 46 to supply fresh fluid thereto. Alternatively, such passage 93 can be used to drain the new fluid tank 42 when the servicing hose 46 is coupled to a collection tank.

Turning now to FIGS. 6 and 9, the fluid circuit 30 also includes the used fluid dump pathway 95 for transporting fluid in the direction of arrow 63 between the drain port 36 and the exhaust port 32 for draining fluid from the used fluid tank 40 using the common pump 24. With continued reference to FIG. 9, the dump path 95 begins with at the drain port 36 which is normally coupled to the used fluid collection tank 40 via the used fluid conduit 39. The dump path 95 is then formed with a bore projecting inwardly from the drain port 36 along a straight segment to form the first branch 75 of the T-intersection 74. The path 95 bifurcates at intersection 74 to flow through to a straight pre-valve segment 91 to one inlet of the dual inlet dump/supply solenoid valve 84 which controls the flow on to the outlet bore 86 (pre-suction port segment) leading to the suction port 50 when the valve is energized to the dump position 83. The remaining portion of the dump path is common to the new fluid supply path 93 as it exits the solenoid 84 ultimately leading to the exhaust port 32 including passage through the outlet bore 86 through the suction port 50 to the inlet of the pump 24 via coupling 54. The fluid is then directed through the outlet of the pump 24 through coupling 56 to pressure port 52 on through filter 88, check valve 92 to exhaust port 32. Such path 95 normally serves to direct fluid withdrawn from the used fluid collection tank 40 in the direction of arrow 63 using the common pump 24 to direct used fluid through the exhaust port 32. Instead of connecting the service hose 46 to the transmission, however, the free end of the service hose is typically placed in a waste fluid receptacle (not shown) for future storage so that the used fluid tank 40 may be drained.

With continued reference to FIGS. 6 and 8–11, fluid typically enters the return port 34 from conduit 44 connected to the downstream port of the transmission and exits the exhaust port 32 to be directed through hose 46 to the upstream port of the transmission. Fluid is generally circulated through the fluid circuit 30 by the single, non-reversible pump 24 interposed in the supply and dump pathways 93 and 95, respectively, to complete these pathways. Fluid may also be circulated by a pump associated with the serviceable component through the drain and recirculation paths 57 and 80, respectively. Direction of the fluid through the fluid circuit 30 is normally determined by the respective positions of the single inlet, dual outlet, drain/bypass valve 70 and dual inlet, single outlet, dump/supply valve 84. The drain/bypass valve 70 operates to direct fluid entering the return port 34 through the drain or bypass passages 57 and 80 respectively with one side of the valve 70 in fluid communication with the return port 34 and the second side in fluid communication with the drain port 36 and exhaust port 34. When solenoid 70 enters into the drain position 66, the bypass passage 80 is blocked off and the passage between the return port 34 and the drain port 36 is open and fluid may flow in the direction of arrow 58 (FIG. 10). On the other hand, when the valve 70 is energized to the bypass position 68, the drain passage 57 is blocked off and the passage between the return port 34 and the exhaust port 32 is open establishing a bypass loop 80 wherein fluid may circulate in the direction of the arrow 59 and wherein fluid does not circulate through the pump 24 (FIG. 8).

Referring to FIGS. 6, 9, and 11, connected in fluid communication with the supply and dump paths 93 and 95, respectively, is the dump/supply valve 84 with the outlet of the valve in fluid communication with the exhaust port 32 and the dual inlet in fluid communication with the drain port 36 and new fluid supply port 38. When the valve 84 is energized to the supply position 81, the dump passage 95 is blocked off and the passage 93 between the new fluid supply port 38 and the exhaust port 32 is open so that fluid may flow in the direction of arrow 61 (FIG. 11). On the other hand, when the valve 84 is energized to the dump position 83, the new fluid supply passage 93 is blocked off and the passage between the drain port 36 and the exhaust port 32 is open establishing a passage 95 for dumping fluid in a direction indicated by arrow 63 to be collected in the used fluid tank 40 by withdrawing such fluid with the common pump 24 (FIG. 9). Selection of these valve positions 66, 68, 81, and 83 is directed by the controller 28 and the operator or service technician using the electrical command system as will now be described.

Electrical Command Subsystem

Referring now to FIGS. 1–3, and 6, the heart of the electrical command subsystem is the controller 28 which is a programmable circuit board having a central processing unit (CPU) and associated memory for transmitting control commands to the pump 24 or valves 70, 84 in accordance with command sequences stored in the memory responsive to feedback transmitted from a number of sensors to direct the fluid service operations selected by a service technician. In this exemplary embodiment, there are three such sensors.

With particular reference to FIG. 6, the controller 28 is connected to a new fluid tank sensor 100 and a used fluid tank sensor 102 through their respective electrical leads 104 and 106 to provide fluid level feedback for each tank, 42 and 40, respectively. The fluid level sensors detect the fluid level in their respective fluid tanks and provide this information to the controller which includes tank geometric data and fluid density data in its memory for calculating the volume of fluid in each tank. Such fluid level sensors are preferably gas sensors, available from Motorola and constructed to monitor the air pressure in each tank. A two-port balancer system is used so that the sensors can detect outside air pressure and take into account elevation of the servicing apparatus to provide more accurate fluid level readings thereby compensating for discrepancies between sea level readings and readings taken at other altitudes.

The controller 28 is also in electrical communication with a pressure sensor 108 through electrical lead 110. Such pressure sensor 108 is threaded into an aperture 109 on the top surface of the manifold body 31 and is used for sensing fluid pressure in the last segment 94 of the fluid circuit leading to the exhaust port 32 and providing feedback to the controller 28 and is primarily used to detect incorrect service hose connections during the drain procedure as will be discussed below.

With continued reference to FIG. 6, the pump 24, drain/bypass valve 70, and dump/supply valve 84 are in electrical communication with the controller 28 via their respective electrical connectors 112, 114, and 116. Using feedback from the sensors and any additional operator input, the controller energizes the first and second valves 70 and 84 to the desired positions as will be described below and further actuates the pump 24 to on and off states during selected servicing procedures to circulate the fluid through the fluid circuit 30 from the desired source to the selected destination. Conveniently, the controller 28, a control panel 130, valves 70 and 84, pump 24, and sensors 100, 102, and 108 are in electrical communication with a set of battery cables 120 (FIG. 1). Thus, power may be supplied to such components capable of being powered by a 12 volt DC source by attaching a set of battery cables 120 to the vehicle's battery. It will be appreciated that such electrically powered components could also be hardwired to an alternative power source located on the servicing apparatus itself 20 or constructed to plug into a wall outlet.

Figure 2:
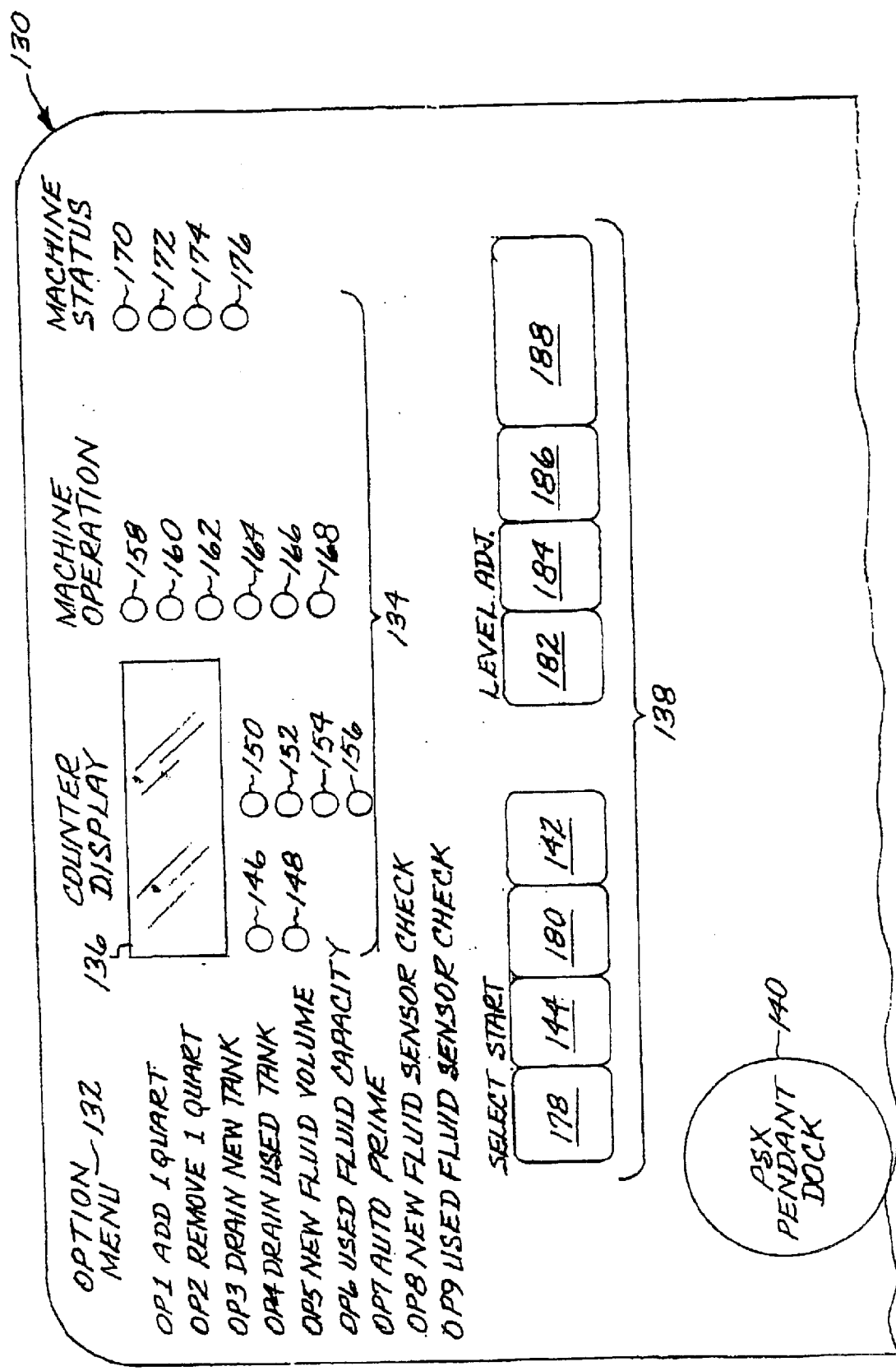
FIG. 2 illustrates an exemplary control panel, in enlarged scale, included in the automotive fluid servicing apparatus shown in FIG. 1.

Referring now to FIGS. 1 and 2, in this exemplary embodiment, an operator may interface with the controller 28 via a control panel 130 located on a top forward inclined surface of the cabinet 22. Such control panel is generally divided into four regions including an options menu listing 132 presenting the available operational options, a display region 134 with a plurality of LEDs and a counter display 136 for indicating machine and operational status and displaying quantity or diagnostic information, an interactive control region 138 and a power steering exchange (PSX) pendant dock region 140 for attaching a remote control for controlling power steering fluid exchange operations which will be described in detail below.

With continued reference to FIG. 2, the options menu listing 132 positioned to the left side of the control panel 130 includes a listing of procedural options 1–9, respectfully indicated as OP1–OP9 as imprinted or otherwise provided on the face of the control panel (FIG. 2). The exemplary options are as follows:

OP1 Add 1 quart of fluid;
OP2 Remove 1 quart of fluid;
OP3 Drain new fluid tank;
OP4 Drain used fluid tank;
OP5 Access new fluid volume;
OP6 Access used fluid capacity;
OP7 Auto prime the system;
OP8 New fluid sensor check; and
OP9 Used fluid sensor check.

Such exemplary options, as illustrated in FIG. 2, are accessible via an options menu button 142 in the control region 138 and engageable by a start exchange/options button 144 as will be described below. The display region 134 provides visual feedback to the operator as to the status of the fluid exchange procedures and servicing apparatus 20 operation. The primary indicator is the counter display 136 which provides a visual display of requested information such as the servicing option being invoked, fluid capacities, or other information in the form of alphanumeric messages.

Continuing with FIG. 2, further comprising the display region 134 are a number of LED indicators divided into four columns. The first column includes a quarts LED indicator 146 and a liters LED indicator 148. Such indicators indicate the system of measurement being used. Next to the first column is a column of amount indicators including a 20 quart indicator 150, a 16 quart indicator 152, a 12 quart indicator 154, and a 4 quart indicator 156. Each of these indicators provides a display to the operator as to the amount of fluid selected by the operator for an exchange. For purposes of an automatic transmission fluid exchange, eight cylinder, full size vehicles or truck typically require a twenty quart exchange. Mid-size vehicles with 6-cylinders typically require a sixteen quart fluid exchange and compact, four cylinder vehicles typically require a twelve quart exchange. Sub-compact vehicles typically only require a four quart exchange.

Still referring to FIG. 2, the third column in the display region 134 indicates machine operation status and includes a stopped indicator 158, a halted indicator 160, a running indicator 162, a complete indicator 164, a switch hoses indicator 166, and a shift to neutral indicator 168. A machine status column is the fourth column in the display region 134. Such machine status column includes a new ATF low indicator 170, a used ATF full indicator 172, an add/remove ATF indicator 174, and a new/used ATF drain indicator 176. The meaning of these indicators will be discussed below when the operation of the servicing apparatus is described.

Spaced below the display region 134 in the control region 138 is a first and second set of depressible buttons for initiating a variety of functions to operate the servicing apparatus 10 (FIG. 2). The leftmost button of the first set is a quantity button 178 for selecting the quantity of fluid to be transferred from one location to another. Depressing this button cycles through the quantity indicators 150, 152, 154, and 156. Next to the quantity button is positioned the exchange/options button 144 for initiating a fluid exchange or initiating the option selected by the options menu button 142. A power steering button 180 for initiating a power steering fluid exchange is next in line followed by the option menu button 142. The options menu button cycles through the options listed in the options menu 132 when depressed.

The leftmost button in the right hand set of buttons is an add ATF button 182 for adding automatic transmission fluid where directed by the fluid circuit 30. Next to the add ATF button is a remove ATF button 184. Selection of this button may be used to remove or drain ATF from the selected source. The third button is a cycle sensors button 186 for cycling the valves 70, 84 between their respective positions to clear the valves prior to operation of the servicing apparatus 20 to ensure the valves are in proper working order. The last button is a stop button 188 for shutting the apparatus down completely in an emergency or other desired stop condition. Such button is preferably a larger size or otherwise stands out from the other buttons so it may be rapidly located by the operator. An illustrative servicing procedure using the above-described plumbing and electrical subsystems incorporated into a servicing apparatus 20 will now be described.

Operation of the Fluid Servicing Apparatus

In the field, the manifold assembly 26 is typically secured within an internal compartment of the servicing apparatus 20 using a suitable threaded fasteners screwed into a pair of mounting bores 194 on the front side 43 of the manifold body 31 (FIGS. 1 and 12) and comes preassembled. Such internal compartment is accessible via a removable servicing panel 190. The pump 24 is also preferably secured inside the servicing apparatus. The control panel 130 is also removable and may provide an alternative access into the compartment. Near the bottom of the servicing apparatus, the used and new fluid tanks 40 and 42, respectively are placed on a convenient shelf.

While the servicing apparatus 20 is typically assembled prior to operation of the servicing apparatus 20, it will be appreciated that the integrated manifold assembly 26 has been designed to reduce assembly time and facilitate servicing in the field and that some connection may be required prior to initiating servicing procedures or during maintenance.

Referring now to FIGS. 3, 6, and 12, starting with the basic manifold body 31 with preformed fluid circuit 30 and built-in couplings threaded into the ports 32, 34, 36, 38, 50 and 52, the operator may connect the used fluid conduit 39 by pressing one end into the drain port 36 and the other end is inserted into or otherwise coupled to the used fluid tank 40. The supply conduit 41 is likewise coupled between the supply port 38 and the new fluid tank 42. The pump 24 may then be connected to the top side 33 of the manifold body by pressing in one end of the suction hose 54 into the suction port 50 and its opposite end into the suction side inlet of the pump 24. Similarly, one end of the pressure side hose 56 is pressed into the pressure port 52 its other end into the pressure side outlet of the pump 24.

With continued reference to FIG. 12, the connector nipples of the valves, pressure sensor, and filter components may then be screwed into their respective threaded ports on the manifold body 31. More specifically, the drain/bypass valve 70 is threaded into the port 65 to place the valve inline with the drain and bypass fluid paths, 57 and 80 respectively. The inlet of the valve 70 is aligned with the terminal end of the pre-filter bore 34. The first outlet of the valve 70 corresponding to position 66 is aligned with the inlet to bore 72 and the second outlet of the drain/bypass valve 70 corresponding to position 68 is aligned with the inlet to the recirculation loop 80. Likewise, the dump/supply valve 84 is screwed into threaded port 85 on the upper side 33 of the manifold body to place such valve in fluid communication with the supply and dump paths, 93 and 95 respectively. The first inlet of valve 84 corresponding to position 81 is aligned with the exit of pre-valve bore 82 and the second inlet of valve 84 corresponding to position 83 is aligned with the exit to bore 91. The outlet of valve 84 is aligned with the entrance to post-valve bore 86. The nipple of the pressure switch 108 is also threaded into its respective threaded aperture 109 on the top side 33. On the bottom side 35 of the manifold body 31, the filters 60 and 88 are screwed onto their respective nipples 67 and 90 until their respective gaskets are flush with the undersurface of the manifold providing a suitable seal. The entry port of the drain filter 60 aligns with the aperture occurring at the end of the pre-drain bore 34. The entry port of the supply filter 88 aligns with the aperture occurring at the end pre-supply filter bore 87. The filters are preferably of the ten micron absolute variety and the threaded nipples are preferably constructed using metric threads to inhibit a service technician from bypassing the filters. Such filters also act as maintenance indicators as fluid servicing procedures will take longer as the filters become more and more clogged obstructing fluid flow.

Each of the electrical leads of the pump 24, valves, 70, 84, and sensor 108 along with the other DC powered components may then be placed in electrical communication with the controller 28 and battery cables 120 via the wiring harness.

When the service technician is prepared to service an automobile transmission, with reference to FIGS. 1–3, and 6, the new fluid tank 42 and used fluid tank 40 may initially be empty. The servicing apparatus 20 is initially prepped for servicing by filling a quantity of new transmission fluid through a fill hole (not shown) into the new fluid tank 42. For purposes of this operational procedure, it will be assumed that the used fluid tank 40 is initially empty and the new tank 42 has an adequate supply of transmission fluid to perform a complete exchange. The servicing apparatus 20 is wheeled over near the transmission to be serviced. Using well known procedures, the service technician interrupts the transmission cooling lines to expose an influent line or inlet port and an effluent line or outlet port and connects the free ends to the return and exhaust ports 34 and 32 of the manifold assembly 26 using the service hoses 44 and 46 using conventional adapters if necessary. Preferably, the technician connects the effluent line of the transmission to the return port 34 and further connects the influent line at one end to the exhaust port 32 such that the connection places the transmission in fluid communication with the fluid passages 57, 80, 93, and 95 of the servicing apparatus 20 (FIGS. 1, 6, and 8–11). It will be appreciated that the service hoses 44, 46 are preferably clear allowing an operator to visually check the condition of the fluid in each hose. The default position of the drain/bypass valve 70 is the bypass position 68 blocking off the drain path 57 so that fluid flow from the transmission will circulate through fluid passage 80 in the direction of arrow 59 initially when the vehicle engine is turned on to activate the transmission pump (FIG. 8).

With continued reference to FIGS. 6 and 8, once the service hoses 44, 46 are connected, the technician may then connect battery cables 120 to the vehicle battery to supply power to the control panel 130, controller 28, drain/bypass valve 70, dump/supply valve 84, pump 24, sensors 100, 102, 108, all of which are preferably selected to run on a 12-volt DC power supply. Using the versatile servicing apparatus 20, the technician may perform several servicing procedures including circulation and clean, automatic transmission fluid exchange by draining and refilling the transmission in incremental steps, draining and refilling the transmission pan, topping off fluid levels, and draining the new and used fluid tanks. It will be appreciated that the following procedures are performed using only a single common pump 24 operating in conjunction with the vehicle transmission pump for some procedures.

In the initial stage after the service hoses 44 and 46 are connected to the return and exhaust ports 34 and 32 and transmission cooling lines, the operator may press the cycle sensors button 186 to actuate the valves 70 and 84 through their full range of movement to clear any obstacles, debris, or other contaminants that may prevent performance.

With battery cables 120 connected, the operator may start the vehicle engine to operate the transmission pump and to pressurize fluid out of the transmission to begin circulating fluid through circulation passage 80. This is commonly referred to as circulation mode during which the pressure switch 108 in normally inactive. Depending on the transmission pump and direction of fluid flow, used fluid from the transmission is forced out into the recirculation passage 80 from either the return port 34 or the exhaust port 32. Fluid will either flow in the direction of arrow 59 or in a reverse direction. The fluid exits the recirculation passage 80 from the opposite port wherein fluid is entering and reenters the transmission through the associated servicing hose. The check valve 92 prevents the used fluid from entering the servicing apparatus pump 24. At this point a closed circulation loop between the vehicle transmission cooling lines and servicing apparatus 20 is established and the running indicator 162 lights up on the control panel 130. It will be appreciated that the used transmission fluid is directed through the filter 60 to remove particulate from the used fluid during this initial procedure.

While the fluid is circulating, the operator may then select the quantity of fluid to be changed via the control board 130 connected to the processor/controller 28 by depressing the quantity button 178 until the indicator 150, 152, 154, or 156 beside the desired quantity illuminates (FIG. 2). Assuming for example, a full-sized 8-cylinder vehicle is being serviced, the operator selects the 20 quart quantity by toggling the quantity button until the desired indicator lights up. In this instance, the 20 quart indicator 150 will light up on the control panel. At this point, the pump 24 is not running and fluid is only being circulated by the transmission pump.

Turning now to FIGS. 2, 6, 8, and 10, having selected the quantity to be exchanged, the operator presses the start exchange/options button 144 on the control panel 130 of the servicing apparatus 20, which causes several actions to occur. Initially, the controller 28 energizes the drain/bypass solenoid 70 to move from the bypass position 68 to the drain position 66 to block off the recirculation passage 80 and open the drain path 57. If the service hoses have been connected properly, used fluid entering the return port 34 under pressure from the transmission pump is directed through the drain path 57, along the direction of arrow 58, through the drain port 36 and used fluid conduit 39 connected thereto to be collected in the used fluid collection tank 40. Once the valve 70 is energized to the drain position 66, the controller 28 will take a reading of the used fluid tank sensor 102 to sense the hydrostatic pressure head therein (FIG. 6). If no fluid is sensed in the used fluid tank 40, the controller will also take a reading of the signal transmitted from the pressure sensor 108 to determine if any fluid is entering the exhaust port 32 and is present in segment 94. With the signal stored showing no fluid in the used fluid tank, detection of fluid entering through the exhaust port 32 into the recirculation passage 80 is indicative of an improper hose connection. If that's the case, the processor 28 acts accordingly to alert the operator of an improper hose coupling condition by transmitting a signal to illuminate the switch hoses indicator 166 on the control board 130. It will be appreciated that an audible alarm may be programmed into the controller 28 to accompany this display or any of the displays to further alert the operator. The operator may then turn the vehicle engine off and manually switch the service hoses 44 and 46 between the respective ports 32 and 34. Once the hoses are switched the operator restores the servicing apparatus 20 to circulation mode as described above.

On the other hand, if a no pressure signal is transmitted by the pressure switch 108 to the processor after the drain process is initiated and no fluid is detected by the sensor 102 in the used fluid tank 40, the shift to neutral indicator 168 is illuminated. This occurrence may be due to the fact that, for instance, many Chrysler transmissions pump fluid only when in neutral. If the switch hoses indicator 166 and the shift to neutral indicator 168 have not lit, then the hoses are connected properly and proper fluid flow has been established. The transmission may then be serviced.

Assuming these error conditions do not occur, when the start button 144 is pressed the transmission pump will force the fluid from the return port 34 through the filter 60 into the drain passage 57 and through the solenoid valve 70 set in the drain position 66 (FIGS. 6 and 10). Used fluid passing through the solenoid 70 is directed to the drain port 36 in the direction of arrow 58 and expelled into the used fluid tank 40. The level sensor 102 in the used fluid tank transmits a signal proportional to the level of the fluid entering into the used fluid tank to the processor 28 by sensing the hydrostatic pressure head of the fluid entering the used fluid tank. The pressure head data is used to calculate the volume of fluid in the used fluid tank as the known parameters of the tank geometry and fluid density stored in the processor are recalled by a volume calculation routine. In this exemplary embodiment, once $9/10$ of a quart is collected in the used fluid tank 40 as calculated by the processor 28, the processor will energize the drain/bypass solenoid 70 to reenter the bypass position 68 blocking off the drain passage 57 and forcing the fluid into the recirculation passage 80 in the direction of the arrow 59. Other predetermined quantities could also be used. The processor 28 then initiates an incremental fill mode.

Turning now to FIGS. 2, 6, and 11, to perform the incremental fill portion of the process, the processor 28 will actuate the dump/supply solenoid 84 to cause it to assume the supply position 81 to open the new fluid supply path 93 from the new fluid tank 42 through the servicing apparatus pump 24 to the exhaust port 32 to the transmission via servicing hose 46. The processor also actuates the pump 24 at this time withdrawing fluid from the new fluid tank 42 in the direction of arrow 61 and through the suction port 50 and suction hose 54 to the pump. Fresh fluid is then pumped out of the pump through the pressure hose 56 to pressure port 52. Such fresh fluid is directed under pressure through the supply filter 88 and one-way check valve 92 and, because it can not enter the drain/bypass solenoid 70 due to incoming fluid pressure, is directed through the exhaust port 32 to the vehicle's transmission via service hose 46. When the level in the new fluid tank is lowered an amount corresponding with $9/10$ of a quart, the level sensor 100 will transmit a signal to the processor 28 which is programmed to respond to shut off the internal pump 24 and then shift the drain/bypass solenoid 70 back into the drain position 66 to repeat the incremental drain procedure.

This drain then fill process continues in an alternating, iterative manner as the processor 28 periodically responds to discrete drops in the level of fluid sensed by the fluid sensor 100 in the new fluid tank. When the quantity of the new fluid transferred out of the new fluid tank equals the preselected quantity initially set by the operator, and indicated by one of the quantity indicators 150, 152, 154, or 156, the processor will energize an exchange complete indicator 164 on the control board 130 and actuate an audible signal (FIG. 2). The processor 28 then shifts the drain/bypass solenoid 70 to the bypass position 68 to switch the servicing apparatus 20 to the recirculation mode and circulates fluid through the recirculation passage 80. As before, during recirculation mode, the internal pump 24 is deactivated.

In this exemplary procedure, the processor is operative to, in discrete $9/10$ quart increments, transfer a total of 20 quarts of fluid to the used fluid tank 40 and an equal volume of new fluid is withdrawn from the new fluid tank 42. Responsive to the exchange complete indicator, the operator will turn the engine off and disconnect the service hoses 44, 46 from the servicing apparatus 20. The operator will then reconnect the vehicle transmission cooling loop to complete the servicing procedure. It will be appreciated that upon the operator depressing the start button 144, the entire fluid exchange procedure will be performed automatically without further operator intervention until he or she turns the engine off and reconnects the transmission cooling lines, assuming no error in connection was detected. In addition, to prevent an overpressure condition during fluid exchange or other servicing procedures, a pressure relief valve (not shown) may be placed in communication with the fluid circuit 30 and set to relieve in response to a preselected pressure to route over pressurized fluid through a bypass. It will be appreciated that the alternating drain and fill exchange process takes place rapidly and an entire exchange for an eight cylinder vehicle can take place in approximately 10–15 minutes.

Such fluid exchange will typically leave the new fluid tank 42 empty or partially empty and the used fluid tank 40 partially full or completely full depending on the tank capacity. Should the operator then attempt to start another servicing procedure and select an exchange quantity that exceeds the amount of fluid remaining in the new fluid tank 40, the processor 28, having taken a reading of the new fluid sensor 100, will transmit a signal to the control board 130 to illuminate the new ATF low indicator 170 to alert the operator that there is insufficient fluid in the new fluid tank 42 to perform the selected procedure (FIGS. 2 and 6). To refill the new fluid tank 42, the operator may supply new fluid through its fill hole. During this procedure, the processor functions to illuminate the Add/Remove ATF indicator 174 alerting the operator that fluid is being added to the new fluid tank 42.

On the other hand, should the operator select an exchange quantity that would overflow the capacity of the used fluid tank 40, the processor, having taken a reading of the used fluid sensor 102, will transmit a signal to the control board 130 to illuminate the used AFT full indicator 172 alerting the operator to drain the used fluid tank before proceeding. Conveniently, the fluid circuit 30 and common pump 24 enable such draining or dumping of the used fluid tank 40 without the assistance of a dedicated drain pump.

Referring now to FIGS. 1, 2, and 9, to initiate the used fluid dump procedure, the operator will connect one end of the servicing conduit 46 to the exhaust port 32 and place the free end of the servicing conduit into a fluid waste tank (not shown). The operator will then depress the options button 142 on the control panel 130 to scroll through the options menu (OP1–OP9) until the desired option is displayed in the counter display 136. In this scenario, the OP4 option code would be displayed in the counter display 136 indicating that the operator has elected to drain the used fluid tank. Conveniently, the operator may refer to the option menu 132 imprinted on the left side of control panel 130 to determine the procedure associated with the option code. Next, the operator may engage the start button 144 to begin the used fluid dumping procedure. In response to the operator's command, the controller 28 energizes the dump/supply valve 84 to its dump position 83 to open the dump passage 95 and then actuates the pump 24 to begin drawing fluid from the used fluid tank 40 through the open dump passage in the direction of arrow 63. The fluid is expelled through the exhaust port 32 through the servicing conduit 46 and into the storage receptacle. Once the controller 28 detects the used fluid tank is at a predetermined bottom operating level via the used fluid level sensor 102, the controller will shut the pump 24 off and terminate the procedure. By pressing the start button 144 for five seconds the operator can effect draining of the used fluid collection tank 40 until the stop button 188 is pressed. An audible alarm sounds when the used fluid tank level is empty as sensed by the used fluid sensor 102 and illumination of the complete indicator 164 on the control panel 130 alerts the operator that the dump procedure is completed. It will be appreciated that the plumbing circuit of the exemplary embodiment enables draining of the used fluid tank without the necessity of inverting the tank upside down to drain from its top end or incorporating an extra dedicated drain pump to draw the used fluid from the used fluid tank and direct it to a waste fluid collection receptacle.

In a similar manner, the new fluid tank 42 may also be drained completely as desired. Referring now to FIGS. 1, 2, 6, and 11, as described for the used fluid tank 40 dumping procedure, one end of the servicing conduit 46 may be connected to the exhaust port 32 and its free end placed into a new fluid storage receptacle (not shown). In this scenario, the operator may toggle the options button 142 until OP3 is displayed in the display counter 136. Activation of the exchange/options button 144 will cause, the controller 28 to shift the dump/supply valve 84 to its supply position 81. The pump 24 is also actuated and fluid is drawn from the new fluid tank 42 along the supply passage 93 in the direction of arrow 61 to be expelled through the exhaust port 32. The expelled fluid is transferred through the servicing hose 46 to the new fluid receptacle for storage. The processor 28 is responsive to the sensor 100, sensing that the fluid level in the new fluid tank has fallen to a predetermined bottom operating level to shut the pump 24 off and terminate the drain new fluid procedure. The operator may then press and hold the start button 144 for five seconds to initiate a full drain of the new fluid tank 42 until the stop button 188 is pressed. An audible alarm sounds when the new fluid tank level is empty as sensed by the new fluid sensor 100 and the complete indicator 164 is illuminated by the processor on the control board 130 (FIG. 2).

Turning now to FIGS. 2 and 6, it will be appreciated that the operator may check the new fluid volume and used fluid capacity as calculated by the controller 28. To display the new fluid volume in the new fluid tank 42, the operator may depress the options button 142 and scroll through the options menu until OP5 is displayed in the counter display 136. The operator may then simply depress the start exchange/options button 144 and the new fluid level sensor 100 sends a signal to the controller 28 which processes the signal and displays the new fluid level in the counter display 136 in the measurement selected (quarts or liters). Likewise, to check the remaining capacity in the used fluid tank 40, the operator may select OP6 using the options menu button 142 and then depress the start button 144. The used fluid level sensor 102 will detect the used fluid level in the used fluid tank 40 and transmit the corresponding signal to the controller 28. The signal is processed and the remaining capacity is calculated and displayed on the counter display 136. These features may be used by the operator prior to initiating a servicing sequence or in response to an indicator light from the control panel concerning fluid levels or any other time as selected by the operator.

With continued reference to FIGS. 1 and 6, prior to beginning a servicing sequence, the operator may desire to auto prime the servicing apparatus 20. This feature is used to purge air out of the system. Preferably, at least six quarts of new fluid must be present in the new fluid tank 42 to initiate this procedure. After ensuring the proper fluid level in the new fluid tank, the operator connects one end of each servicing hose 44 and 46 to the respective return and exhaust ports 34, 32 and connects the free ends of the hoses together with a priming hose (not shown) to complete the circulation loop. The operator then selects OP7 by toggling the options menu button 142 and then depresses the start button 144. During the auto prime procedure, the controller 28 will actuate the pump 24 to begin drawing fluid from the new fluid tank 42 through the supply path 93 and expelling fluid through the exhaust port 32. The expelled fluid is transferred through the servicing hoses 46 and 44 and interconnecting priming hose (not shown) to the return port 34. During this fluid transfer, the controller 28 cycles the drain/bypass valve 70 between first and second positions 66 and 68, respectively to build up bursts of pressure to purge unwanted air in the servicing apparatus 20. Once three quarts of fluid have been transferred to the used fluid tank 40, the procedure is terminated by the controller 28. Such procedure is typically initiated prior to a fluid exchange.

Referring now to FIG. 2 and 6, another set of features engageable through the control panel 130 include filling the and draining transmission pan without removing the pan. In order to perform a quick fill of the transmission pan, the servicing hose 46 is connected between the exhaust port 32 and an interrupted influent cooling line or filling port of the transmission. The operator may then select OP1 using the options menu button 142 and depress the start button 144 to initiate the process. The controller 28 energizes the dump/supply valve 84 to the supply position 81 and actuates the pump 24 to transfer fluid from the new fluid tank 42 in a one quart increment to the transmission (FIG. 11).

To drain the transmission pan, the servicing hose 44 is connected between the return port 34 and an interrupted effluent transmission cooling line or outlet. OP2 is selected by the operator using the options menu button 142 and the operator may then depress the start button 144. Drain/bypass valve 70 is energized by the controller 28 to drain position 66 establishing an open drain path 57 (FIG. 10). The operator may then turn the vehicle ignition on to start the transmission pump forcing fluid out through the transmission effluent line and into the return port 34 through the drain path 57, in the direction indicated by arrow 58, to be collected in the used fluid tank 40. Once a quart has been removed as detected by the used fluid level sensor 102 and determined by the processor 28, the complete indicator 164 on the control board illuminates alerting the operator to terminate the procedure.

Two other options may be used to check the new and used fluid sensors 100 and 102, respectively. To access the new fluid sensor check, the operator may access the options menu 132 by depressing the options menu button 142 until OP8 is displayed in the counter display 136. The operator then depresses the start exchange/options button 144. The new fluid level sensor 100 will transmit a signal to the controller 28 corresponding to the fluid volume in the new fluid tank 42. An absolute reading, which is typically between 300 and 4096 fluid units, will be displayed on the display counter 136. The start button 144 is then depressed again to zero the absolute reading. A measured quantity of new fluid such as one quart is poured into the new fluid tank 42 through the fill hole. A new reading corresponding to the amount of fluid poured into the new fluid tank is measured by the processor 28 via the new fluid sensor 102 and displayed on the counter display 136. For example, if one quart is added, the counter display 136 should read 78 fluid units. Any other reading indicates the sensor may need to be replaced or recalibrated.

A similar procedure may be used to check the used fluid level sensor 102. In this scenario, the operator selects OP9 in the display counter 136 using the options menu button 142 and depresses the start button 144. An absolute reading is displayed and then zeroed by depressing the start button 144 again. A known quantity of fluid is poured into the used fluid tank 40 which is measured by the used fluid level sensor 102 and displayed on the display counter 102. If the quantity displayed does not correspond to the amount poured in then the operator is alerted that the used fluid sensor may need to be replaced or recalibrated.

Another convenient feature programmed into the controller 28 is the totalizer. Such feature keeps track of the number of fluid units passing through the servicing apparatus 20. The total amount may be displayed in the display counter 136. As the display counter may only display a certain number of digits, a separate rollover counter is displayed indicating how many times the counter has reached its numerical limit. For example, if two digits were dedicated to the totalizer display, a display reading of "2" is displayed initially and is followed by a "78". Such display indicates the servicing apparatus has circulated 278 quarts of fluid. Advantageously, this feature enables the operator to develop a maintenance or replacement plan for the servicing apparatus 20 and its components. This feature is accessible through depressing the stop button 188 for approximately 5 seconds.

The capability for smaller increment level adjustments is also conveniently built into the servicing apparatus 20. For example, if during an exchange operation, the operator elects to top off the transmission fluid level with the hose 46 connected between the exhaust port 32 and the transmission influent line or inlet, the operator may depress the add ATF button 182 on the control panel 130 (FIG. 2). In response, the controller 28 commands the dump/supply valve 84 to the supply position 81 and further commands the pump 24 to actuate such that a predetermined amount of new fluid is transferred along the supply path to the transmission (FIG. 11). It has been found that about $\frac{2}{10}$ of a quart is a sufficient amount for such incremental fluid transfers although it will be appreciated that other suitable levels may be used. Once the predetermined amount has been removed from the new fluid tank 42, the controller 28 shuts the pump 24 off to terminate the transfer.

To withdraw a relatively small increment of used fluid from the transmission, the operator selects the remove ATF button 184 on the control panel 130 while the vehicle transmission is running and the hose 44 is connected between the return port 34 and the transmission effluent line or outlet (FIGS. 2 and 10). The controller 28 will then command the drain/bypass valve 70 to assume the drain position 66 such that used fluid is transferred from the transmission under the pressure of the transmission pump through the return port 34 to the used fluid tank 40 in the direction of arrow 58 through the drain path 57 upon turning the vehicle engine on. Once a $\frac{2}{10}$ of a quart or other predetermined increment is added to the used fluid tank 40, the controller 28 actuates the valve 70 to bypass position 68 to direct the fluid through the bypass/recirculation pathway 80.

It will be appreciated that the present embodiment is designed to detect reverse flow without harming the apparatus, transmission, or operator, and to prevent fluid exchange until the fluid flow is conducted in a direction wherein the effluent flow from the transmission passes into the return port 34 and the influent flow to the transmission comes from the exhaust port 32. While such features have been provided in the servicing apparatus 20 to minimize operator intervention and facilitate maintenance of the servicing apparatus and alert the operator to error conditions, as discussed above, it is contemplated that an operator may on occasion inadvertently couple the service hoses 44 and 46 between the transmission and servicing apparatus 20 incorrectly thus creating a reverse fluid circulation condition. While this may be adequately handled as described above with an alert to the operator, other ways of handling this condition are also contemplated by the present invention.

Cross Flow Operation

As discussed above, it is foreseeable that an operator may inadvertently connect the hoses 44 and 46 improperly and upon initiating an exchange procedure, a switch hoses indicator 166 would illuminate on the control board 130 to alert the operator to the error condition indicating that fluid is flowing in a direction opposite to direction of arrow 59. The operator may then turn the engine off and manually switch the hoses 44 and 46 by disconnecting and reconnecting them to the proper return and exhaust ports 34 and 32. The technician may then restart the vehicle and initiate the fluid exchange as described above.

Figure 7:
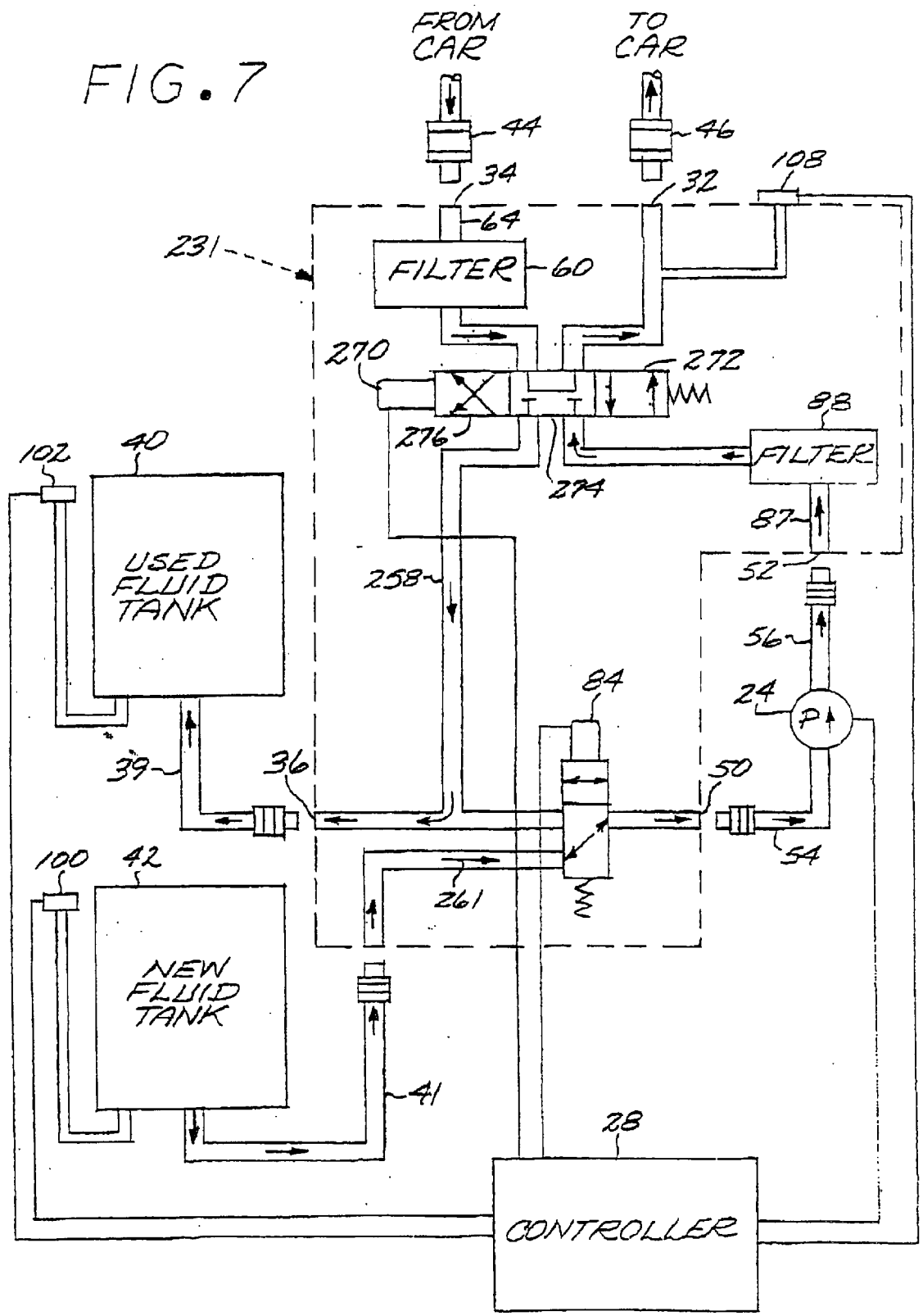
FIG. 7 is a schematic of an alternative plumbing circuit for performing servicing procedures in accordance with an alternative embodiment of the automotive fluid servicing apparatus of the present invention.

Referring now to FIG. 7, wherein like components are like numbered, a second exemplary embodiment of the present invention includes an alternative manifold body 231 for avoiding the necessity of manually switching the hoses 44 and 46. In general, this alternative embodiment is constructed the manner as the first manifold body 31 described above with the exception that an alternative valve 270 has been substituted in place of the drain/bypass valve 70 of the first embodiment. Such alternative valve 270 is preferably a 3-position, 4-way, magnetic solenoid valve with cross flow capabilities. The crossflow valve 270 includes a normal fluid exchange position, indicated by directional arrows 272, a bypass position, indicated by a U-shaped symbol 274, and a cross flow fluid exchange position, indicated by directional arrows 276.

With continued reference to FIG. 7, when energized to the normal fluid exchange position 272 by the processor 28, used fluid entering the return port 34 is transferred to the used fluid tank 40 and new fluid withdrawn from the new fluid tank 42 may be transferred to the exhaust port 32 in a manner similar to that described above in the first embodiment. This is effectively the same as the fluid exchange flow along the drain path 57 and supply path 93 as in the first embodiment as illustrated in FIGS. 6, 9, and 11.

If, however, the controller 28 energizes the alternative valve 270 to the bypass position 274, the servicing apparatus 20 is placed in a bypass/recirculation mode similar to the recirculation path 80 illustrated in FIG. 8. Thus fluid may be circulated between the transmission and servicing apparatus as described above with service hoses 44 and 46 connected between the return port 34, exhaust port 32 and transmission influent and effluent lines. Fluid being circulated during this mode may circulate in either direction as determined by the flow from the transmission.

Figure 13:
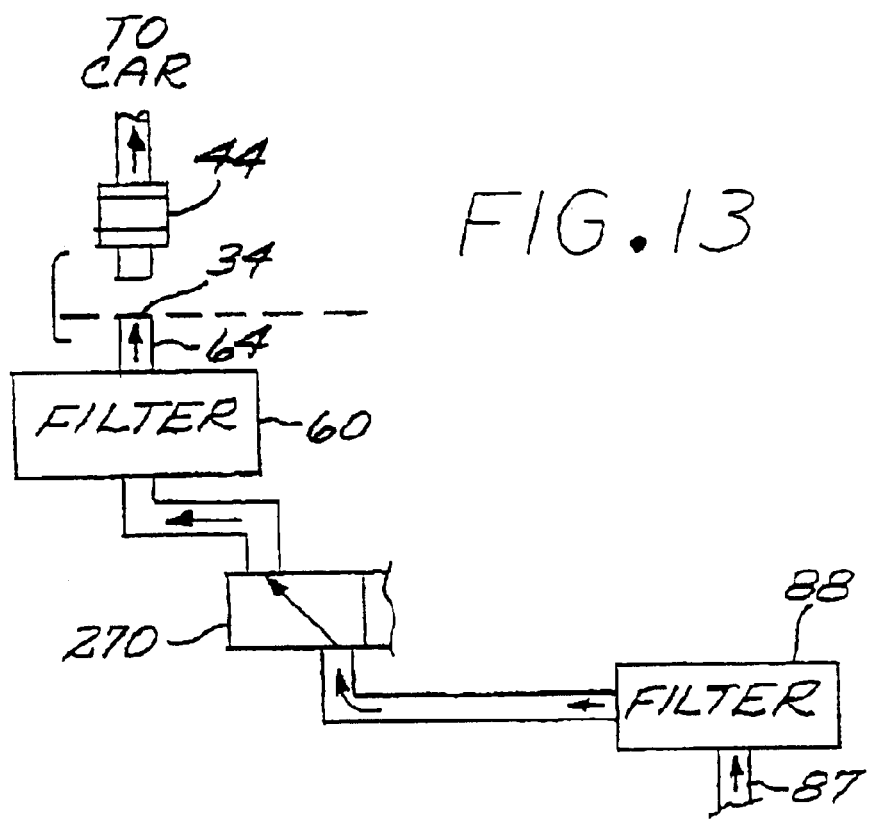
FIG. 13 is a partial sectional view taken from FIG. 7 illustrating a plumbing segment for accommodating a reverse hose flow configuration.
Figure 14:
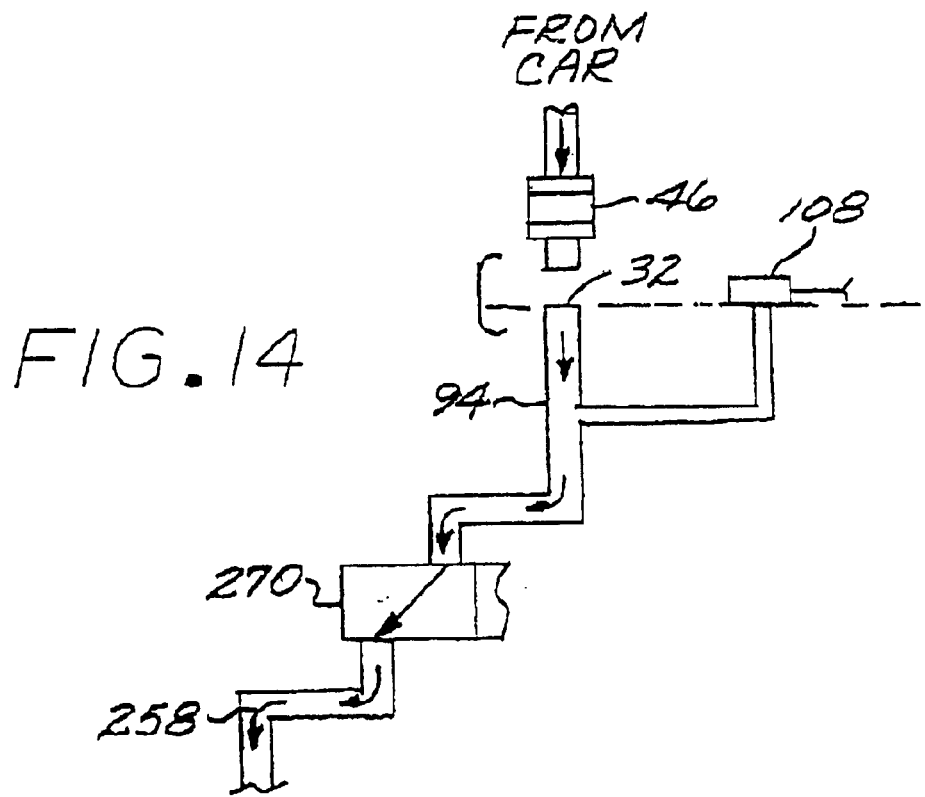
FIG. 14 is a partial sectional view taken from FIG. 7 illustrating another plumbing segment for accommodating a reverse hose flow configuration.

Referring now to FIGS. 2, 7, and 13–14, in those instances where the operator has incorrectly coupled the servicing hoses 44 and 46 to the servicing apparatus 20 so that used fluid enters through the exhaust port 32 instead of the return port 34 and the start button 144 on the control panel 130 is depressed, the controller 28, upon receiving a signal that no fluid is entering the used fluid tank 40 and detecting fluid pressure via the pressure sensor 108, reacts accordingly by energizing the crossflow valve 270 to assume its cross flow position 276. As shown in FIGS. 7 and 14, in this position, it will be appreciated that fluid entering through the exhaust port 32 will be directed through the solenoid 270 to cross over to the drain path, generally designated 257, to flow in the direction indicated by arrow 258, where the used fluid may then be expelled through drain port 36 to be collected in the used fluid tank 40. In such scenario, service hose 46 is an inhose and port 32 is an inflow port. Likewise, new fluid supplied from the pump 24 in the supply path, generally designated 293, to flow in the direction indicated by arrow 261, and passing through filter 88 flows through the check valve 92 and cross over valve 270 and is directed to the return port 34 which in this scenario operates as an outflow port and hose 44 is an outhose (FIGS. 7 and 13). With the solenoid 270 configured in the cross position 276, normal transmission fluid exchange procedures may be performed as described for the first embodiment above. Thus, it will be appreciated that such valve 270 enables the operator to connect the hoses 44 and 46 without concern as to the flow direction as determined by the transmission configuration. Once the controller 28 establishes the proper valve position 272, 274, or 276, all servicing procedures may be performed as described above for the first embodiment.

Figure 15:
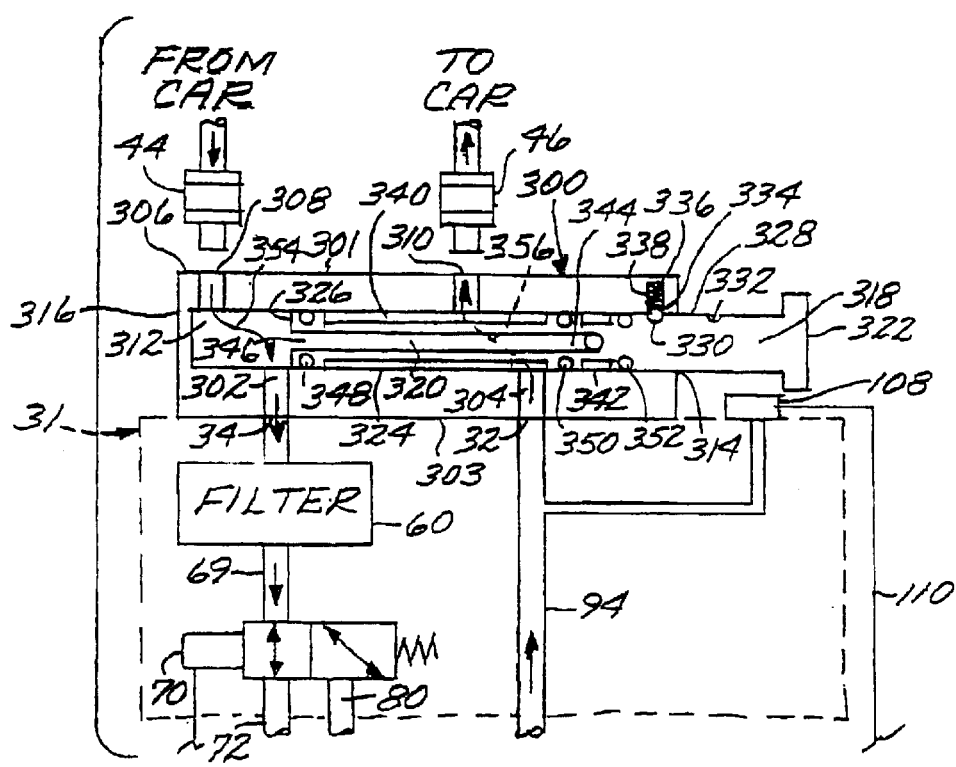
FIG. 15 is a partial sectional view taken from the plumbing circuit in FIG. 6 including an auxiliary valving component in a first position illustrating an exemplary fluid distribution path.
Figure 16:
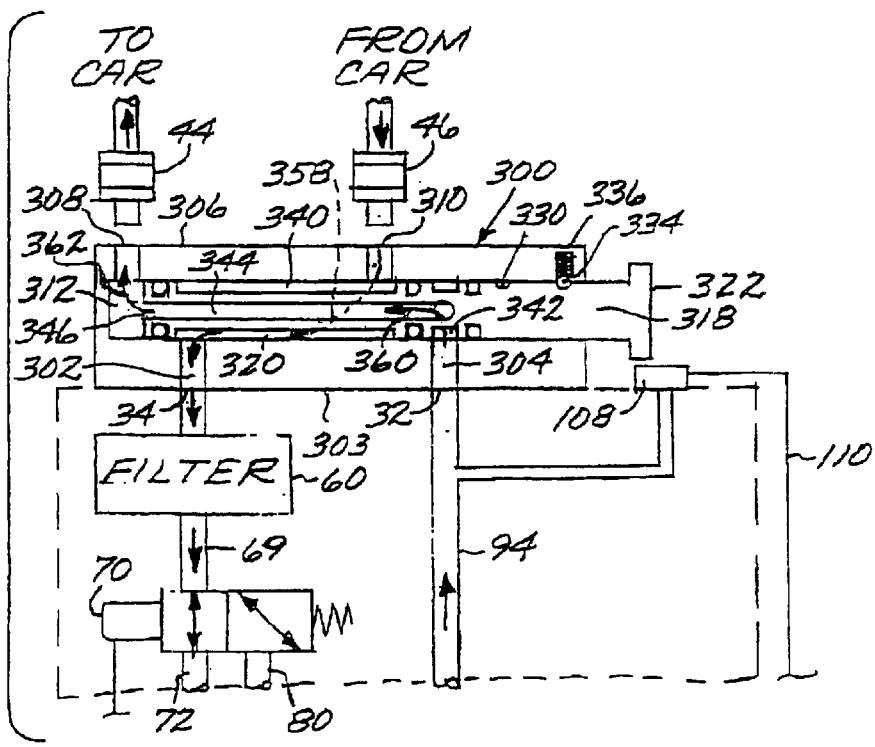
FIG. 16 is a similar view as illustrated in FIG. 15 including the auxiliary valving component in a second position illustrating an alternative exemplary fluid distribution path.

Referring now to FIGS. 15–16, wherein like components are like numbered, an alternative valving component, generally designated 300, may be used in conjunction with a plumbing circuit, such as that illustrated in FIG. 6, to provide normal drain, supply, and fluid exchange capability as well manually controlled cross over flow capability in the event the servicing hoses 44, 46 are coupled incorrectly to the return port 34 and exhaust port 32 of the servicing apparatus 20.

In general terms, the manual cross over valve 300 includes a rectangular housing 301 mounted to the manifold 31 of the servicing apparatus 20 using conventional fasteners such that an inner surface 303 of the housing abuts the manifold 31 and an outer surface 306 projects outside the cabinet 22 exposing an auxiliary return port 308 and an auxiliary exhaust port 310 which are constructed similarly to the return port 34 and exhaust port 32 to receive the free ends of the servicing hoses 44 and 46. The inner surface 303 of the housing 301 includes a first passthrough port 302 aligned with the inlet to the return port 34 and a second passthrough port 304 aligned with the outlet of the exhaust port 32 of the manifold 31. Alternatively, rigid or flexible fluid couplings may be connected between the passthrough ports and the exhaust and return ports to provide fluid communication therebetween. Thus, the valve 300 does not have to be mounted directly to the manifold. Each of ports 302, 304, 308, and 310 projects inwardly from their respective inner or outer surfaces into the housing and terminates at a central, cylindrical bore 312 projecting longitudinally throughout the housing from an open end 314 to a closed end 316. Thus fluid entering any one of these ports may be communicated inwardly to the central bore 312. Within the bore 312 partially resides a cylindrical plunger 318 or valve body including a hollow elongated section 320 slidably received in the bore and which transitions to an enlarged push/pull knob 322 near the open end 314 of the bore. The knob is positioned outside the housing for access by the operator to manually move the plunger through the bore. A reduced diameter stem 324 projects along the length of the elongated section between an enlarged flared end 326 proximate the closed end 316 of the bore 312 and an opposing enlarged elongated locking end 328 proximate the open end 314 of the bore. The outer surface of the locking end includes a normal position detent 330 and a cross flow position detent 332 which cooperate with a ball bearing 334 forced outwardly by a coil spring 336 set in a slot 338 projecting radially outwardly from the inner surface of the bore 312 to releasably lock the plunger in a normal flow configuration (FIG. 15) or a cross flow configuration (FIG. 16).

A fluid transfer gap 340 is formed between the inner surface of the central bore 312 and outer surface of the reduced diameter stem 324. The plunger 318 further includes a cross over diverter port 342 which may be aligned with the second passthrough port 304 to receive fluid exiting the exhaust port 32 and entering the second passthrough port into a cross over canal 344 projecting through the hollow plunger. The cross over canal may direct fluid entering the diverter port 342 through the plunger and out of the open end 346 of the plunger near the closed end 316 of the central bore 312 where the fluid may then be directed out the auxiliary return port 308. Inner, middle, and outer O-rings 348, 350, and 352 inhibit undesirable leakage of the fluid from the housing 301.

As will now be described, the plunger 318 and housing 301 cooperate to form a two-position manually controlled valve to be used in conjunction with the manifold 31. Referring now to FIG. 15, in normal use, the plunger 318 is selectively positioned by the operator grasping and pulling the knob 322 away from the housing 301 such that the ball bearing 334, as forced outwardly by the coil spring 336, nests partially within the inner detent 330. The servicing hose 44 is connected from the transmission outlet to the auxiliary return port 308 and the service hose 46 is connected between the transmission inlet and the auxiliary exhaust port 310. Assuming the hoses have been connected properly, in this normal valve configuration, fluid exiting the return hose 44 is directed into the auxiliary return port 308 along the direction of arrow 354 and into first passthrough port 302 and then is directed into return port 32 of the manifold 31 where the fluid may continue along the drain path or recirculation path as described above. It will be appreciated that in this normal configuration, fluid is blocked from exiting the cross over canal 344 as the diverter port 342 is not aligned with any of the ports in the housing. In addition, in this normal configuration, fluid exiting the exhaust port 32 of the manifold 31 is directed into the second passthrough port 304 and into the fluid transfer gap 340 around the reduced diameter stem 324 in the direction of arrow 356 to flow out the auxiliary exhaust port 310 and into the service hose 46. Such fluid may then be directed into the transmission or a waste collection tank as described above. In this configuration, the valve 300 merely acts as a passthrough for fluid entering and exiting the manifold from and to the servicing hoses.

Referring now to FIG. 16, if an alert of an improper hose connection is issued by the processor 28 from a reading of the used fluid tank 40 (FIG. 6) and pressure sensor 108 after the operator selectively initiates the fluid transfer process as described above, the operator may manually shift the plunger 318 by grasping the knob 322 and pushing it inwardly into the housing until the ball bearing nests partially within the cross flow detent 332. In this condition, service hose 44 is an outhose instead of an inhose and service 46 is an inhose instead of an outhose. With the plunger positioned for cross flow configuration, the diverter port 342 is aligned with the second passthrough port 304 and the first passthrough port 302 blocked off from the auxiliary return port 308, and thus fluid exiting service hose 46, as forced by the transmission pump, may be directed into auxiliary exhaust port 310, now providing a return port, and into the fluid transfer gap 340 around the stem 324 along directional arrow 358 and into the first pass-through port 302. The fluid is then directed into the return port 34 of the manifold 31 to be directed normally along the drain or bypass paths as described above. Fluid exiting the exhaust port 32 flows into the second passthrough port 304 to the diverter port 342 and into the transfer canal 344 along directional arrow 360. Such fluid exits the hollow end of the plunger along directional arrow 362 and out the auxiliary return port 308, now providing an exhaust port, and into service hose 44 to the transmission. Other than this adjustment if the servicing hoses 44 and 46 have been improperly connected, the servicing apparatus 20 is operated as described above.

While the above described embodiments serve particularly well in servicing automatic transmissions, the present invention further contemplates servicing other automobile fluid systems as well and provides such convenience in a single portable wheeled apparatus.

Power Steering Fluid Servicing

For example, referring now to FIGS. 4–5, another embodiment of the present invention will now be described. When an automobile is taken in for transmission servicing, it is typically necessary and convenient to exchange the power steering fluid at the same time. Advantageously, the present invention may incorporate additional plumbing to facilitate such a power steering fluid exchange. FIG. 4 illustrates the additional plumbing for adding fluid to the power steering fluid reservoir (not shown). Such new power steering fluid (PSX) circuit, generally designated 200, is a conduit or servicing hose with several inline components including a new power steering fluid tank 204 preferably having at least a two quart capacity, a new fluid filter 206, and a new power steering fluid pump 208 in fluid communication with one another and terminating at one end in a coupling 210 or free end for inserting into the open fill hole of the power steering reservoir. An inline ball valve 223 is provided proximate the hose end to open and close the PSX supply circuit 220 and prevent residual fluid in the conduit from leaking out inadvertently.

Turning now to FIG. 5, for removing fluid from the power steering reservoir, a PSX drain circuit, generally designated 220 is also provided. Such drain circuit is a servicing hose or conduit with several inline components including a drain pump 222, a used PSX filter 224 and terminating at one end in a coupling 222 or free end for insertion into the power steering fluid reservoir. An inline ball valve 225 is provided for opening and closing the drain circuit for similar purposes to ball valve 223. The other end of the PSX drain circuit is conveniently coupled to the used fluid tank 28 (FIG. 6) so that one common tank may accept either used transmission fluid or used PSX fluid. Such PSX supply pump 208 and PSX drain pump 222 are connected to the controller 28 (FIG. 6) which may actuate either pump. The PSX supply and drain pumps may also be powered by the battery cable 120 connection to a 12 volt DC power source such as the vehicle battery.

Referring now to FIG. 2, the operator may depress the power steering button 180 located on the control panel 130 to initiate a power steering fluid exchange by setting the servicing apparatus 20 in PSX mode. Alternatively, the power steering exchange may be performed using a remote pendant 230 having an "ADD" button 221 and a "DRAIN" button 227 (FIG. 1). Such pendant may be directly connected to the controller 28 via suitable electrical cabling or communicate with the controller using wireless technology including radio frequency or infrared communication. It is further contemplated that the ball valves 223, 225 may be coupled to the pendant 230 and remotely actuatable. Conveniently, when not in use, the pendant is releasably retained on the control panel using a removable magnetic holder 229 placed on the control board 130 in the pendant dock region 140 (FIGS. 1 and 2).

In operation, and with particular attention to FIGS. 1–2, 4 and 5, to exchange the power steering fluid in the power steering fluid reservoir, the following exemplary procedure may be used. The apparatus 20 is initially wheeled over near the vehicle and the operator attaches the battery cables 120 to the vehicle battery providing power to the servicing apparatus 20 and drain and supply pumps 208, 222. The operator may then depress the power steering button 180 to set the servicing apparatus 20 into power steering fluid exchange mode. "PS" will display in the display counter 136 on the control board 130 to indicate power steering mode is engaged. The cap of the power steering reservoir, and any screen, is removed. The operator may then start the vehicle ignition to start the engine running. The PSX drain coupling 222, which may be an open hose end is placed inside the power steering reservoir as is the supply coupling 210, also an open hose end. The hoses are preferably equal in length and are disposed near the bottom of the power steering fluid reservoir and are maintained at all times beneath the top fluid level in the fluid reservoir. Each ball valve 223, 225, of the respective supply and drain circuits 200, 220 are opened fully. Conveniently, the remote pendant 230 may be removed from its holder 229 and held by the operator to extend operator mobility. The magnetic holder may then be used to hold the hoses of the drain and supply conduits in place to prevent the hoses from tangling. With the ball valves 223, 225 open, the operator depresses the Add and Drain buttons 221, 227 on the pendant 230 alternately to repeatedly drain and fill the reservoir while observing the fluid level in power steering fluid reservoir (FIGS. 1, and 4–5). This flushes the old fluid out of the reservoir. With the engine still running, the operator turns the steering wheel fully to the left and right and then back to the center and then checks the fluid color in the reservoir. Using the pendant allows the operator to move between the steering wheel and fluid reservoir. The alternating drain and fill step and wheel turning step are repeated until a satisfactory fluid color is observed. During this process, the processor 28 monitors the used fluid tank 40 level via the used fluid sensor 102. If a used fluid tank overflow condition is anticipated, the processor 28 disables the drain button 227 on the pendant, illuminates the used fluid full indicator 172, and sounds an alarm.

Once the operator notes the desired fluid color indicating the exchange is complete, the operator may depress the ADD button 221 on the pendant to top off the power steering fluid reservoir. Alternatively, the operator may observes bubbles in the power steering fluid reservoir indicating that the new fluid supply has been exhausted. The operator may then turn off the engine off and replace the cap and screen, if any, on the power steering fluid reservoir. Depressing the power steering button 180 again resets the servicing apparatus to automatic transmission fluid exchange mode. It is apparent that the remote pump actuator conveniently allows the operator to move back and forth between the vehicle steering wheel and the power steering fluid reservoir as necessary.

It will be appreciated that system described herein is capable of performing a number of operations including draining the used ATF fluid from the transmission, adding new ATF fluid to the transmission, draining the used fluid tank, draining the new ATF tank, using a single common pump coupled to a fluid circuit provided by an integrated manifold assembly constructed to minimize assembly time. Additional plumbing features may also be introduced to perform cross flow situations as well as service the power steering reservoir with a servicing apparatus incorporating a minimal amount of components.

The common pump 24 is preferably a one-way 130 psi pump available from Shur-Flo. The power steering drain and fill pumps 208, 220 are also available from Shur-Flo and of a 45 psi variety. Other suitable pump varieties may also be used. The pressure switch is preferably set to about 6 psi and is available from the Nason Company.

It will be appreciated that the drain path 58 (FIG. 10) between the return port 34 and drain port 36 is formed almost entirely within the manifold body as is the recirculation path 59 (FIG. 8) between the return port 34 and exhaust port 32. Such paths only exit the manifold body to enter filter 60. In addition, much of the dump and supply path 61, 63, respectively, lengths are formed within the manifold body 31 as well with only a relatively short segment extending outside the manifold body to pass through the pump 24 or filter 88. Incorporation of a number of right angles in the pathways is formed using three longitudinally projecting bores which are perpendicular from the passages projecting from the ports on the rear and top surfaces of the manifold body 31. The bores ends are plugged during manufacture 192. By forming most of the fluid circuit within the manifold body, the hose length requirements are significantly reduced and the drawbacks of using hose segments such as those caused by high temperatures are effectively removed as well.

While a rigid manifold body having a preformed fluid circuit has been described in the exemplary embodiments described herein, it is contemplated that such manifold body could also be a hollow or a partially hollow shell incorporating flexible or rigid conduits internally between the various ports.

Alternative Integrated Pump and Manifold Assembly

In certain scenarios, it may be advantageous to omit the hose connections between the pump and manifold block and connect the pump directly to the manifold block. Such an arrangement reduces and hose length requirements as well as pressure drops occurring across lengths of hose thus facilitating higher pressure fluid transfers. As the time of fluid exchange may be increased by moving the fluid more swiftly between the fluid reservoir and the fluid servicing apparatus, the overall number of fluid exchange procedures per day may be increased. Assembly time and leakage due to the incorporation of flexible hose fluid couplings may also be reduced. Such integrated manifold and pump block assembly also simplifies maintenance and installation procedures.

Figure 31:
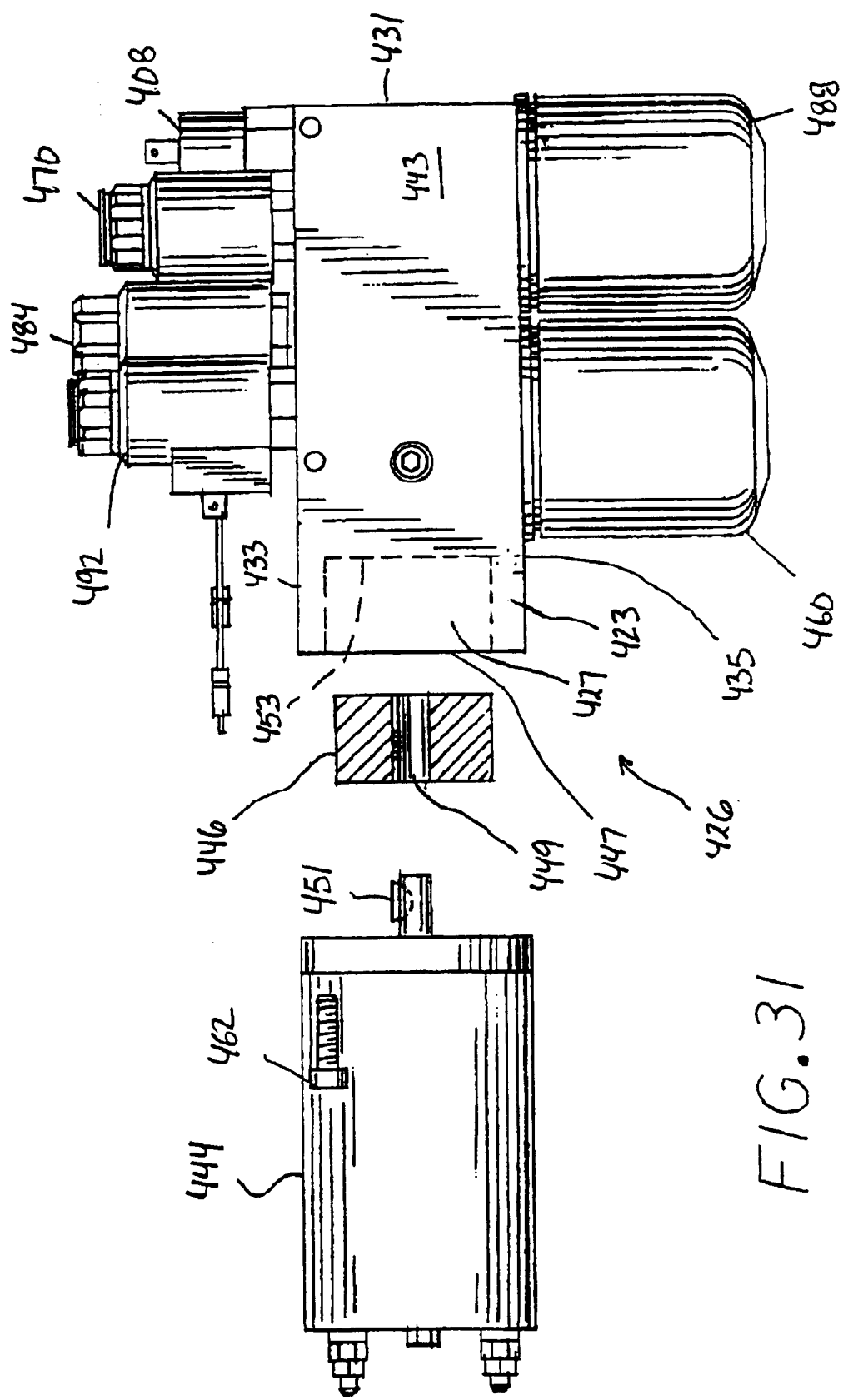
FIG. 31 is a partially exploded rear view, in enlarged scale, of the manifold assembly of FIG. 17.
Figure 32:
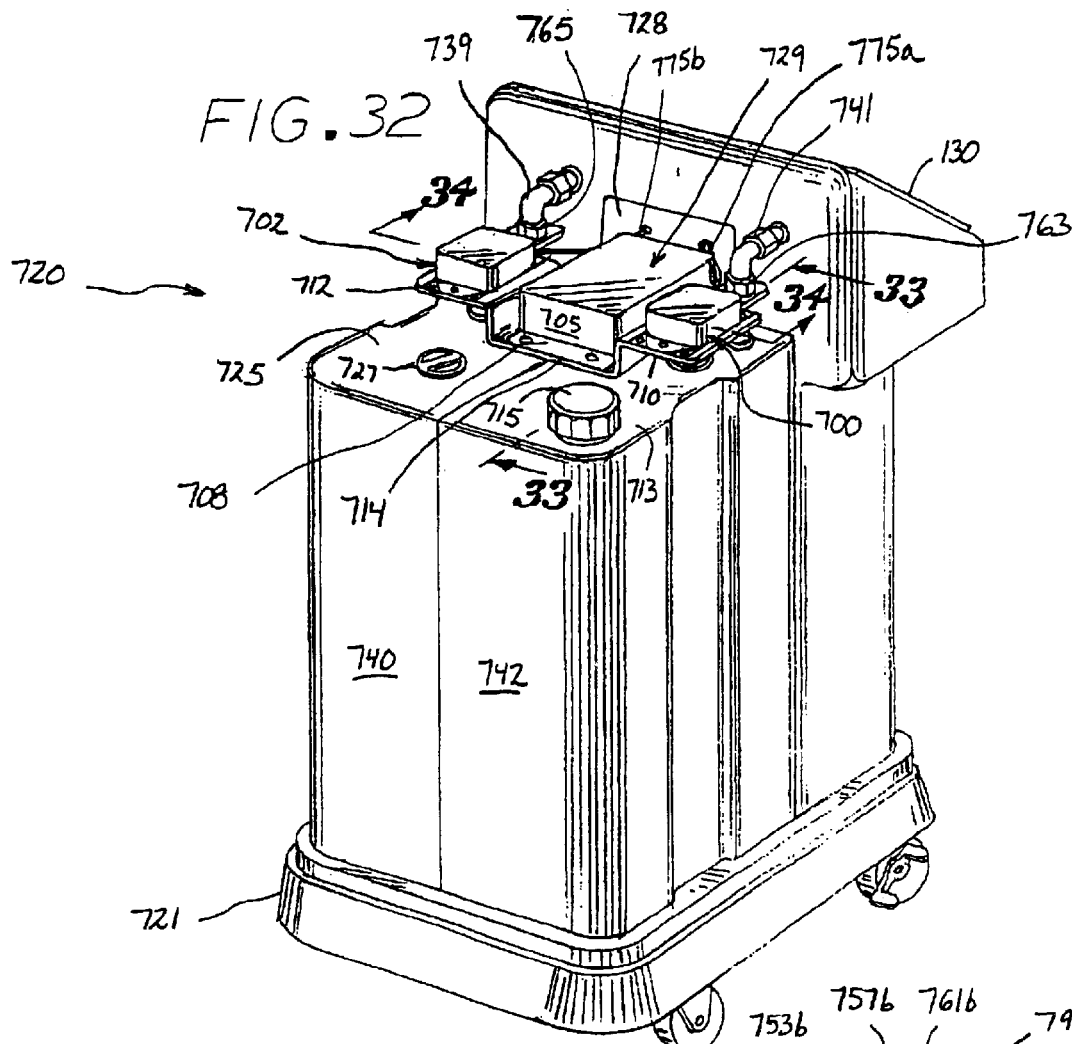
FIG. 32 is a rear perspective view, in enlarged scale, of an alternative embodiment of a fluid servicing apparatus according to the present invention with the outer housing removed exposing the fluid tanks.

Referring now to FIGS. 17–24 and 31, wherein like components are like numbered, there is illustrated an alternative integrated manifold and pump assembly, generally designated 426, for use in conjunction with a fluid exchanging apparatus 20, 720 such as those illustrated in FIGS. 1 and 32. Such integrated manifold and pump assembly houses a fluid circuit, such as the exemplary fluid circuit 430 illustrated in FIG. 25, formed in a rectangular manifold body 431 having a top side 433, an opposing bottom side 435, a rear side 437, a front side 443, a right end 445, as viewed in FIGS. 20 and 22, and a left end 447, as viewed in FIGS. 20 and 21. The body sides and ends have generally planar surfaces cooperating to form a rectangular block measuring about 190 mm (7.5 inches) wide by 76 mm wide (3 inches) by 76 mm (3 inches) high and defining a number of manifold ports for connecting to various conduits and other hydraulic control components. Threaded mounting holes 489 (FIG. 20) are provided in the front side 443 for fastening the manifold body to the housing of the fluid servicing apparatus 20. In this exemplary embodiment, there are four primary conduit ports, an auxiliary power steering fluid drain port, recessed vacuum and pressure side pump ports, and a number of flow control component ports as will be described in further detail below.

Figure 24:
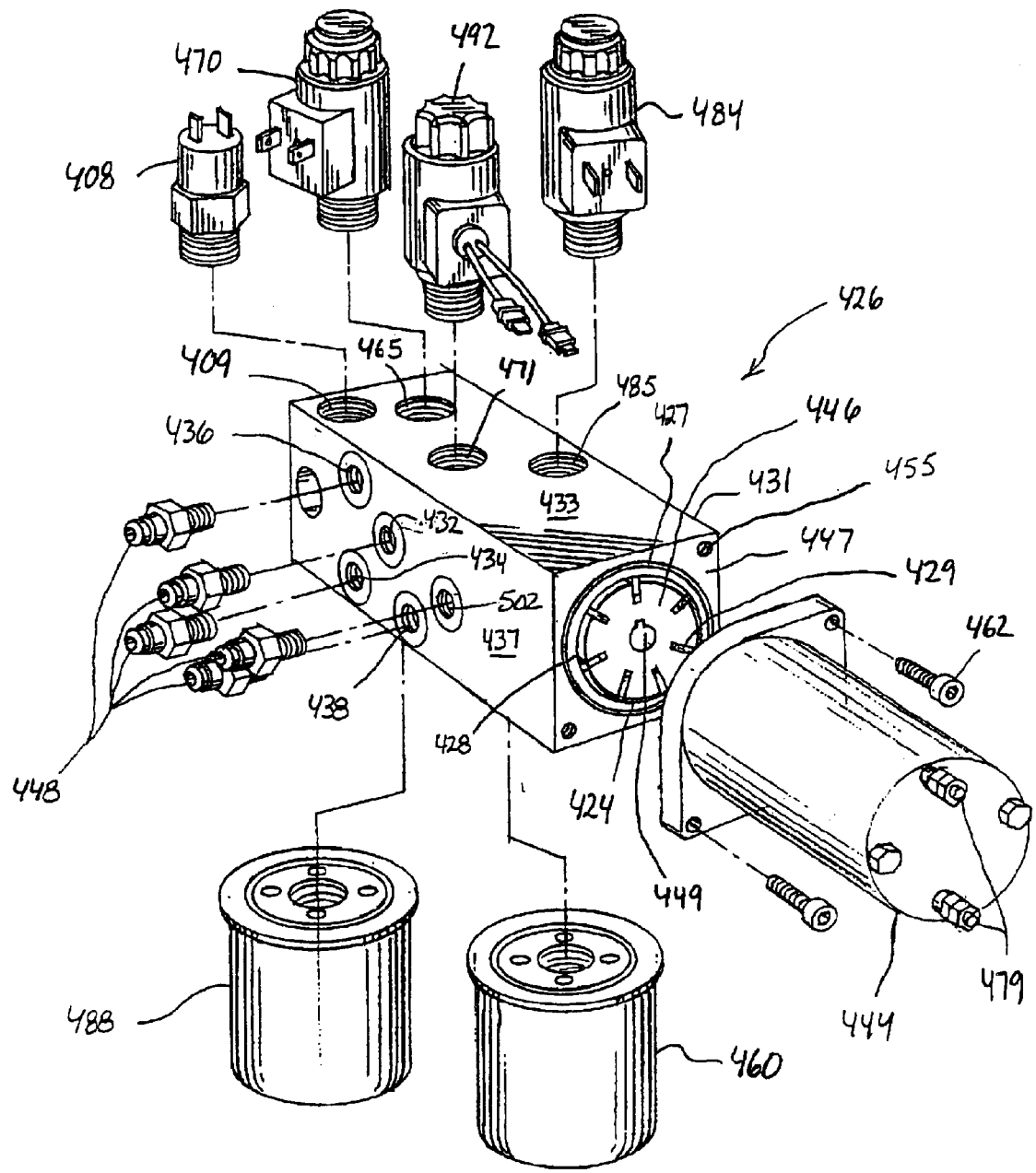
FIG. 24 is a perspective exploded view, in enlarged scale, of the manifold of FIG. 17.

With particular reference to FIG. 24, an exhaust port 432, a return port 434, a drain port 436, and a fresh fluid supply port 438 open outwardly on the rear side 437 of the manifold body 431. While each of these ports are shown on the same side of the manifold body 431 in FIGS. 17 and 24, it will be appreciated that the ports may be placed at other suitable locations on the manifold body. For instance, these same manifold ports are shown on different sides of the manifold body 431 in FIG. 25 for ease of description and clarity and may also provide suitable port locations and is not meant to be limiting in any manner. Other suitable locations will occur to one of ordinary skill in the art. Each manifold port is threaded for coupling with one end of a respective conduit, hose, or other suitable tubing or piping, which are in turn connected to a desired source or destination. For ease of assembly, it is preferable to thread one portion of each hose coupling, generally designated 448, into the respective threaded port opening. The threaded coupling component is constructed to allow the assembler to merely press the free end of the selected conduit onto the complementary coupling component threaded into the port. Suitable couplings of this type are available from Parker Hannifin under the TrueSeal trade name.

Figure 25:
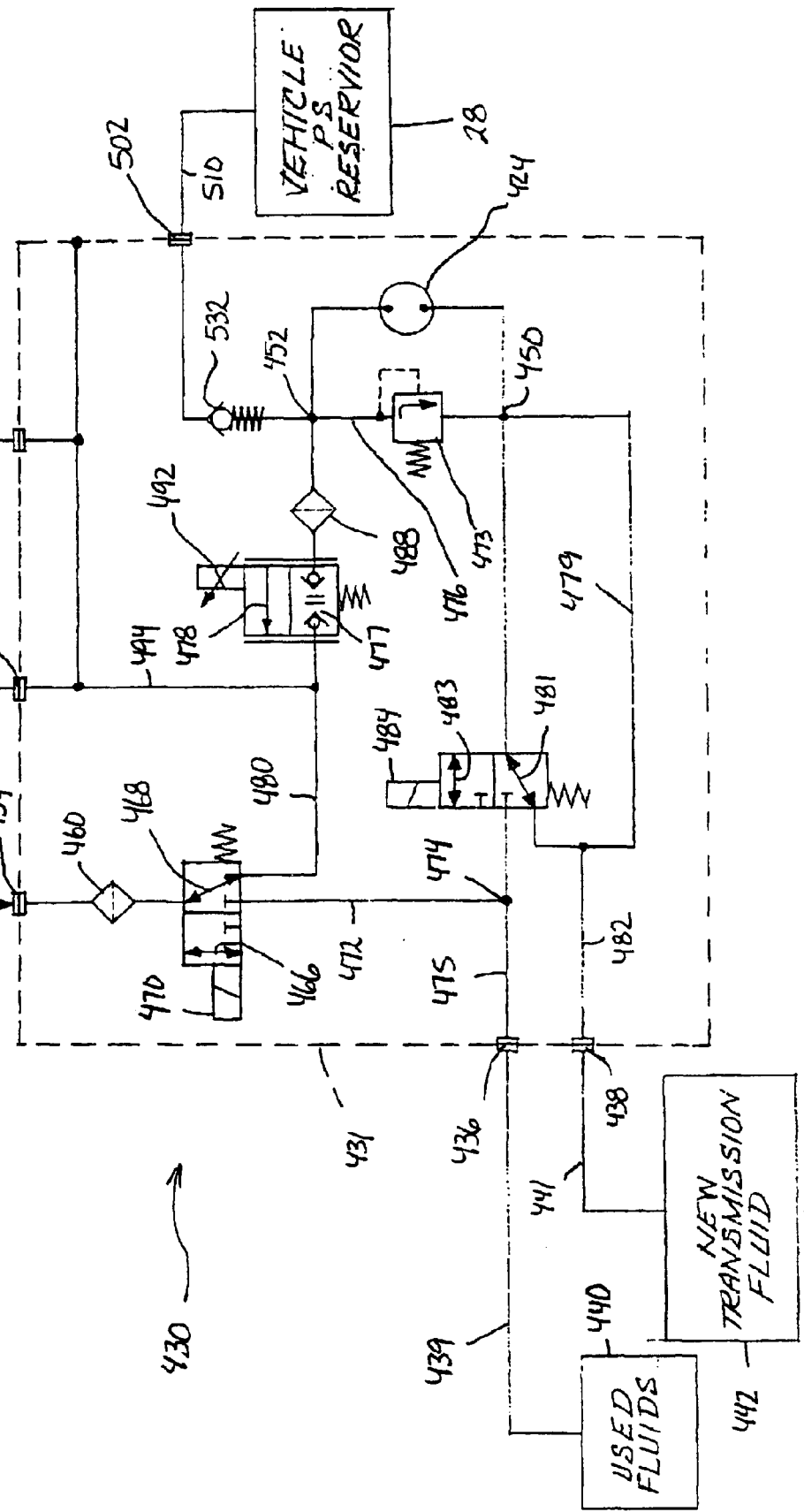
FIG. 25 is a schematic of an alternative plumbing circuit for performing servicing procedures in accordance with an alternative embodiment of the automotive fluid servicing apparatus of the present invention.

More specifically, with reference to FIGS. 17, 24 and 25 a used fluid conduit 439 connects between the drain port 436 and a used fluid collection tank 440 to carry fluid therebetween. Similarly, the fresh fluid supply port 438 connects via a new fluid supply conduit 441 to a new fluid tank 442. Used and new fluid conduits 439 and 441 are constructed the same as conduits 39 and 41, respectively. Such used fluid collection tank 440 is constructed to hold a sufficient amount of used fluid to accommodate at least complete drain procedure and preferably more. The new fluid tank 442 is typically constructed to hold a sufficient volume of fresh fluid to accommodate a single fill procedure and preferably has a greater capacity as well. This fresh fluid source 442 may be filled through a fill hole (not shown). As it is preferred that the servicing apparatus maintain a portable capability, the used and new fluid tanks are preferably mounted inside the cabinet 22 (FIG. 1) which is sized to accommodate the preferred tank capacities. It has been found that a 24 quart capacity for both the new and used fluid tanks accommodates most servicing procedures.

Referring now to FIGS. 17–18, 24 and 31, the manifold body 431 includes an extended section 423 including a circular cavity 427 for housing a vane pump 424. Within the cavity is a collar 428 having a circular outer diameter abutting the inner diameter of the cavity and a slightly distended inner diameter forming an eccentric inner surface. The vane pump includes main pump body 446 or rotor with movable vanes 429 that may slide in and out from the main pump body in a radial direction as the pump turns to abut the inner eccentric diameter of the collar. The main pump body 446 includes a central keyhole 449 to receive a complementary key-shaped drive shaft 451 of a relatively high speed, reversible motor 444. Bored into the inner wall 453 of the cavity is the suction port 450 and vacuum port 452 leading to the rest of the fluid circuit 430 (FIGS. 25 and 31). As the pump is reversible, however, the suction and pressure ports are reversible. When the drive shaft 451 of the motor 444 is engaged with the pump body 446 and activated, fluid may be moved through the cavity 427 between the pressure and suction ports and forced through the remainder of the fluid circuit 430.

The left hand end 447 of the manifold 431 includes threaded fastener holes 455 for receiving complementary threaded fasteners 462 for bolting the motor 444 directly to the manifold body 431. The 12 VDc motor includes positive and negative terminals 479 for connection to the vehicle battery or other power source via a conventional wiring harness. It will be appreciated that such direct manifold body-pump-motor assembly removes the need for suction and pressure side conduits and lessens the pressure drop through the fluid circuit 430.

With continued reference to FIGS. 3, 12, 17, 24 and 25, further convenience is provided by a set of servicing hoses, 44 and 46 respectively for connecting between the return port 434 and the exhaust port 432 of the servicing apparatus 20 and the influent line and effluent line of the serviceable component such as an automatic transmission as is well known to one of ordinary skill. The use of conventional adapters is also contemplated if necessary. Such connection places the transmission in fluid communication with the servicing apparatus 20 as will be discussed below.

Figure 29:
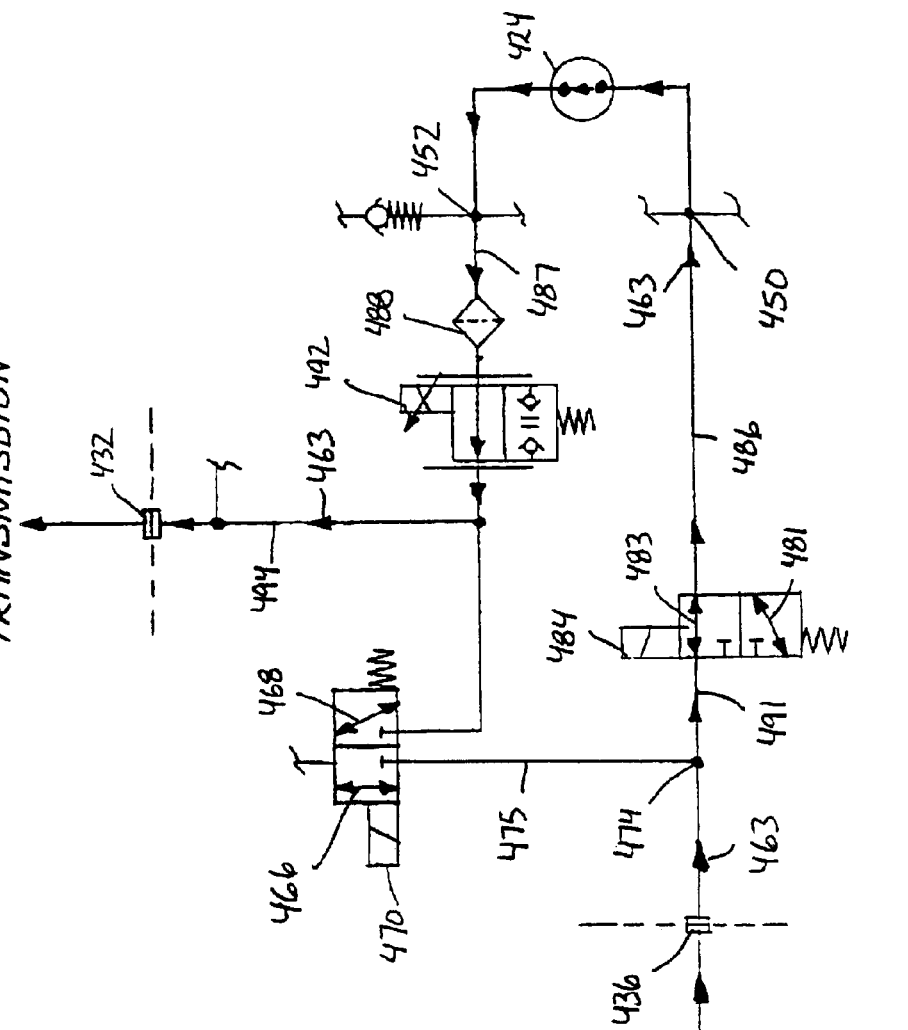
FIG. 29 is a partial sectional view taken from the plumbing circuit in FIG. 25 illustrating an exemplary dump fluid path.

Referring now to FIGS. 25–29, added to the fluid circuit 430 are a number of pathways formed in the manifold body 431 as well as a number of flow control and filtering components for routing fluid entering and exiting the manifold between the various fluid ports 432, 434, 436, 438, 450 and 452. In this exemplary embodiment, there are four primary pathways (FIGS. 26–29). There is also one auxiliary pathway (FIG. 30) for drain power steering fluid as will be described below. The primary pathways for exchanging automatic transmission fluid include a drain path for directing fluid flow as indicated by directional arrows 458 (FIGS. 25 and 26), a supply path for directing fluid flow as indicated by directional arrows 461 (FIGS. 25 and 27), a recirculation path for directing fluid flow as indicated by directional arrows 459 (FIGS. 25 and 28), and a dump path for directing fluid flow as indicated by directional arrows 463 (FIGS. 25 and 29).

It will be appreciated that the manifold body 431 forms a three dimensional fluid circuit and that FIGS. 25–29 are represented in a two-dimensional layout for ease of description and are not meant to be limiting in any manner. The lines in FIGS. 25–29 represent conduits through the manifold body between ports or flow control components. For instance, the fluid ports in FIG. 17 are shown on one side of the manifold body 431 while the same ports are shown on multiple sides of the manifold body in FIG. 25. In addition, in FIG. 25, the manifold body 431 is not depicted as a rectangular block as in FIG. 17. These illustrations are merely to facilitate description of the preferred embodiment. Other suitable port locations and pathways may occur to one of ordinary skill and still fall within the scope of the present invention.

With continued reference to FIGS. 25–29, each pathway 458, 459, 461, and 463 is generally tubular in transverse cross section and made up of adjacent passage segments bored into the manifold body 431 which are configured with straight runs meeting at right angles and compacted to minimize the size of the manifold body and further reduce hose length requirements between components coupled to the manifold body and overall hose length requirements of the servicing apparatus. It will be appreciated that the integration of the pump body 446 into the manifold body 431 and direct connection of the motor 444 removes the requirement for any hose connections other than the conduits between the manifold body 431 and the new and used fluid tanks and the transmission ports. Some of these right angle segments project into or out of the plane of the paper and may not be shown in FIGS. 25–29. It will also be appreciated, when considered from end to end, portions of each pathway may extend outside the manifold body and include couplings or connectors of flexible or rigid material connected to one or more manifold ports.

With particular reference to FIGS. 25 and 26, during a drain procedure as will be discussed below, fluid is normally directed in the direction of arrow 458 through the drain path from the return port 434 to the used fluid drain port 436 which may be connected to the used fluid collection tank 440 via conduit 439. Such passage 458 is formed by an entry bore extending into the manifold body 431, viewed into the paper in FIG. 18, from the return port 434 to enter a short pre-filter segment 464 which turns downwardly at a right angle from the entry bore, toward an aperture (not shown) in the bottom side 435 of the body aligned with a fluid entrance into an in-line filter 460 to direct fluid into the filter. In-line filters 460 and 488 are connected to the manifold body 431 in an identical manner as in-line filters 60 and 88 (FIGS. 3 and 12) of the previous embodiment and provide the same fluid path therethrough.

Figure 28:
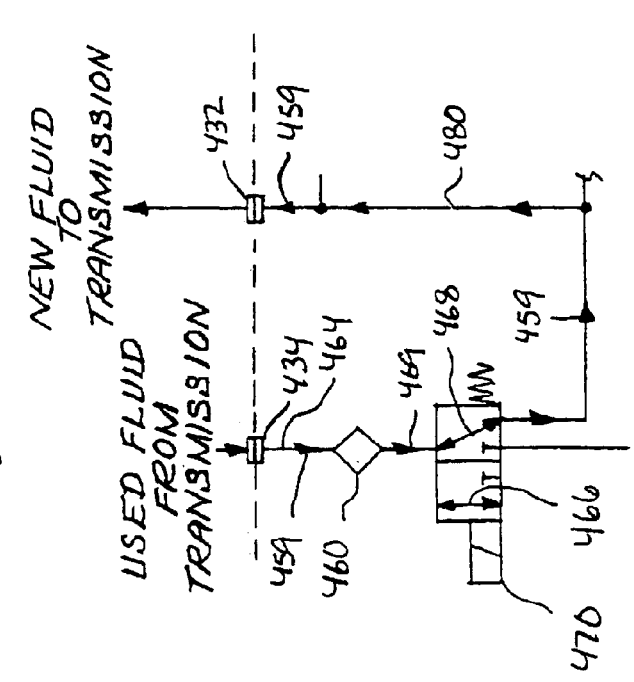
FIG. 28 is a partial sectional view taken from the plumbing circuit in FIG. 25 illustrating an exemplary recirculation/bypass fluid path.

After exiting the manifold body 431 through the bottom aperture to enter the inline filter 460, the drain path 458 then reenters the manifold body through the hollow nipple and projects upwardly into the body into a pre-drain valve segment 469. About the midpoint of the body 431, the pre-drain valve segment terminates at an inlet of a two-position drain/bypass solenoid valve 470 which may be screwed into a threaded valve port 465 on the top side 433 of the manifold body 431 to position the dual outlet valve 470 in line with both the drain path 458 and recirculation path 459 of the fluid circuit 430. Such valve 470 includes a drain position, indicated by directional arrow 466, which directs fluid entering the inlet of the solenoid 470 out of a drain outlet of the solenoid 470 and through the remainder of the drain path 458 (FIGS. 25 and 26) and a normally open bypass position, indicated by directional arrow 468, which directs fluid entering the inlet of the valve 470 out of an alternate outlet and through a recirculation path 480 (FIGS. 25 and 28). Valves 470 and 484 are identical to the valves 70 and 84 (FIG. 6) in the previous embodiment With continued reference to FIG. 26, the drain path 458 turns at a right angle from the longitudinal centerline of the solenoid 470 into a post-solenoid segment 472 forming the stem of a T-shaped intersection 474. Then the path is bifurcated to, in one branch, enter into a used fluid connection branch 475 of the T-shaped intersection leading to the drain port 436 which may be connected to the used fluid collection tank 440 via conduit 439. Fluid entering the return port 434 from the serviceable component is thus normally directed along this drain path 458 if the drain/bypass solenoid 470 is energized to the drain position 466 for collection in the used fluid tank 440.

Referring now to FIGS. 25 and 28, when the drain/bypass valve 470 is energized to the bypass position as indicated by directional arrow 468, the recirculation path 459 is opened and the drain path 458 is blocked. The recirculation path 459 shares the same plumbing with the drain path 458 up to the drain/bypass solenoid 470 including the return port 434, pre-filter segment 464, drain/recirculation filter 460, and pre-valve segment 469. Continuing through the drain/bypass solenoid valve 470, when energized to the bypass position 468, the recirculation passage 459 projects at a right angle to the longitudinal centerline of the solenoid to form an L-shaped recirculation loop 480 leading to the exhaust port 432 which may be connected to the transmission inlet via conduit 46 (FIGS. 1, 3 and 6). Fluid entering the recirculation path from the return port 434 is directed through the solenoid 470 set in the bypass position 468 to exhaust port 432. Such recirculation path normally serves to circulate fluid in the direction indicated by arrows 459 between the serviceable component and the servicing apparatus and through the filter 460 while bypassing the pump 424, used fluid tank 440, and new fluid tank 442.

With continued reference to FIG. 25, and with particular reference to FIG. 27, the fresh fluid supply passage 461 is formed by an entry bore extending into the manifold body 431 from the new fluid supply port 438 to then turn at a right angle forming an L-shaped pre-supply valve segment 482. The segments discussed herein are preferably bored into the manifold body during manufacture. Such segment terminates at a two-position dump/supply solenoid valve 484 which is also screwed into a threaded port 485 on the top side 433 of the manifold body 431 to position the valve 484 in line with the new fluid supply passage 461 (FIG. 27) and the dump passage 463 (FIG. 29) in the fluid circuit 430. Such valve 484 includes a normally open supply position, indicated by directional arrow 481, which receives fluid withdrawn from the new fluid supply tank 442 and directs it through the remainder of the supply path 461 (FIG. 27). The supply/dump valve 484 also includes a dump position, indicated by directional arrow 483, which receives fluid being dumped from the used fluid tank 440 and directs such fluid on through the remaining portion of the new fluid supply passage as well (FIG. 29).

Continuing with the new fluid passage 461, a pre-suction port segment 486 projects at a right angle to the longitudinal centerline of the solenoid 484 and further includes a second right angle turn leading to the suction port 450 (FIGS. 25 and 27). The suction port 454 opens directly into the pump cavity 427 and a pressure port 456 opens directly into the pump cavity as well at an offset position from the suction port to position the pump 424 in line with the supply path 461 (FIG. 27) and also the dump path 463 (FIG. 29) depending on the valve 484 position. Reentering the manifold body 431 through the pressure port, the new fluid supply passage 461 projects downwardly through a pre-supply filter segment 487 to lead to an aperture (not shown) on the bottom side 435 of the manifold body 431 aligned with an entry hole in a supply filter 488. The supply filter 488 is also connected to the manifold body via a hollow, threaded nipple (not shown) on the under side 435 (FIG. 24) similar to the drain filter 88 connection as for the embodiment illustrated in FIG. 12. Exiting the filter 488 through the hollow nipple, the new fluid supply path 461 projects upwardly into the manifold body 431 through an auxiliary proportional solenoid 492 and then turns outwardly toward the back side 437 of the manifold body in an L-shaped segment 494 leading to the exhaust port 432 which may be connected to the transmission inlet or collection tank via servicing hose 46 (FIG. 3). The final segment 494 of the new fluid supply path 461 leading to the exhaust port 432 is common with the last segment of the recirculation path 459.

The proportional solenoid 492 is optional for providing additional flow control capabilities, if desired but is not a necessary component of the present invention. Description of this valve and its operation will be described below. In its place or in conjunction therewith, a check valve may be incorporated at this point in the supply fluid circuit 461 to prevent fluid from backflowing or otherwise entering the outlet of the supply filter 488 from the recirculation path. This feature may also serve to keep the pump 424 primed in use. However, it is preferable to select a suitable pump 424 having an integrated check valve for incorporation into the servicing apparatus 20 so that the external check valve can be omitted altogether. The supply pathway 461 normally serves to conduct fluid from the fresh fluid supply 442 connected to the new fluid port 438 and direct the fluid to the exhaust port 432 and to the upstream line of the serviceable component via servicing hose 46 to supply fresh fluid thereto. Alternatively, such passage 461 can be used to drain the new fluid tank 442 when the servicing hose 46 is coupled to a collection tank.

Turning now to FIGS. 25 and 29, the fluid circuit 430 also includes the used fluid dump pathway 463 for transporting fluid between the drain port 436 and the exhaust port 432 for draining fluid from the used fluid tank 440 using the common pump 424. With continued reference to FIG. 29, the dump path 463 begins with at the drain port 436 which is normally coupled to the used fluid collection tank 440 via the used fluid conduit 439. The dump path 463 is then formed with a bore projecting inwardly from the drain port 436 along a straight segment to form the first branch 475 of the T-intersection 474. The path 463 bifurcates at intersection 474 to flow through to a straight pre-valve segment 491 to one inlet of the dual inlet dump/supply solenoid valve 484 which controls the flow on to the outlet bore 486 (pre-suction port segment) leading to the suction port 450 when the valve is energized to the dump position 483. The remaining portion of the dump path is common to the new fluid supply path 493 as it exits the solenoid 484 ultimately leading to the exhaust port 432 including passage through the outlet bore 486 through the suction port 450 to the pump cavity 427. The fluid is then directed through the pressure port 452 on through filter 488, proportional valve 492 to exhaust port 432 through segment 494. Such path 463 normally serves to direct fluid withdrawn from the used fluid collection tank 440 using the common pump 424 to direct used fluid through the exhaust port 432. Instead of connecting the service hose 46 to the transmission, however, the free end of the service hose is typically placed in a waste fluid receptacle (not shown) for future storage so that the used fluid tank 440 may be drained.

With continued reference to FIGS. 3 and 25–29, fluid typically enters the return port 434 from conduit 44 connected to the downstream port of the transmission and exits the exhaust port 432 to be directed through hose 46 to the upstream port of the transmission. Fluid is generally circulated through the fluid circuit 430 by the single, reversible pump 424 interposed in the supply and dump pathways 461 and 463, respectively, to complete these pathways. Fluid may also be circulated by a pump associated with the serviceable component through the drain and recirculation paths 458 and 459, respectively. Direction of the fluid through the fluid circuit 430 is normally determined by the respective positions of the single inlet, dual outlet, drain/bypass valve 470 and dual inlet, single outlet, dump/supply valve 484. The drain/bypass valve 470 operates to direct fluid entering the return port 434 through the drain or bypass passages 458 (FIG. 26) and 459 (FIG. 28) respectively with one side of the valve 470 in fluid communication with the return port 434 and the second side in fluid communication with the drain port 436 and exhaust port 432. When solenoid 470 enters into the drain position 466, the bypass passage 459 is blocked off and the passage between the return port 434 and the drain port 436 is open and fluid may flow in the direction of arrows 458 (FIG. 26). On the other hand, when the valve 470 is energized to the bypass position 468, the drain passage 458 is blocked off and the passage between the return port 434 and the exhaust port 432 is open establishing a bypass loop 459 wherein fluid may circulate in the direction of the arrows 459 and wherein fluid does not circulate through the pump 424 (FIG. 28).

Referring to FIGS. 3, 25, 27 and 29, connected in fluid communication with the supply and dump paths 461 and 463, respectively, is the dump/supply valve 484 with the outlet of the valve in fluid communication with the exhaust port 432 and the dual inlet in fluid communication with the drain port 436 and new fluid supply port 438. When the valve 484 is energized to the supply position 481, the dump passage 463 is blocked off and the passage 461 between the new fluid supply port 438 and the exhaust port 432 is open so that fluid may therebetween (FIG. 27). On the other hand, when the valve 484 is energized to the dump position 483, the new fluid supply passage 461 is blocked off and the passage between the drain port 436 and the exhaust port 432 is open establishing a passage 463 for dumping fluid into the used fluid tank 440 by withdrawing such fluid with the common pump 424 (FIG. 29). Selection of these valve positions 466, 468, 481, and 483 is directed by the controller 28 (FIG. 6) which is in electrical communication with each of the valves 470 and 484 similar to that illustrated in FIG. 6, and the operator or service technician using the electrical command system as will now be described. Fluid exchange operations (i.e. drain, fill, re-circulate, and exchange) using the fluid servicing apparatus 20 incorporating the alternative manifold body 431 is initiated by an operator at the control panel 130 and automated by the controller 28 in a similar manner as described above. As the preferred vane pump requires a minimum amount of voltage, a low voltage warning indicator may be placed on the control panel 130 to indicate the vehicle's battery is insufficient to power the motor.

Referring now to FIG. 25, in the event of an overpressure condition in the fluid circuit 430, an overpressure switch 473 will open at a predetermined pressure point and over pressurized fluid will be directed along conduit 476 and conduit 479 back through valve 484, set in position 481, to be redirected back through suction port 450 until the pressure condition is relieved. Pressure switch 408 is threaded into threaded port 409 on the top surface 433 of the manifold body 431 and operates in an identical manner to pressure switch 108 in the embodiment in FIG. 6.

It will be appreciated that higher volumes of flow than other conventional transmission fluid exchanging machines may be attained using the alternative manifold body 431 with direct pump and motor integration. For instance, speeds of 3 gpm have been attained using the vane pump and a high speed motor. Such flow rate forces new fluid into the transmission well ahead of the flow rate as put out by today's vehicles which typically falls in the 1.2 to 1.7 gpm range. With such high flow rates, the proportional valve 492 may be unnecessary but may be used to provide finer flow rate control features if desired.

Operation of the Proportional Check Valve Solenoid

With reference to FIGS. 17, 25, 27, and 29, the optional proportional solenoid valve 492 may be incorporated into the fluid circuit 430 in the supply path 461 to provide an additional level of fluid flow rate control. A preferred valve is available from Hydac sold under the designation PWS06020-01X. Such valve is threaded into an auxiliary port 471 on the top side of the manifold body 431 to dispose the valve inline with the supply path 461 with an inlet facing the in-line filter 488 side of the supply path and an outlet facing the exit segment 494 to the exhaust port 432. This valve has two primary positions including a check valve position 477 and a variable opening position 478. As with the other valves, the proportional valve is in electrical communication with the controller 28 via a wire lead and responsive to commands provided therefrom. As this valve is optional, the proportional valve 492 may be removed altogether and replaced with a threaded tap and plug (not shown).

With the valve 492 in the check valve position 477, fluid in the recirculation loop 480 is prevented from flowing into in-line filter 488 and is directed out the exhaust port 432. Likewise, fluid issuing forth from the pressure port 452 and passing through the in-line filter 488 is prevented from entering the recirculation loop 480 or the exhaust port 432. Such position may also keep the pump primed as fluid will not back flow into the pump cavity 427.

With the valve set to the proportional position 478, the controller 28 may incrementally adjust the opening through which the fluid flows through the valve and adjust the corresponding flow rate therethrough. For example, if the pump 424 provides an unacceptable flow rate of fluid to the exhaust port 432, instead of shutting the pump down, the opening in the valve 492 may be increased or reduced accordingly through commands from the controller 28 automatically until the desired flow is achieved. The controller 28 may be programmed to command adjustments to the valve opening that are proportional to the rates of change in the quantities of the new and used fluids as measured by the sensors and determined by the controller.

Alternative Power Steering Fluid Removal

As the preferred vane pump is reversible, this feature may be used to accommodate alternative fluid drainage such as the power steering fluid from the power steering fluid reservoir 28. Such path provides an alternative to the fluid path illustrated in FIG. 5. It will be appreciated that as the common pump 424 is used to drain the power steering fluid, pump 222 (FIG. 5) may be omitted from the integrated power steering and transmission fluid exchange apparatus.

Figure 30:
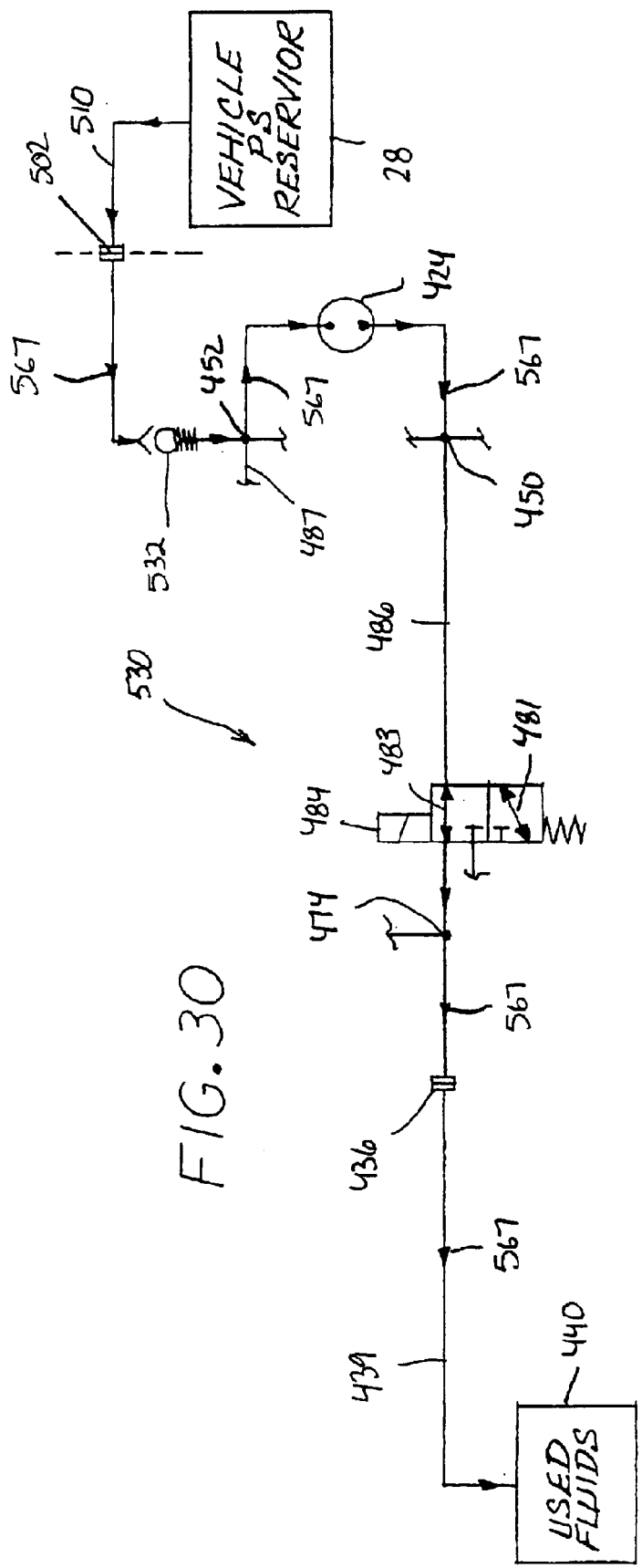
FIG. 30 is a sectional view taken from the plumbing circuit in FIG. 25 illustrating an exemplary power steering fluid drain path.

With reference with FIGS. 17, 25 and 30, an auxiliary fluid circuit 530 connecting the used fluid collection tank 440 to a power steering fluid reservoir 28 for draining used power steering fluid with the common pump 424 in the direction of arrows 567 is illustrated. Referring to FIG. 30, the auxiliary fluid circuit includes the same plumbing and componentry as the dump fluid circuit 463 described above up to the pump cavity ports 450 and 452. Instead of continuing to the fluid exhaust port 432, however, the auxiliary fluid circuit projects through the manifold at a right angle to the pre-filter segment 487 through a one-way check valve 532 to turn outwardly at a right angle to terminate in the rear face 437 of the manifold body 431 (FIGS. 17–18) in the outwardly facing threaded auxiliary port 502. Screwed into such port is a coupling 506 with a conduit nipple 508 for receiving one end of a hollow drain conduit 510. The other end of the drain conduit 510 is placed within the power steering fluid reservoir 28 near the bottom of the reservoir.

In operation, the operator connects one end of the conduit 510 to the conduit nipple 508 and the other end is disposed within the power steering fluid reservoir. The operator may then switch the pump 424 into reverse mode using a switch on the control panel 130. The power steering fluid exchange is then initiated via the control panel 130 which transmits a signal to the pump 424 to activate. Upon activation of the pump, fluid will be suctioned from the power steering fluid reservoir through the power steering fluid removal circuit 530. More specifically, used power steering fluid will be drawn by the pump 424 through the conduit 510 into the manifold body 431 through the auxiliary port 502. Once inside the manifold, the used power steering fluid is drawn by the pump through the one-way check valve 532 and into the pump cavity 427 via the pressure port 452 now acting as a suction port. The pump then forces the power steering fluid into the suction port 450 now acting as a pressure port and into segment 486 through valve 484 set to position 483 by the controller 28. Used power steering fluid is forced out through the used fluid port 436 and into a used fluid collection tank 440 through conduit 439 where it may disposed of after the power steering fluid exchange is completed. The addition of power steering fluid to the reservoir 28 is performed in the same manner described above regarding FIG. 4.

In addition to those hydrostatic pressure head sensors previously described, other sensor configurations may be used to measure the level of supply and used fluids upon which either the incoming flow rate or outgoing flow rates of the respective fluids or both may be adjusted, regulated, and/or balanced. One such embodiment employing an alternative sensor configuration will now be described.

Dielectric Sensor Control System

As an alternative to using hydrostatic pressure head sensors as a means for providing fluid level data, a control system incorporating a fluid level measuring device based on capacitance principles may be used to determine the fluid levels within the used and new fluid tanks and transmit a measurable parameter to the controller for monitoring and balancing the flow rate of the used and new fluids to and from the fluid exchanging apparatus.

Referring now to FIGS. 32–34 and 36, wherein like components are like numbered, in general terms, an alternative fluid servicing apparatus, generally designated 720, includes a control system with a controller 728 in communication with a sensing unit, generally designated 729, having a used fluid sensor 702 to measure the level of used fluid 704 in a used fluid tank 740 and a new fluid sensor 700 to measure the level of fresh fluid 706 in a supply tank 742 using capacitance principles throughout the servicing process. The controller 728 is further coupled to a fluid flow control device 791 which may include, either alone or in combination, a pump 24, valves 70 and 84, and an integrated manifold assembly 26, 231, 426 (FIGS. 3, 12, 17–24 and 31) housing fluid transfer circuits similar to those illustrated in FIGS. 6–11, 13–16, and 25–30 as described above to balance the flow rate of the incoming and outgoing fluids between the used and new fluid tanks 740 and 742, respectively, of the fluid changing apparatus 720 and the reservoir of the vehicular subsystem being serviced by transmitting command signals from the controller 728 to the various plumbing components 24, 70 and 84 based on the sensor input from the sensing unit 729. As above, while the fluid exchange procedures described herein are preferably fully automated, the servicing procedures are initiated through a control panel 130 (FIGS. 1 and 2) coupled to the controller 728.

Figure 33:
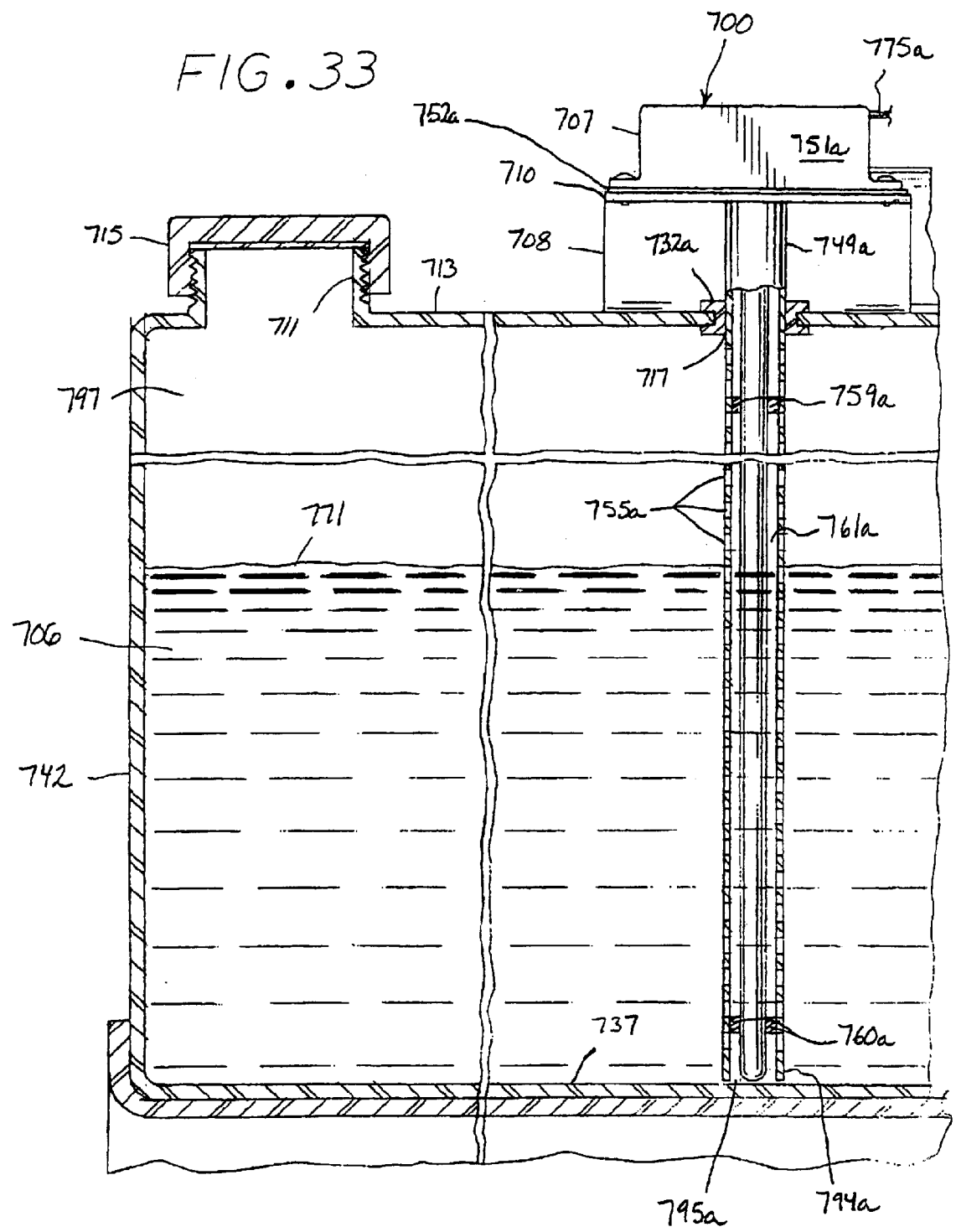
FIG. 33 is a fragmented, sectional view, in enlarged scale, taken along lines 33—33 of FIG. 32.

With continued reference to FIGS. 32–34, the fluid servicing apparatus 720 incorporates a used fluid collection tank 740 and a fresh fluid supply tank 742 mounted side by side on a tray 721 of a portable wheeled cabinet 22 (FIG. 1). In FIG. 32, the outer housing is removed to facilitate description of the fluid tanks and sensing unit 729. Both the used fluid collection tank and fresh fluid supply tanks are similarly constructed of a suitable plastic material molded into a generally rectangular shape with planar upper and bottom surfaces. A predetermined amount of used fluid 704 may be collected in the used fluid tank. The upper surface 725 of the used fluid collection tank includes a drain aperture for receiving a quick lock cap 727 which may be removed to facilitate placement of a free end of a drain hose into the tank 740 in order to drain the used fluid collection tank using the drain procedures described hereinabove. The bottom surface 735 of the tank is continuous as the sensing unit 729 is top mounted as will be described below. This construction prohibits leaks as may occur with the bottom mounted pressure sensors.

The upper surface 725 of the used fluid collection tank 740 also includes a fore and aft apertures. The aft aperture 716 (away from the control panel 130 of FIG. 32) provides a sensor opening enabling an installer to insert the used fluid sensor 700 into the collection tank. The fore aperture (not shown) provides an opening for the used fluid conduit 739 to be inserted into the used fluid tank. As above, one end of the used fluid conduit is coupled to the manifold (e.g. 26, 231, or 426) for issuing used fluid into the collection tank 740 during the drain process or drawing used fluid out the collection tank during the dump process. For purposes of this description, the upper level of the used fluid 704 is designated 769 (FIGS. 34 and 35) and tank air above the surface of the used fluid is designated 799.

A threaded fill neck 711 projects above the upper surface 713 of the new fluid tank 742 to receive a threaded cap 715 (FIG. 33). The cap may be unscrewed from the fill neck and removed enabling an operator to pour fresh fluid into the tank to fill it to the desired capacity. The upper surface of the new fluid tank includes an aft opening 717 for insertion of the new fluid sensor 700 into the new fluid tank. A fore opening (not shown) is also provided in the upper surface of the new fluid tank for receipt of one end of the new fluid conduit 741 which includes an opposing end that is normally coupled to the manifold (e.g. 26, 231, 426) to provide a supply of fresh fluid from the supply tank to the manifold for further distribution to the reservoir being serviced on demand. The aft and fore openings of the new fluid tank are transversely aligned with the corresponding aft and fore openings of the used fluid tank 740 in relation to the controller 728. For purposes of this description, the upper level of the new fluid 706 is designated 771 (FIG. 34) and tank air above the surface of the new fluid is designated 797.

A common wall 723 divides the tanks 740 and 742. However, the tanks may also be constructed separately. Both tanks, 740 and 742, preferably have at least a 24 quart capacity and are 24 inches high from top to bottom. Larger or smaller capacity tanks may be used as necessary. To further prevent leaks and releasably secure the sensors 700 and 702 and conduits 739 and 741 to their respective tanks, rubber escutcheons 732a, 732b may be used within the fore and aft holes in the upper surfaces 713, 725 of each tank 742, 740 providing a snug fit against the sensor or conduit.

With continued reference to FIGS. 32–34, the sensing unit 729 is conveniently secured to a generally rectangular, single piece, tri-sectional, mounting bracket 708 for top mounting the sensors to the tanks 740 and 742. The mounting bracket includes two elevated sensor mounts 710 and 712 separated by a central U-shaped well 714 recessed below the upper level of the mounts. The mounts project outwardly at right angles from the sidewalls of the well in the same plane and are parallel to the bottom wall of the well. Each mount 710 and 712 has an upper flat surface defining fore and aft holes (not shown) for receipt of the new and used fluid sensors 700 and 702 and used and new fluid tank fluid conduits 739 and 741, respectively. These fore and aft holes in the bracket 708 are to be aligned with the corresponding fore apertures and corresponding fore apertures 716 and 717 in the top of each tank 740 and 742 when the mounting bracket and sensing unit 729 is installed.

With continued reference to FIGS. 32 and 34, a voltage reducer 705 in communication with the controller 728 via a wiring harness is secured within the well 714. Such voltage reducer is operable to reduce the supply voltage from the vehicle car battery 787 or other power source before such voltage is supplied to the sensors 700 and 702 as would be understood by one of ordinary skill in the art.

During installation, the bottom wall of the well 714 of the bracket 708 is secured across the top surfaces, 725 and 713, of the used and new fluid tanks, respectively, with four bolts or other suitable fastener. The top mounting system positions the new and used fluid sensors 700 and 702, respectively in a perpendicular alignment with the corresponding top and bottom surfaces (713 and 737, 725 and 735) of the respective new and used fluid tanks 742 and 740 when installed. The top mounting system prevents leaks as the bottom surface 735 of the used tank 740 and the bottom surface 737 of new fluid tank 742 are continuous. It will also be appreciated that the positions of each set of conduits and sensors may be reversed. For example, the new fluid conduit 741 may be placed in the aft opening in the bracket 708 while the new fluid sensor 700 may be inserted through the fore opening in the bracket closer to the controller 728.

Referring now to FIGS. 33 and 34, the new fluid level sensor 700 includes a signal processing head 751a and an elongated coaxial probe 749a separated by an enlarged rectangular metallic plate 752a. More specifically, the signal processing head contains a control circuit within a plastic housing 707a for measuring the fluid level 771 in the new fluid tank 742 by sensing changes in the capacitance due to a rise or fall of transmission fluid within the probe and transmitting a voltage signal proportional to the level of the fluid to the controller 728 for further processing. In this exemplary embodiment, the control circuit may include an oscillator, a frequency to voltage converter, and preferably includes an analog to digital converter in the housing. An exemplary oscillator operates at 20 KHz. The analog to digital converter converts the analog capacitance signal output from the probe in either volts, amperes, or ohms, into a digital signal. In this exemplary embodiment, the frequency to voltage converter converts an analog voltage signal sensed by the probe 749a into a digital voltage signal proportional to the upper level 771 of new fluid in the supply tank 742.

The sensor head 751a is in electrical communication with the voltage reducer 705 and receives a supply of voltage at a reduced level therefrom. A wire lead 775a connects the sensor head 751a with the controller 728 for electrical communication therebetween to transmit digital voltage signals proportional to the level of the new fluid 771 within the new fluid tank 742 as sensed by the new fluid sensor probe 749a to the controller 728 for further processing. Such fluid level readings may be transmitted on a periodic basis to determine changes in the new fluid level as it rises or falls. It will be appreciated that the period used to obtain fluid level readings may be decreased so that, in effect, the controller 728 may monitor the fluid level on a continuous basis.

With continued reference to FIG. 34, the new fluid sensor processing head housing 707a is mounted on the plate 752a using a suitable fastener. The plate, preferably constructed of steel, is secured to the new fluid sensor mount 710 also using a suitable fastener. A grounding screw may be threaded into a hole in the plate and connected to a grounding wire for grounding the probe 749a.

The probe 749a comprises an outer metallic element 753a and an inner metallic element 757a. The outer element is a hollow tube preferably constructed from steel and is welded to the underneath of the plate 752a. In this exemplary embodiment, the inner diameter of the outer element is one inch. The inner element is a cylindrical rod, preferably constructed of aluminum, with an outer diameter of ⅜ of an inch. The top end of the inner element is threaded through a central hole in the plate 752 and into the housing 707. The elements are maintained in a coaxially spaced alignment by upper and lower nylon spacers 759*a* and 760*a*, respectively maintaining a gap 761*a* between the elements (FIG. 33) wherein different dielectrics such as transmission fluid or air may enter. The outer tube includes regularly spaced perforations 755*a* allowing fluid to enter and exit the gap 761*a* between the tubes at a relatively rapid rate. In addition, the bottom end 794*a* of the probe 749*a* includes an opening 795*a* between the outer and inner elements 753*a* and 757*a* enabling fluid to enter through bottom edge so the sensor can detect very low level fluid amounts. The outer tube is preferably via the grounding screw connected to the plate 752*a*.

When a voltage is applied across the elements 753*a* and 757*a*, a capacitor is formed. The coaxial probe 749*a* provide a capacitor element within the control circuit in the housing 707*a*. The column between the elements forms a dielectric which is either air or a fluid such as transmission fluid or a mixture thereof. Using capacitance principals as described below, a voltage signal proportional to the level of fluid between the elements and thus the tank height may be determined with the sensor 700.

The used fluid sensor 702 is constructed in an identical manner and numbered accordingly with a "b" designation. For example, the used fluid probe is designated 749*b*. The used fluid sensor is mounted to the bracket 708 on the used fluid sensor mount 712.

Figure 36:
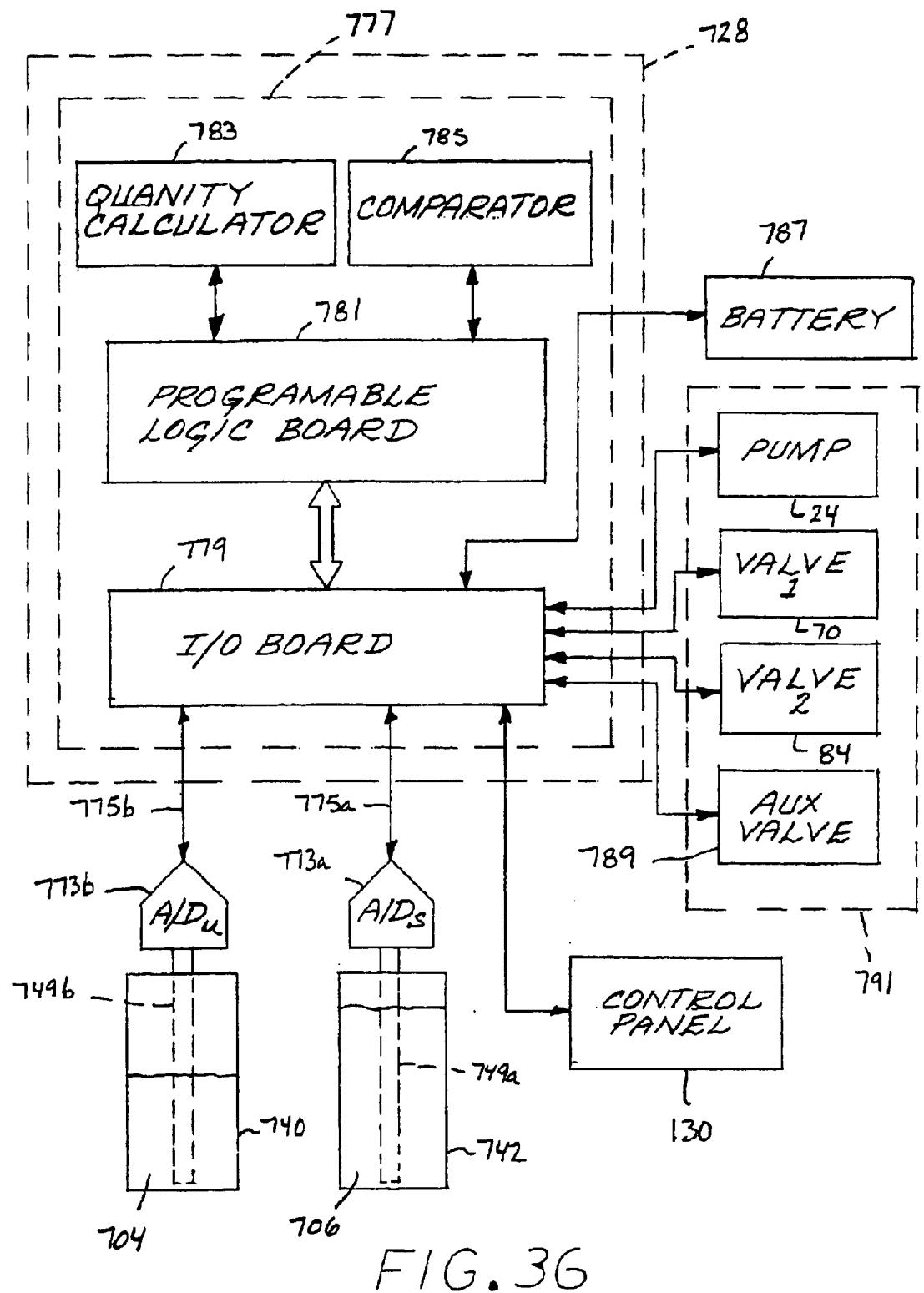
FIG. 36 is a block diagram of the control system incorporated in the embodiment illustrated in FIG. 32.

Referring now to FIG. 36, the analog to digital converter 773*a*, 773*b* of the new and used fluid sensors 700 and 702, respectively, are connected to an input/output (I/O) board 779 on a programmable function board (PFB) 777 of the controller 728 through their respective leads 775*a*, 775*b*. As the sensor heads 751*a* and 751*b* are positioned relatively near the front end of the servicing apparatus near the controller 728, it will be appreciated that the wiring requirements are somewhat reduced. The I/O board is in turn in electrical communication with a programmable logic board (PLB) 781 which includes a quantity calculator component 783 and a comparator 785 also included in the PFB 777. The I/O board is further in electrical communication with the control panel 130, the pump 24, bypass/drain valve 70, and the dump/supply valve 84 (FIGS. 2, 3, 6 and 21) to receive and transmit command signals therebetween. The I/O board is also in electrical communication with the battery 787 and may be connected to any number of auxiliary valves 789, such as the proportional valve 492 described above (FIG. 25).

The PLB 781 is programmed to determine the quantity of the fluid in each of the tanks based upon digital voltage signals received from the sensors 700 and 702, respectively, using the quantity calculator 783, and compare either the respective quantities, the relative change in quantities indicative of used and fresh fluid flow rates, or both using the comparator 785. For example, the new fluid quantity may be calculated by multiplying the horizontal cross-sectional area of the rectangular supply tank by the fluid level height 771. As the tanks are preferably rectangular, this is a relatively simple calculation. The used fluid quantity may be calculated in a similar manner.

Other suitable tank configurations with their respective geometries stored in memory such that the quantity of fluid in the tank may be determined once the fluid level height is known may be used without detracting from the scope and spirit of the invention. Additional parameters such as fluid density may also be stored in the controller memory to be used in the quantity calculation if desired. The PLB 781 may transmit the new and used fluid quantities, as determined by the quantity calculator 783, to the comparator 785. The comparator is programmed to compare the new and used fluid quantities or change in new and used fluid quantities with one another. The comparator may also compare changes in fluid quantity in either one of the tanks alone.

Based on the comparison, the PLB 781 may generate a signal to the I/O board 779 to activate or deactivate the associated plumbing control component, i.e. the pump 24 or valves 70 and 84, respectively. It will be appreciated that the PFB 777 may be a printed circuit board including each of these components to form an integrated unit or each component may be a discrete unit in a modular form.

Installation of the Top Mounted Sensing Unit

It will be appreciated that the modularity of the top mounted sensing unit 729 allows for relatively easy installation. Referring to FIGS. 32–34, the operator initially slides the new fluid probe 749*a* into the aft hole of the new fluid sensor mount 710 of the bracket 708. The plate 752*a* of the new fluid sensor 700 is secured to the mount 710 using a suitable fastener. The used fluid sensor 702 is secured in a like manner to the used fluid mount 712. The new fluid conduit 741 may then be slid into the fore opening in the mount 710. A new fluid conduit collar 763 positions the conduit at the proper height by interfering with the downward travel of the conduit in relation to the mount 710. The used fluid conduit 739 is then slid into the fore opening used fluid mount 712 and positioned with lower surface of the used fluid conduit collar 765 abutting the top surface of the mount 712. The ends of the probes 749*a*, 749*b* and conduits 739, 741 may be aligned with the corresponding openings in the top of the new and used fluid tanks, 740 and 742, respectively. The installer slides the probes and conduits through the escutcheons 732*a*, 732*b* and into the corresponding tank to position the bottom wall of the bracket well 714 across the top surfaces 713 and 725 of the used and new fluid tanks. The bracket 708 may be secured to the tanks using suitable fasteners. With the bracket secured, the new fluid sensor probe 749*a* extends downwardly from the mount 710, through the aft aperture 717 in the top wall 713 of the new fluid tank 742 and into the tank. The bottom end 794*a* of the probe 749*a* is positioned in close proximity with the bottom wall 737 of the tank. The bottom end of the supply fluid conduit 741 is also positioned near the bottom of the new fluid tank.

Likewise, the bottom end 794*b* of the used fluid probe 749*b* and the bottom end of the used fluid conduit 739*a* are disposed near or on the bottom wall 735 of the used fluid tank 740. Installation of the sensing unit 729 is complete when the wire lead 775*a*, 775*b* of each sensor 700, 702 is connected to the I/O board 779 on the programmable function board 777.

It will be appreciated that by merely unbolting the well 714 from the top of the tanks 740, 742, respectively, and disconnecting the wire leads 775*a*, 775*b*, the sensing unit 729 may be withdrawn from the tank for maintenance. It should be appreciated that such modular construction facilitates and reduces overall installation time as well as reducing maintenance time if a sensor needs replacement.

Operation of the Dielectric Sensing Control System

Figure 35:
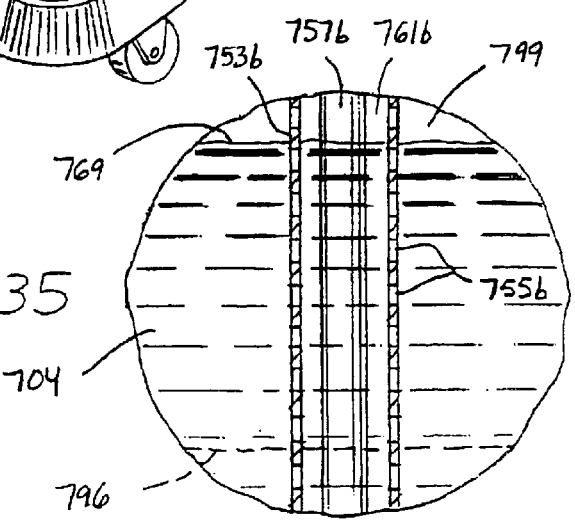
FIG. 35 is a close up view taken from the oval 35 in FIG. 32.

Referring now to FIGS. 33–35, and using the new fluid sensor 700 as an example, it will be appreciated that by applying a voltage differential across each of the spaced apart elements 753a and 757a of the probe 749a, a capacitor is created. The dielectric throughout the length of the probe 749a may be either air, a fluid such as transmission fluid, or a mixture of both. More specifically, it is known that the capacitance for a given length of a coaxial capacitor is determined by the formula:

$$C=(2*\Pi*E_0*E_r*L)/ln(R_o/R_i)$$

where $R_o$ is the inside radius of the outside cylinder, $R_i$ is the outside radius of the inner cylinder, $E_0$ is the permittivity of free space (i.e. a vacuum), $E_r$ is the dielectric constant or relative permittivity, and L is the length of the coaxial elements. The capacitance is measured in farads. $E_0$ is a physical constant equal to $8.85 \times 10^{-12}$ farad per meter (F/m). $E_r$ is the relative dielectric constant of the insulator between the coaxial conductors, e.g. the transmission fluid (or other fluid being exchanged) or air if no fluid is present. Air has an $E_r$ of one while fresh transmission fluid typically has an $E_r$ of around 2.0 to 2.2. As the transmission fluid becomes more contaminated, such as used transmission oil, the relative dielectric constant will generally increase.

As the capacitance of the probe 749a changes due to rising or falling fluid levels in the gap 761a of the probe 749a, the frequency of a voltage differential applied across the probe elements 753a and 757a will vary correspondingly. By sensing the occurrence of changes between the outgoing voltage frequency applied across the probe elements 753a and 757a by the control circuit in the sensor processing head 751a and the incoming voltage frequency received by the control circuit and the timing between such frequency changes, the height of the column of fluid within the gap 761a may be measured relative to the length of the probe which is a known parameter. In this example, the probe length is 25 inches while the tank height is 24 inches.

Relying on these principles, the control circuit in the sensor head 751a is integrated with the probe 749a which acts as a capacitor in the control circuit. Upon application of a relatively low voltage, received from the voltage reducer 705, across the elements 753a and 757a at a particular frequency with an oscillator, e.g. 20 KHz, the control circuit senses changes between the outgoing voltage frequency and the incoming voltage frequency, and measures the time for such changes to occur, also called the frequency response. Such frequency response varies as the capacitance of the circuit varies which occurs as the column of fluid in the gap 761a rises or falls. If there is no change in frequency occurs, the fluid level is not changing. By measuring the time it takes for the frequency to change, the location along the length of the probe 749a at which point the dielectric changes from oil to air may be determined. This point along the probe 449a equates to the upper level 771 of the new fluid 706.

The change in voltage frequency is then converted into an analog voltage signal using a conventional frequency to voltage converter in the control circuit in the sensor head 751a. Such voltage signal is dependent upon and proportional to the height of the fluid column in the gap 761a. The analog to digital converter 773a converts the analog voltage signal to a digital voltage signal and transmits the digital voltage signal to the I/O board 779 via wire lead 775a. A voltage versus height table may be stored in the controller 728 memory for convenient lookup by the PLB 781.

As an example, the voltage-height table may include a 4 volt setting corresponding to the upper surface 713 (maximum height) of the tank 742 and a 0 volt setting corresponding the bottom surface 737 (minimum height) of the tank interior may be set to zero volts. Thus, if two volts are transmitted from the analog to digital converter 773a of the new fluid sensor 700 to the I/O board 779 of the controller 728, the fluid level would be determined by the controller to be half way up the dielectric probe 749a. By pulsing the voltage in the control circuit at periodic intervals and measuring the incoming frequency changes and time of frequency response, the level of the new fluid 706 in the probe 749a may be periodically monitored. The used fluid sensor 702 may be operated in an identical manner for measuring the level of fluid 769 in the used fluid tank 740.

Construction of such a control circuit would be understood by one of ordinary skill in the art. The sensors 700 and 702 are available from Norco Industries in Elkhart, Ind. It will be appreciated that while other more sophisticated fluid level sensors could be used, with the construction described herein, the sensors 700 and 702 are relatively inexpensive compared to their counterparts on the market and provide a significant improvement in accuracy over the hydrostatic pressure sensors commonly used in the transmission servicing industry. In addition, the improved accuracy enables faster pumps to be used such as the 3.0 gpm pump 424 described above.

In practice, with reference to FIGS. 32–36, once the sensing unit 729 is installed as above, the operation of the fluid servicing apparatus 720 is generally same as the previously described embodiment 20 incorporating either manifold 31, 231, or 431 using the control panel 130 (FIGS. 1, 2, 6, 7, 17 and 25) except that fluid level height is provided to the controller 728 via the dielectric sensing units 700 and 702.

As before, the new fluid tank 742 is filled to capacity and the servicing hoses 44 and 46 (FIG. 1) are connected to the transmission ports. The vehicle battery 787 is connected via a wiring harness to the controller 728 to supply power to the controller 728 and other fluid control components. i.e. the pump 24 or 424, valves 70, 84 and including the sensors 700 and 702 which are in electrical communication with the controller 728.

Assuming the used fluid tank 740 is empty and the new fluid tank 742 is full, the desired fluid amount for replacement is selected via the control panel 130 as described above. The quantity selection is transmitted from the control panel 130 to the I/O board 779 and stored in the PLB 781. An initial fluid level reading of each tank 740 and 742 is then taken as follows. The PLB transmits a command to the I/O board to activate the sensors 700 and 702 through their respective leads 775a and 775b. Upon receipt of a command signal from the I/O board, the sensor processing head 751a of the new fluid sensor 700 sets up a voltage differential between the inner element 757a and the grounded outer tube 753a to establish a capacitance in the control circuit of the new fluid sensor processing head 751a. As described above, the control circuit determines the level of fluid in the new fluid tank from the frequency response and converts the analog voltage signal from the frequency to voltage converter to a digital voltage signal. The digital voltage signal is transmitted via wire lead 775a to the I/O board 779 for further processing. The initial new fluid quantity is determined by the PLB 781 based on the digital voltage signal corresponding to the new fluid level height 771 provided by the new fluid level sensor 700. An initial reading of the used fluid level 769 is taken by the controller 728 in a similar manner using the used fluid level sensor 702. The current level 771 of the new fluid 706 and the current level of the used fluid 769 are stored in the controller 728 memory.

As in the above embodiments, a calculation is performed by the CPU to determine if enough fresh fluid 706 is available for the exchange and if the used fluid level 769 is sufficiently low to receive the desired quantity of used fluid. Assuming both conditions are acceptable, the operator initiates the fluid exchange procedure as in the prior described embodiments via the control panel 130 (FIGS. 1 and 3).

In this exemplary embodiment, the controller 728 initiates the incremental automated drain and fill fluid exchange procedure as described above once the operator depresses the start exchange button on the control panel 130 (FIG. 3). Initially, ⁹⁄₁₀ of a quart of fluid is drained from the vehicle reservoir. Once ⁹⁄₁₀ of a quart of fluid is drained from the used fluid tank 740 as sensed by the used fluid sensor 702, the fill process is initiated by the controller 728. The controller then actuates the pump 24 to transfer a like amount to the vehicle reservoir as measured by the new fluid sensor 700. This procedure generally continues back and forth until the controller 728 detects a fluid quantity equal to the fluid exchange quantity selected by the operator via the control panel 130 has been transferred out of the new fluid tank 742.

Throughout the fill and drain processes, the PLB 781 (FIG. 36) receives the digital voltage signals through the I/O board 779 from the sensor head 751*a* of the new fluid sensor 700 and the sensor head 751*b* of used fluid sensor 702 on a periodic basis. When received by the PLB 781, such voltage signals represent the current level of the new and used fluids within their respective tanks 740 and 742 as generated by the varying capacitance in each sensor due to changes in the level of transmission fluid in the respective gaps 761*a*, 761*b* between the coaxial electrodes at the upper surface of the fluid. From such digital voltage signals, the respective fluid quantities of the used fluid tank 740 and the new fluid tank 742 are computed by the PLB 781 in conjunction with the quantity calculator 783. A comparison of the fluid quantities is then performed by the comparator 785. Based on the comparison, a command signal is sent from PLB 781 to the I/O board to activate or deactivate one the fluid control rate devices 791 such as the pump 24, valve 70, valve 84, or auxiliary valve 492. By actuating the various fluid rate control devices, the incoming flow rate of the used fluid and the outgoing flow rate of the new fluid may be substantially matched. Alternatively, if desired the flow rate of the used or new fluids may be controlled in isolation or a topping off procedure may be performed.

For example, turning now to FIGS. 34 and 35, the used fluid sensor 702 may detect an initial used fluid level as indicated in phantom lines and designated 796. The digital voltage signal corresponding to this fluid level is transmitted to the I/O board 779 which passes through the signal to the PLB 781 for further processing. An initial used fluid quantity is determined by the PLB 781 based on the digital voltage signal. As the drain process continues and used fluid 704 enters the used fluid tank 740 through the used fluid conduit 739 and rises within the gap 761*b* of the used fluid sensor probe 749*b*, and after a designated period of time, a second digital voltage signal is transmitted to the PLB that corresponds to the higher used fluid level designated 769.

In a similar manner, the new fluid sensor 700 may detect a supply fluid level at the initial height shown in phantom lines and designated 766 and then at a lower level designated by reference numeral 762 after a new periodic fluid level measurement is taken by the new fluid sensor 700. Each of these sensed levels 766 and 762, wherein the dielectric changes from oil to air, indicates the current highest level of the new fluid in the new fluid tank 742 at a particular time.

The change in the used fluid quantity may be determined by the PLB 781 based on the initial used fluid level 796 and the subsequent higher used fluid level 769. Likewise, the change in new fluid quantity may be determined by the PLB based on the initial new fluid level 762 and the lower new fluid level 771. Based upon the relative fluid heights taken at periodic intervals, the flow rates of both the new fluid 706 and the used fluid 704 may be calculated by the PLB 781 and compared using the comparator 785. Depending on the outcome of the comparison, the fluid flow rates may be adjusted by sending a command signal from the PLB 781 through the I/O board 779 to the desired flow control device 24, 70, 84 as necessary. The mechanics of controlling the flow control devices is the same as the previously described embodiments.

As the maximum and minimum fluid heights are known, the system 720 can be programmed to terminate the fluid transfer process should the fluid level exceed a predetermined limit or decrease below a predetermined base amount. Separate fill and drain procedures may be initiated by the operator using the above described methods as well. It has been found that the dielectric sensors described herein are capable of maintaining accurate fluid level measurement with only a 1–2% range of error. Thus, it will be appreciated that any topping off procedures will be more precise using the dielectric sensor package.

As used fluid becomes more contaminated, typically the dielectric constant will increase, however, it will always be greater than the dielectric constant of air and the upper level of the fluid is easily detected even if the fluid is severely contaminated. The frequency will change as the differing capacitance is detected.

Other fluid level sensors using capacitive principles to measure dielectric changes to sense fluid levels may be used. For example, it would also be possible to use a more expensive continuous coaxial, internal top mounted, fluid level sensing unit such as that sold under the designation Leveltrak and is available from Efector, Inc. of Exton Pa. However, the cost of such devices is generally prohibitive and the above described coaxial sensors, available from Norco Industries in Elkhart, Ind., are preferred.

Other examples of sensors using capacitance principles include a single coated metallic rod and an exterior mounted metal strip for sensing the changes in capacitance due to fluid level changes. These may also be suitable. However, the top mounted, internal, coaxial sensor is the preferred configuration. As the accuracy of a single coated metallic rod degrades in the presence of sloshing fluids and the exterior mounted sensor is susceptible to exterior vibration (walk-by) and external interference with the sensing field, it has been found that the coaxial probe construction inserted into the tank avoids these drawbacks and is the preferred manner of sensing the fluid levels in the tanks.

While the present invention has been described herein in terms of a number of preferred embodiments for performing fluid servicing procedures on a vehicle, various changes and improvements may also be made to the invention without departing from the scope thereof. For example, while the embodiments described herein have primarily been described in terms of exchanging transmission and power steering fluids, these are meant to be illustrative examples and not meant to be limiting in any manner. For example, using a suitable adapter or connector, other vehicle subsystems having fluid reservoirs such as engine coolant or engine oil may be serviced.

Although a vane is the preferred pumping means in the embodiment illustrated in FIG. 17 for its relatively high speed and low noise output, other suitable pumping means, including for example, gear pumps and diaphragm pumps may be used as well.

What is claimed is:

1. An electronic fluid exchanging apparatus for servicing a vehicular subsystem having a fluid reservoir containing a used fluid, said apparatus comprising:
   a supply tank for supplying a fresh fluid;
   a used fluid tank for collecting said used fluid from said fluid reservoir;
   a first sensor in communication with said supply tank and being operable to generate a supply fluid level signal corresponding to an upper fresh fluid level in said supply tank when in use;
   a second sensor in communication with said used fluid tank and being operable to generate a used fluid level signal corresponding to an upper used fluid level in said used fluid tank when in use;
   at least one of said sensors including a capacitor element responsive to respective said upper fluid level and operable to generate said respective fluid level signal;
   a fluid flow rate control device adapted to be coupled between said fluid reservoir and said tanks and selectively operable to direct fluid therebetween; and
   a processing unit coupled to said sensors and said fluid flow rate control device, said processing unit being programmed to, upon coupling said fluid flow rate control device to said fluid reservoir and said tanks and initiating fluid flow therebetween, obtain a fluid level signal from said sensor including a capacitor element and, based on said obtained fluid level signal, transmit a control signal to said fluid flow rate control device to regulate a flow rate of at least one of said fluids between said fluid reservoir and said tanks.

2. The electronic fluid exchanging apparatus as set forth in claim 1 wherein:
   said first sensor includes said capacitor element responsive to said upper fresh fluid level and operable to generate said fresh fluid level signal.

3. The electronic fluid exchanging apparatus as set forth in claim 1 wherein:
   said second sensor includes said capacitor element responsive to said upper used fluid level and operable to generate said used fluid level signal.

4. The electronic fluid exchanging apparatus as set forth in claim 1 wherein:
   said first sensor includes a capacitor element responsive to said upper fresh fluid level and operable to generate said fresh fluid level signal; and
   said second sensor includes a capacitor element responsive to said upper used fluid level and operable to generate said used fluid level signal.

5. The electronic fluid exchanging apparatus as set forth in claim 4 wherein:
   said processing unit is programmed to obtain said fresh fluid level signal from said first sensor and said used fluid level signal from said second sensor and, based on a comparison of said fluid level signals, transmit said command signal to said fluid flow rate control device.

6. The electronic fluid exchanging apparatus as set forth in claim 1 wherein:
   said first sensor includes a coaxial capacitor probe element extending into said fresh fluid tank from an upper housing, said housing including a control circuit operable to generate an outgoing voltage signal across said probe element at a predetermined frequency and measure an incoming voltage frequency from said probe element to generate said upper fresh fluid level signal.

7. The electronic fluid exchanging apparatus as set forth in claim 1 wherein:
   said second sensor includes a coaxial capacitor probe element extending into said used fluid tank from an upper housing, said housing including a control circuit operable to generate an outgoing voltage signal across said probe element at a predetermined frequency and measure an incoming voltage frequency from said probe element to generate said upper fluid level signal.

8. The electronic fluid exchanging apparatus as set forth in claim 1 wherein:
   said first and second sensors are top mounted to each respective said tank and include elongated probes extending into the respective said tanks and operable to sense a capacitance change along a length of respective said probes.

9. The electronic fluid exchanging apparatus as set forth in claim 1 wherein:
   said fluid flow rate control device is a pump.

10. The electronic fluid exchanging apparatus as set forth in claim 1 wherein:
    said fluid flow rate control device is a solenoid valve.

11. The electronic fluid exchanging apparatus as set forth in claim 1 wherein:
    said fluid flow rate control device includes a manifold defining a fluid circuit interposed between said tanks and said reservoir, said manifold including at least one fluid control component selectively operable to direct at least one of said fluids through said fluid circuit.

12. The electronic fluid exchanging apparatus as set forth in claim 1 wherein:
    said fluid flow rate control device is a pump and a set of valves disposed in a fluid transfer circuit housed in a manifold.

13. The electronic fluid exchanging apparatus as set forth in claim 6 wherein:
    said control circuit includes an analog to digital converter operable to transmit a digital supply fluid level signal corresponding to said supply fluid level signal obtained from said capacitor element to said processing unit.

14. The electronic fluid exchanging apparatus as set forth in claim 1 wherein:
    said processing unit is programmed to compute a substantially real time fluid quantity for each of said tanks using a set of stored tank geometry data and said fluid level signals received from said sensors.

15. The electronic fluid exchanging apparatus as set forth in claim 14 wherein:
    said processing units is programmed to compare relative changes in said fluid quantities from each said tank and based upon said comparison, transmit a command signal to selectively operate said fluid flow rate control device.

16. The electronic fluid exchanging apparatus as set forth in claim 14 wherein:
    said fluid rate control device is selectively operable to balance an incoming fluid rate into said used fluid collection tank with an outgoing fluid rate from said supply tank based on said fluid level signals.

17. The electronic fluid exchanging apparatus as set forth in claim 1 wherein:
    said processing unit being programmed to periodically obtain said fluid level signals from said sensors at predetermined time intervals.

18. The electronic fluid exchanging apparatus as set forth in claim 1 wherein:

said processing unit being programmed to substantially continuously obtain said fluid level signals from said sensors.

19. The electronic fluid exchanging apparatus as set forth in claim 1 wherein:
said fluid flow rate control device is a pump, said pump being responsive to a command signal from said processing unit based on a comparison of said used fluid level signal and said supply fluid level signal.

20. The electronic fluid exchanging apparatus as set forth in claim 6 wherein:
said probe element is integrated into said control circuit and said control circuit measures a time interval between issuance of said outgoing voltage frequency and a change in said incoming voltage frequency, said time interval corresponding to a length along said probe element at a point where a dielectric medium in said probe element changes from oil to air.

21. The electronic fluid exchanging apparatus as set forth in claim 6 wherein:
said sensors are mounted to a bracket attached to an upper surface of at least one of said tanks, each sensor including a probe element extending throughout a height of respective said tank.

22. An electronic fluid exchanging apparatus for servicing a vehicular subsystem having a fluid reservoir containing a used fluid, said apparatus comprising:
a supply tank for supplying a fresh fluid;
a used fluid tank for collecting said used fluid from said reservoir;
a first sensing means for sensing a change in capacitance at an upper level of said fresh fluid in said supply tank to generate a fresh fluid level height signal;
a second sensing means for sensing a change in capacitance at an upper level of said used fluid in said used fluid tank to generate a supply fluid level height signal;
fluid flow rate control means coupled between said fluid reservoir and said tanks for selectively directing fluid therebetween; and
a processing unit coupled to said first and second sensing means and said fluid flow rate control means, said processing unit being programmed to, upon coupling said fluid flow rate control means to said fluid reservoir and said tank and initiating fluid flow therebetween, selectively transmit a control signal to said fluid flow rate control means to regulate a flow rate of at least one of said fluids between said fluid reservoir and said tanks based on said fluid level height signals received from said first and second sensing means.

23. An electronic fluid exchanging apparatus for servicing a vehicular subsystem having a fluid reservoir with a used fluid and an inlet port and an outlet port and a pump for circulating fluid therebetween, said apparatus comprising:
a manifold defining a first manifold port for coupling to said inlet port, a second manifold port for coupling to said outlet port, a fresh fluid manifold port, a used fluid manifold port, and a fluid transfer circuit therebetween;
a supply tank for supplying a predetermined amount of new fluid to said new fluid manifold port;
a used fluid collection tank for receiving a predetermined amount of said used fluid from said used fluid manifold port;
a first sensor operable to sense an upper level of said new fluid in said supply tank;
a second sensor operable to sense an upper level of said used fluid in said collection tank;
at least one of said sensors including an elongated sensor probe of a predetermined length extending into a respective said tank and operable to measure a capacitance change corresponding to an upper level of respective said fluid along a length of said probe and further being operable transmit a fluid level signal proportional to said length of said probe where a capacitance change is sensed;
a fluid control device in communication with said fluid transfer circuit for directing fluid through said fluid transfer circuit between said ports, said fluid control device being selectively operable upon receipt of a command signal;
a processing unit in communication with said sensors and said fluid control device, said processing unit being programmed to monitor said first and second sensors to obtain a new fluid level signal and a used fluid level signal and further being programmed to transmit a command signal to said fluid control device to selectively control a flow rate of at least one of said fluids passing through said fluid transfer circuit; and
whereby, upon coupling said first manifold port to said inlet port and said second manifold port to said outlet port, said subsystem pump may be activated and said fluid control device selectively operated to direct at least one fluid through said fluid transfer circuit at a controlled flow rate based upon at least one of said fluid level signals.

24. An electronic fluid exchanging apparatus for servicing a vehicular subsystem having a fluid reservoir containing a used fluid, said apparatus comprising:
a supply tank for supplying a fresh fluid;
a sensing unit in communication with said supply tank, said sensing unit being operable to sense a change in capacitance corresponding to an upper level of said fresh fluid to generate an upper level fresh fluid signal;
a fluid flow rate control device coupled between said fluid reservoir and said tanks and selectively operable to direct fluid therebetween; and
a processing unit coupled to said sensing unit and said fluid flow rate control device, said processing unit being programmed to periodically monitor said sensing unit to obtain said upper level fresh fluid signal and based on said fluid signal transmit a control signal to said fluid flow rate control device to regulate a flow rate of fluid being transferred between said supply tank and said reservoir.

25. An electronic fluid exchanging apparatus for servicing a vehicular subsystem having a fluid reservoir containing a used fluid, said apparatus comprising:
a used fluid tank for collecting used fluid from said reservoir;
a used fluid sensing unit in communication with said used fluid tank, said used fluid sensing unit being operable to sense a change in capacitance corresponding to an upper level of said used fluid to generate an upper level used fluid signal;
a fluid flow rate control device coupled between said fluid reservoir and said tanks and selectively operable to direct fluid therebetween; and
a processing unit coupled to said sensing unit and said fluid flow rate control device, said processing unit being programmed to periodically monitor said used fluid sensing unit to obtain said upper level used fluid signal and based on said fluid signal transmit a control signal to said fluid flow rate control device to regulate a flow rate of used fluid being transferred between said used fluid tank and said reservoir.

26. A method for controlling incoming and outgoing fluid flow rates between a fluid exchanging apparatus and a vehicular subsystem having a fluid reservoir containing a used fluid, said method comprising:

providing a fresh fluid supply tank with a predetermined quantity of a fresh fluid;

providing a used fluid collection tank;

providing a sensing unit including a first sensor probe extending into said fresh fluid supply tank and a second sensor probe extending into said used fluid collection tank, each of said probes being responsive to a capacitance change corresponding to an upper level of a fluid within respective said tanks and operable to generate a fluid level signal proportional to respective said upper fluid levels;

providing a fluid flow rate control device adapted to be coupled between said fluid reservoir and said tanks and selectively operable to direct fluid therebetween;

providing a processing unit coupled to said sensing unit and said fluid flow rate control device, said processing unit being programmed to transmit a command signal to said fluid flow rate control device based upon said fluid level signals obtained from said sensing unit;

coupling said fluid rate control device to said fluid reservoir and said tanks;

actuating said fluid flow rate control device to begin directing fluid between said reservoir and at least one of said tanks; and actuating said processing unit to monitor said sensing unit to obtain said fluid level signals and, based upon said fluid level signals, transmit a command signal to said fluid flow rate control device to regulate a fluid flow rate of at least one of said fluids.

* * * * *